United States Patent
Cooper et al.

(10) Patent No.: US 9,079,589 B2
(45) Date of Patent: Jul. 14, 2015

(54) CONTROL SYSTEM AND METHOD FOR REMOTELY ISOLATING POWERED UNITS IN A VEHICLE SYSTEM

(75) Inventors: Jared Klineman Cooper, Melbourne, FL (US); David Allen Eldredge, Melbourne, FL (US); Timothy Robert Brown, Erie, PA (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 13/565,571

(22) Filed: Aug. 2, 2012

(65) Prior Publication Data

US 2012/0296545 A1 Nov. 22, 2012

Related U.S. Application Data

(63) Continuation-in-part of application No. 13/488,652, filed on Jun. 5, 2012, now abandoned, which is a continuation-in-part of application No. 12/556,334, filed on Sep. 9, 2009, now Pat. No. 8,538,608, and a continuation-in-part of application No. 13/175,284, filed on Jul. 1, 2011, now Pat. No. 8,565,946.

(51) Int. Cl.
*B61L 1/00* (2006.01)
*B61C 17/12* (2006.01)
(Continued)

(52) U.S. Cl.
CPC ............... *B61C 17/12* (2013.01); *B61L 3/006* (2013.01); *B61L 15/0027* (2013.01); *B61L 15/0036* (2013.01); *Y02T 30/10* (2013.01)

(58) Field of Classification Search
CPC ... B61L 3/006; B60L 2200/26; B60L 11/123; B60L 2220/18; B60L 11/005; B60L 11/12; B60L 11/16; B60L 11/1861; B60L 15/20; B60L 2220/12; B60L 2220/14; B60L 2240/445; B60L 2240/662; B60L 2240/70; B60L 2260/16
USPC ................ 701/99, 2, 19, 20; 434/219; 105/61
See application file for complete search history.

(56) References Cited

U.S. PATENT DOCUMENTS

| | | |
|---|---|---|
| 4,041,283 A | 8/1977 | Mosier |
| 4,042,810 A | 8/1977 | Mosher |

(Continued)

FOREIGN PATENT DOCUMENTS

| | | |
|---|---|---|
| DE | 19645426 | 7/1997 |
| EP | 0114633 | 1/1984 |

(Continued)

OTHER PUBLICATIONS

International Search Report and Written Opinion for International Application PCT/US2010/045402.

*Primary Examiner* — Helal A Algahaim
*Assistant Examiner* — Jelani Smith
(74) *Attorney, Agent, or Firm* — GE Global Patent Operation; John A. Kramer

(57) ABSTRACT

A method for controlling a vehicle system includes controlling a vehicle system having powered units that propel the vehicle system. A trip plan directs at least one of the powered units to remain in a non-propulsion generating mode during the trip. The method further includes slowing and/or stopping the vehicle system in contravention to the first trip plan, activating the at least one of the powered units out of the non-propulsion generating mode into an active, propulsion-generating mode when the vehicle system accelerates after the at least one of slowing or stopping in contravention to the first trip plan, and switching the at least one of the powered units back to the non-propulsion generating mode after the vehicle system achieves a designated speed following accelerating after the at least one of the slowing or stopping of the vehicle system in contravention to the first trip plan.

32 Claims, 12 Drawing Sheets

(51) Int. Cl.
*B61L 3/00* (2006.01)
*B61L 15/00* (2006.01)

(56) References Cited

U.S. PATENT DOCUMENTS

| | | |
|---|---|---|
| 4,181,943 A | 1/1980 | Hugg et al. |
| 4,602,335 A | 7/1986 | Perlmutter |
| 5,744,707 A | 4/1998 | Kull |
| 7,395,141 B1 | 7/2008 | Seck |
| 2003/0034423 A1 | 2/2003 | Hess |
| 2005/0251299 A1* | 11/2005 | Donnelly et al. ............... 701/19 |
| 2008/0183345 A1 | 7/2008 | Chandra |
| 2008/0201028 A1* | 8/2008 | Brooks et al. ................... 701/20 |
| 2009/0186325 A1 | 7/2009 | Kumar |
| 2014/0094998 A1* | 4/2014 | Cooper et al. ................... 701/2 |

FOREIGN PATENT DOCUMENTS

| | | |
|---|---|---|
| EP | 0257662 | 2/1988 |
| EP | 0539885 | 5/1993 |
| EP | 0755840 | 1/1997 |
| GB | 2188464 | 9/1987 |
| WO | 9003622 | 5/1990 |
| WO | 99/14093 | 3/1999 |

\* cited by examiner

CONTROL SYSTEM AND METHOD FOR REMOTELY ISOLATING POWERED UNITS IN A VEHICLE SYSTEM

CROSS-REFERENCE TO RELATED APPLICATIONS

This application is a continuation-in-part of U.S. patent application Ser. No. 13/488,652, which was filed on 05 Jun. 2012 now abandoned, and is entitled "Control System And Method For Remotely Isolating Powered Units In A Vehicle System" (the "'652 Application"). The '652 Application is a continuation-in-part of U.S. patent application Ser. No. 12/556,334, which was filed on 09 Sep. 2009 now U.S Pat. No. 8,538,608, and is entitled "Control System And Method For Remotely Isolating Powered Units In A Rail Vehicle System" (the "'334 Application"). The '652 Application also is a continuation-in-part of U.S. patent application Ser. No. 13/175,284, which was filed on 01 Jul. 2011 now U.S Pat. No. 8,565,946, and is entitled "System And Method For Vehicle Control" (the "'284 Application"). The entire disclosures of the '652Application, the '334 Application, and the '284 Application are incorporated by reference into this application.

BACKGROUND

The inventive subject matter described herein relates generally to powered vehicle systems. Although one or more embodiments are described and shown in terms of rail vehicle systems, not all embodiments are so limited. For example, one or more embodiments may relate to other types of vehicles, such as automobiles, marine vessels, other off-highway vehicles, and the like.

Known powered rail vehicle systems include one or more powered units and, in certain cases, one or more non-powered units. The powered units supply tractive force to propel the powered units and non-powered units. The non-powered units hold or store goods and/or passengers. ("Non-powered" unit generally encompasses any vehicle without an on-board source of motive power.) For example, some known powered rail vehicle systems include a rail vehicle system (e.g., train) having powered locomotives and non-powered cars for conveying goods and/or passengers along a track. Some known powered vehicle systems include several powered units. For example, the systems may include a lead powered unit, such as a lead locomotive, and one or more remote or trailing powered units, such as trailing locomotives, that are located behind and (directly or indirectly) coupled with the lead powered unit. The lead and remote powered units supply tractive force to propel the vehicle system along a route, such as a track.

The tractive force required to convey the powered units and non-powered units along the route may vary during a trip. For example, due to various parameters that change during a trip, the tractive force that is necessary to move the vehicle system along the route may vary. These changing parameters may include the curvature and/or grade of the route, speed limits and/or requirements of the vehicle system, and the like. As these parameters change during a trip, the total tractive effort, or force, that is required to propel the vehicle system along the track also changes.

While the required tractive effort may change during a trip, the operators of these powered rail vehicle systems do not have the ability to remotely turn the electrical power systems of remote powered units on or off during the trip. For example, an operator in a lead locomotive does not have the ability to remotely turn one or more of the trailing locomotives' electrical power on or off, if the tractive effort required to propel the train changes during a segment of the trip while the rail vehicle system is moving. Instead, the operator may only have the ability to locally turn on or off the remote powered units by manually boarding each such unit of the rail vehicle system.

Some known powered rail vehicle systems provide an operator in a lead locomotive with the ability to change the throttle of trailing locomotives (referred to as distributed power operations). But, these known systems, do not provide the operator with the ability to turn the trailing locomotives off. Instead, the operator must turn down the throttle of the trailing locomotives that he or she wants to turn off and wait for an auto engine start/stop (AESS) device in the trailing locomotives to turn the locomotives off. Some known AESS devices do not turn the trailing locomotives off until one or more engine- or motor-related parameters are within a predetermined range. For example, some known AESS devices may not shut off the engine of a trailing locomotive until the temperature of the engine decreases to a predetermined threshold. If the time period between the operator turning down the throttle of the trailing locomotives and the temperature of the engines decreasing to the predetermined threshold is significant, then the amount of fuel that is unnecessarily consumed by the trailing locomotives can be significant.

Known powered vehicle systems may include one or more powered units (e.g., locomotives) and one or more non-powered units (e.g., freight cars or other rail cars). The powered units supply tractive force to propel the powered units and non-powered units. The non-powered units hold or store goods and/or passengers, and are not capable of self-propulsion. For example, some known powered vehicle systems have locomotives and rail cars for conveying goods and/or passengers along a track. Some known powered rail vehicle systems include several powered units. For example, the systems may include a lead powered unit, such as a lead locomotive, and one or more remote powered units, such as trailing locomotives, that are located behind and coupled with the lead powered unit. The lead and remote powered units supply tractive force to propel the system along the track.

The remote powered units may be organized in motive power groups referred to as consists. (Generally, a consist is a group of vehicles that are mechanically linked together to travel along a route. As part of a train or other larger consist, a motive power group of remote powered units would be considered a sub-consist or remote consist.) The lead powered unit can control the tractive efforts of the remote powered units in consist. The remote powered units in consist can consume fuel during a trip of the vehicle system. To reduce the amount of fuel consumed by the remote vehicles, one or more operational modes of the consist may be changed during operation.

Changing operational modes of the consist, however, may result in fluctuations of various components or systems of the consist. For example, changing operational modes may cause voltage fluctuations in electrical circuits of the consist, fluctuations in hydraulic pressures of the consist, or the like. These fluctuations may be incompatible with certain on-board control and/or communication systems of the consist. As a result, the on-board systems may be unable to operate due to the fluctuations.

Additionally, some known rail vehicle systems may include more horsepower that is necessary to enable the vehicle systems to travel over a route to a destination location. For example, the operators that combine several locomotives into a consist of a train may add more locomotives to the train than is necessary. The total horsepower provided by the locomotives may exceed what is needed to allow the train to travel to a destination. The additional locomotives cause additional consumption of fuel and/or generation of additional emissions, which is generally undesirable.

It may be desirable to have a vehicle control system and method that differs in function from those systems that are currently available.

BRIEF DESCRIPTION

In one embodiment, a method (e.g., for controlling a vehicle system) includes controlling a vehicle system having plural powered units that are configured to generate tractive effort to propel the vehicle system along a route according to a first trip plan. The first trip plan designates operational settings of the vehicle system as a function of at least one of time or distance along the route during a trip. The first trip plan also directs at least one of the powered units to remain in a non-propulsion generating mode (e.g., idle mode or off mode) during the trip. The method further includes at least one of slowing or stopping the vehicle system along the route during the trip in contravention to the first trip plan, activating the at least one of the powered units out of the non-propulsion generating mode into an active, propulsion-generating mode when the vehicle system accelerates after the at least one of slowing or stopping in contravention to the first trip plan, and switching the at least one of the powered units back to the non-propulsion generating mode after the vehicle system achieves a designated speed following accelerating after the at least one of the slowing or stopping of the vehicle system in contravention to the first trip plan.

In another embodiment, a control system includes a controller device and an isolation module. The controller device is configured to be disposed onboard a vehicle system having plural powered units that are configured to generate tractive effort to propel the vehicle system along a route. The controller device also is configured to direct operations of the powered units according to a first trip plan that designates operational settings of the vehicle system as a function of at least one of time or distance along the route during a trip. The isolation module is configured to be communicatively coupled with the controller device and to direct at least one of the powered units to remain in a non-propulsion generating mode during the trip. When the vehicle system is at least one of slowed or stopped along the route during the trip in contravention to the first trip plan and the vehicle system subsequently accelerates, the isolation module is configured to activate the at least one of the powered units out of the non-propulsion generating mode into an active, propulsion-generating mode during acceleration of the vehicle system. The isolation module also is configured to switch the at least one of the powered units back to the non-propulsion generating mode after the vehicle system achieves a designated speed following the acceleration of the vehicle system.

In another embodiment, a control system includes an energy management system that is configured to generate a first trip plan for controlling a vehicle system having plural powered units along a route for a trip. The energy management system is further configured to determine a tractive effort difference between a tractive effort capability of the vehicle system and a demanded tractive effort of the trip. The tractive effort capability represents the tractive effort that the powered units are capable of providing to propel the vehicle system. The demanded tractive effort represents the tractive effort that is calculated to be used for actually propelling the vehicle system along the route for the trip according to the first trip plan. The energy management system is further configured to generate the first trip plan such that according to the first trip plan, at least one of the powered units is to be controlled to a non-propulsion generating mode based on the tractive effort difference. Following at least one of an unplanned slowing or an unplanned stopping of the vehicle system, the energy management system is configured to modify the first trip plan into a revised trip plan that directs the at least one of the powered units to switch to an active mode to generate the tractive effort to accelerate the vehicle system to a designated speed and then to switch back to the non-propulsion generating mode.

In another embodiment, a control system includes an energy management system and an isolation control system. The energy management system is configured to generate a trip plan that designates operational settings of a vehicle system having plural powered units interconnected with one another that generate tractive effort to propel the vehicle system along a route for a trip. The energy management system also is configured to determine a tractive effort capability of the vehicle system and a demanded tractive effort of the trip. The tractive effort capability is representative of the tractive effort that the powered units are capable of providing to propel the vehicle system. The demanded tractive effort is representative of the tractive effort that is calculated to be used for actually propelling the vehicle system along the route for the trip according to the trip plan. The isolation control system is configured to be communicatively coupled with the energy management system and to remotely turn one or more of the powered units to an off mode. In one embodiment, the off mode includes the one or more powered units being turned to idle, or to being fully off and deactivated, as described below. The energy management system also is configured to identify a tractive effort difference between the tractive effort capability of the vehicle system and the demanded tractive effort of the trip and to select at least one of the powered units as a selected powered unit based on the tractive effort difference. The isolation module also is configured to remotely turn the selected powered unit to the off mode such that the vehicle system is propelled along the route during the trip by the powered units other than the selected powered unit.

In another embodiment, a method (e.g., for controlling a vehicle system) comprises determining a tractive effort capability of a vehicle system having plural powered units that generate tractive effort to propel the vehicle system and a demanded tractive effort of a trip. The tractive effort capability is representative of the tractive effort that the powered units are capable of providing to propel the vehicle system. The demanded tractive effort is representative of the tractive effort that is calculated to be used for actually propelling the vehicle system along a route for the trip according to a trip plan. The trip plan designates operational settings of the vehicle system to propel the vehicle system along the route for the trip. The method also includes identifying a tractive effort difference between the tractive effort capability of the vehicle system and the demanded tractive effort of the trip, selecting at least one of the powered units as a selected powered unit based on the tractive effort difference, and remotely turning the selected powered unit to an off mode such that the vehicle system is propelled along the route during the trip by the powered units other than the selected powered unit.

In another embodiment, another control system includes an energy management system and an isolation control system. The energy management system is configured to generate a trip plan that designates operational settings of a vehicle system having plural powered units interconnected with one another that generate tractive effort to propel the vehicle system along a route for a trip. Each of the powered units is associated with a respective tractive effort capability representative of a maximum horsepower that can be produced by the powered unit during travel. The isolation control system is configured to be communicatively coupled with the energy management system and to remotely turn one or more of the powered units to an off mode. The energy management system also is configured to determine a total tractive effort capability of the powered units in the vehicle system and a demanded tractive effort representative of the tractive effort that is calculated to be used for actually propelling the vehicle system along the route for the trip according to the trip plan. The energy management system is configured to select a first powered unit from the powered units based on an excess of the total tractive effort capability of the powered units over the demanded tractive effort of the trip. The isolation control system is configured to remotely turn the first powered unit to an off mode such that the vehicle system is propelled along the route during the trip without tractive effort from the first powered unit.

In another embodiment of a method (e.g., a method for controlling a vehicle consist), the method comprises, in a vehicle consist comprising plural powered units, controlling one or more of the powered units to an off mode of operation. The one or more powered units are controlled to the off mode of operation from a start of a trip of the vehicle consist along a route at least until a completion of the trip. During the trip when the one or more powered units are in the off mode of operation, the one or more powered units would be capable of providing tractive effort to help propel the vehicle consist. (For example, the powered units controlled to the off mode are not disabled or otherwise incapable of providing tractive effort.) In another embodiment of the method, in the off mode of operation, engine(s) of the one or more powered units are deactivated.

In another embodiment, a control system comprises an energy management system configured to generate a trip plan for controlling a vehicle system having plural powered units along a route for a trip. The energy management system is further configured to determine a tractive effort difference between a tractive effort capability of the vehicle system and a demanded tractive effort of the trip. The tractive effort capability is representative of the tractive effort that the powered units are capable of providing to propel the vehicle system, and the demanded tractive effort is representative of the tractive effort that is calculated to be used for actually propelling the vehicle system along the route for the trip according to the trip plan. The energy management system is further configured to generate the trip plan such that according to the trip plan, at least one of the powered units is to be controlled to an off mode during at least part of the trip. (That is, the trip plan is configured such that when the trip plan is executed, the at least one of the powered units is designated to be in the off mode of operation.) The energy management system is configured to select the at least one of the powered units based on the tractive effort difference.

In another embodiment, a control system for a rail vehicle system including a lead powered unit and a remote powered unit is provided. The system includes a user interface, a master isolation module, and a slave controller. The user interface is disposed in the lead powered unit and is configured to receive an isolation command to turn on or off the remote powered unit. The master isolation module is configured to receive the isolation command from the user interface and to communicate an instruction based on the isolation command. The slave controller is configured to receive the instruction from the master isolation module. The slave controller causes the remote powered unit to supply tractive force to propel the rail vehicle system when the instruction directs the slave controller to turn on the remote powered unit. The slave controller causes the remote powered unit to withhold the tractive force when the instruction directs the slave controller to turn off the remote powered unit.

In another embodiment, a method for controlling a rail vehicle system that includes a lead powered unit and a remote powered unit is provided. The method includes providing a user interface in the lead powered unit to receive an isolation command to turn on or off the remote powered unit and a slave controller in the remote powered unit. The method also includes communicating an instruction based on the isolation command to the slave controller and directing the slave controller to cause the remote powered unit to supply tractive force to propel the rail vehicle system when the instruction directs the slave controller to turn on the remote powered unit and to cause the remote powered unit to withhold the tractive force when the instruction directs the slave controller to turn off the remote powered unit.

In another embodiment, a computer readable storage medium for a control system of a rail vehicle system is having a lead powered unit and a remote powered unit is provided. The lead powered unit includes a microprocessor and the remote powered unit includes a slave isolation module and a slave controller. The computer readable storage medium includes instructions to direct the microprocessor to receive an isolation command to turn on or off the remote powered unit. The instructions also direct the microprocessor to communicate an instruction based on the isolation command. The slave controller receives the instruction to cause the remote powered unit to supply tractive force to propel the rail vehicle system when the instruction directs the slave controller to turn on the remote powered unit and to withhold the tractive force when the instruction directs the slave controller to turn off the remote powered unit.

In another embodiment, a method for controlling a train having a lead locomotive and a remote locomotive is provided. The method includes communicating an instruction that relates to an operational state of the remote locomotive from the lead locomotive to the remote locomotive. The method also includes controlling an engine of the remote locomotive at the remote locomotive based on the instruction into one of an on operational state and an off operational state. The engine does not combust fuel during at least a portion of a time period when the engine is in the off operational state.

As should be appreciated, the control system, method, and computer readable storage medium remotely adjust the tractive force provided by powered units in a powered rail vehicle system by turning powered units in the system on or off. Such a system, method, and computer readable storage medium can improve some known rail vehicle systems by reducing the amount of fuel that is consumed during a trip.

DETAILED DESCRIPTION

Figure 1:
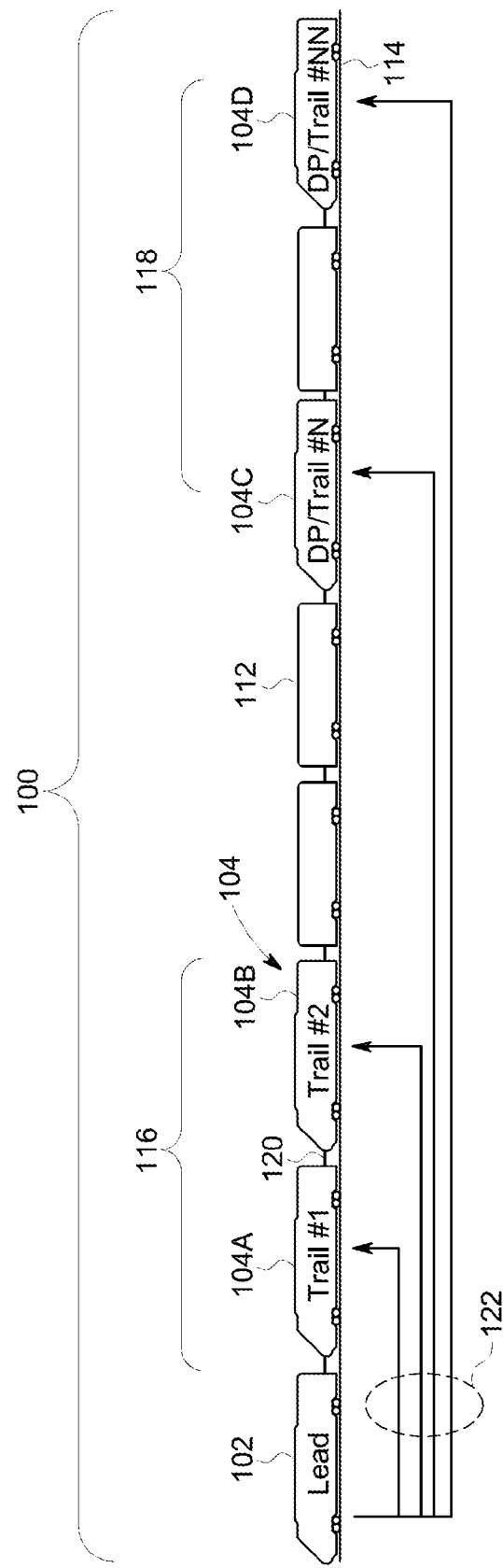
FIG. 1 is a schematic illustration of a rail vehicle system that incorporates an isolation control system constructed in accordance with one embodiment.

The foregoing summary, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "including," "comprising," or "having" (and various forms thereof) an element or a plurality of elements having a particular property may include additional such elements not having that property.

As used herein, the term "vehicle system" includes two or more vehicles that operate together to travel along a route. The term "consist" can refer to a group of vehicles that are mechanically and/or logically linked together to travel along a route. According to various aspects of the invention, a consist may be defined based on one or more of the following: mechanical linkages, where vehicles in a consist are mechanically linked and adjacent to at least one other vehicle in the consist; electrical linkages, where vehicles are electrically linked for possibly transferring electrical power between the vehicles; and/or operational/functional linkages, where plural vehicles are controlled in a coordinated manner, e.g., certain modes of distributed power operations. As one example, in a rail vehicle context, a locomotive consist comprises plural locomotives that are mechanically (and possibly electrically) linked together, with each locomotive linked and adjacent to at least one other locomotive in the consist. For example, a consist of vehicles, or a vehicle consist, may include two or more vehicles that are mechanically coupled with each other and/or that communicate with each other over one or more wired and/or wireless connections to coordinate control of tractive efforts and/or braking efforts of the vehicles in the consist. A vehicle system can include one or more vehicle consists, such as a train that includes two or more motive power groups formed from two or more locomotives mechanically linked together with each other. The term "lead vehicle" refers to a vehicle that controls operations of one or more vehicles in the vehicle system, and does not necessarily mean the vehicle disposed at a front or leading end of a vehicle system. For example, a lead locomotive in a train may not be disposed at the front end of a train. The term "remote vehicle" refers to a vehicle other than the lead vehicle in a vehicle system. For example, a remote vehicle may include a locomotive that is controlled by a lead locomotive in a train. The term "remote" does not require a predetermined spacing or separation between items. For example, a remote vehicle may be directly coupled with a lead vehicle.

FIG. 1 is a schematic illustration of a vehicle system 100 that incorporates an isolation control system constructed in accordance with one embodiment. The vehicle system 100 includes a lead powered unit or vehicle 102 coupled with several remote powered units or vehicles 104 (e.g., powered units 104A-D) and individual non-powered units 112. The vehicle system 100 travels along a route 114, such as a track, road, waterway, and the like. The lead powered unit 102 and the remote powered units 104 supply a tractive force or effort to propel the vehicle system 100 along the route 114. In one embodiment, the lead powered unit 102 is a leading locomotive disposed at the front end of the vehicle system 100 and the remote powered units 104 are trailing locomotives disposed behind the lead powered unit 102 between the lead powered unit 102 and the back end of the vehicle system 100. The individual non-powered units 112 may be non-powered storage units (e.g., units that are not capable of providing motive power but that may consume energy such as electric current for one or more purposes) for carrying cargo and/or passengers along the route 114.

The remote powered units 104 are remote from the lead powered unit 102 in that the remote powered units 104 are not located within the lead powered unit 102. A remote powered unit 104 need not be separated from the lead powered unit 102 by a significant distance in order for the remote powered unit 104 to be remote from the lead powered unit 102. For example, a remote powered unit 104 may be directly adjacent to and coupled with the lead powered unit 102 and still be remote from the lead powered unit 102. In one embodiment, the lead powered unit 102 is not located at the front end of the vehicle system 100. For example, the lead powered unit 102 may trail one or more non-powered units 112 and/or remote powered units 104 in the vehicle system 100. Thus, unless otherwise specified, the terms "lead," "remote," and "trailing" are meant to distinguish one vehicle from another, and do not require that the lead powered unit be the first powered unit or other vehicle in a consist or other vehicle system, or that the remote powered units be located far away from the lead powered unit or other particular units, or that a "trailing" unit be behind the lead unit or another unit. The number of powered units 104 in the vehicle system 100 may vary from the number shown in FIG. 1.

The remote powered units 104 may be organized into groups. In the illustrated embodiment, the remote powered units 104A, 104B are organized into a consist group 116. The consist group 116 may include one or more powered units 104A, 104B that are the same or similar models and/or are the same or similar type of powered unit. For example, the consist group 116 may include remote powered units 104A, 104B that are manufactured by the same entity, supply the same or similar tractive force, have the same or similar braking capacity, have the same or similar types of brakes, and the like. Alternatively, one or more of the powered units 104 in a consist group may differ from one or more other powered units 104 in the same consist group. The powered units in a consist group may be directly coupled with one another or may be separated from one another but interconnected by one or more other components or units.

The remote powered units 104C, 104D are organized into a distributed power group 118 in the illustrated embodiment. Similar to the consist group 116, a distributed power group 118 may include one or more powered units. The powered units in the distributed power group 118 may be separated from one another but interconnected with one another by one or more other powered units 102, 104 and/or non-powered units 112, as shown in FIG. 1.

In operation of one embodiment of the system 100, the lead powered unit 102 remotely controls which of the remote powered units 104 are turned on and which remote powered units 104 are turned off. For example, an operator in the lead powered unit 102 may remotely turn one or more of the remote powered units 104 on or off while remaining in the lead powered unit 102. The lead powered unit 102 may remotely turn on or off individual remote powered units 104 or entire groups of remote powered units 104, such as the remote powered units 104A, 104B in the consist group 116 and/or the remote powered units 104C, 104D in the distributed power group 116. The lead powered unit 102 remotely turns the remote powered units 104 on or off when the vehicle system 100 is moving along the route 114 and/or when the vehicle system 100 is stationary on the route 114. For example, prior to leaving on a trip along the route 114 (e.g., where a trip includes travel from a beginning location to a destination location), the vehicle system 100 may decide which powered units 104 can be turned off for the duration of the trip based on calculated or forecasted energy needs of the vehicle system 100 to travel along the route 114, as described below. The vehicle system 100 may turn off one or more powered units 104 prior to leaving on the trip if the vehicle system 100 determines that the trip can be accomplished (e.g., the vehicle system 100 can travel to the destination location) with less than all of the powered units 104 acting to propel the vehicle system 100. Turning off one or more of the powered units 104 may allow the vehicle system 100 to travel to the destination location of the trip while consuming less fuel and/or generating fewer emissions relative to traveling with all of the powered units 104 being on for all or at least a portion of the trip.

By turning a powered unit "on," a propulsion subsystem of the powered unit is activated to produce tractive effort, such as by producing sufficient electric current to power one or more motors of the powered unit. A powered unit that is turned on may alternatively be referred to as being in an active and/or propulsion generating mode. Turning a powered unit "off" or to an idle mode or state may involve changing an operating mode of the propulsion subsystem of the powered unit to no longer generate sufficient electric current to propel the powered unit, as described below. The off mode or idle mode may be referred to as an inactive and/or non-propulsion generating mode.

In operation of another embodiment of the system 100, the lead powered unit 102 remotely controls which of the remote powered units 104 are turned on and which remote powered units 104 are turned to an idle mode. By "idle" or "idle mode," it is meant that propulsion subsystems of the powered units that are turned to idle do not produce tractive effort to propel the powered units or vehicle system. The propulsion subsystems may remain on to generate electric current, but do not produce tractive effort. For example, a propulsion subsystem of a powered unit in the idle mode can remain active to produce electric current to power a communication device of the powered unit such that a communication link between the powered unit and another component located off-board of the powered unit remains active, but the propulsion subsystem of the powered unit does not produce electric current to propel the powered unit.

An operator in the lead powered unit 102 may remotely turn one or more of the remote powered units 104 to the idle mode or to the on mode (e.g., active or propulsion-generating mode) while remaining in the lead powered unit 102. The lead powered unit 102 may remotely turn individual remote powered units 104 or entire groups of remote powered units 104 to the idle mode or from the idle mode to the on mode. The lead powered unit 102 remotely turns the remote powered units 104 on, off, and/or to the idle mode when the vehicle system 100 is moving along the route 114 and/or when the vehicle system 100 is stationary on the route 114. For example, prior to leaving on a trip along the route 114 (e.g., where a trip includes travel from a beginning location to a destination location), the vehicle system 100 may decide which powered units 104 can be turned off or to the idle mode for the duration of the trip based on calculated or forecasted energy needs of the vehicle system 100 to travel along the route 114. The vehicle system 100 may turn one or more powered units 104 to the idle mode prior to leaving on the trip if the vehicle system 100 determines that the trip can be accomplished (e.g., the vehicle system 100 can travel to the destination location) with less than all of the powered units 104 acting to propel the vehicle system 100. Turning one or more of the powered units 104 to the idle mode for the duration of a trip can allow the vehicle system 100 to travel to the destination location of the trip (e.g., a final destination of the trip) while consuming less fuel and/or generating fewer emissions relative to traveling with all of the powered units 104 being on for all or at least a portion of the trip.

The remote powered units 104 supply tractive forces to propel the vehicle system 100 along the route 114 when the respective remote powered units 104 are turned on. Conversely, the individual remote powered units 104 withhold tractive forces and do not supply a tractive force to propel the vehicle system 100 along the route 114 when the respective remote powered units 104 are turned off. The lead powered unit 102 may control which of the remote powered units 104 are turned on and which of the remote powered units 104 are turned off based on a variety of factors. By way of example only, the lead powered unit 102 may turn off some remote powered units 104 while leaving other remote powered units 104 on if the remote powered units 104 that remain on are supplying sufficient tractive force to propel the vehicle system 100 along the route 114.

The lead powered unit 102 communicates with the remote powered units 104 in order to turn the remote powered units 104 on or off. The lead powered unit 102 may communicate instructions to the remote powered units 104 via a wired connection 120 and/or a wireless connection 122 between the lead powered unit 102 and the remote powered units 104. By way of non-limiting example only, the wired connection 120 may be a wire or group of wires, such as a trainline, electric multiple unit (eMU) line, MU cables, electrically controlled pneumatic (ECP) brake line, a distributed power (DP) communication line, and the like that extends through the powered units 102, 104 and non-powered units 112 of the vehicle system 100. The wireless connection 122 may include radio frequency (RF) communication of instructions between the lead powered unit 102 and one or more of the remote powered units 104, such as a communication link provided by 220 data radios.

Figure 2:
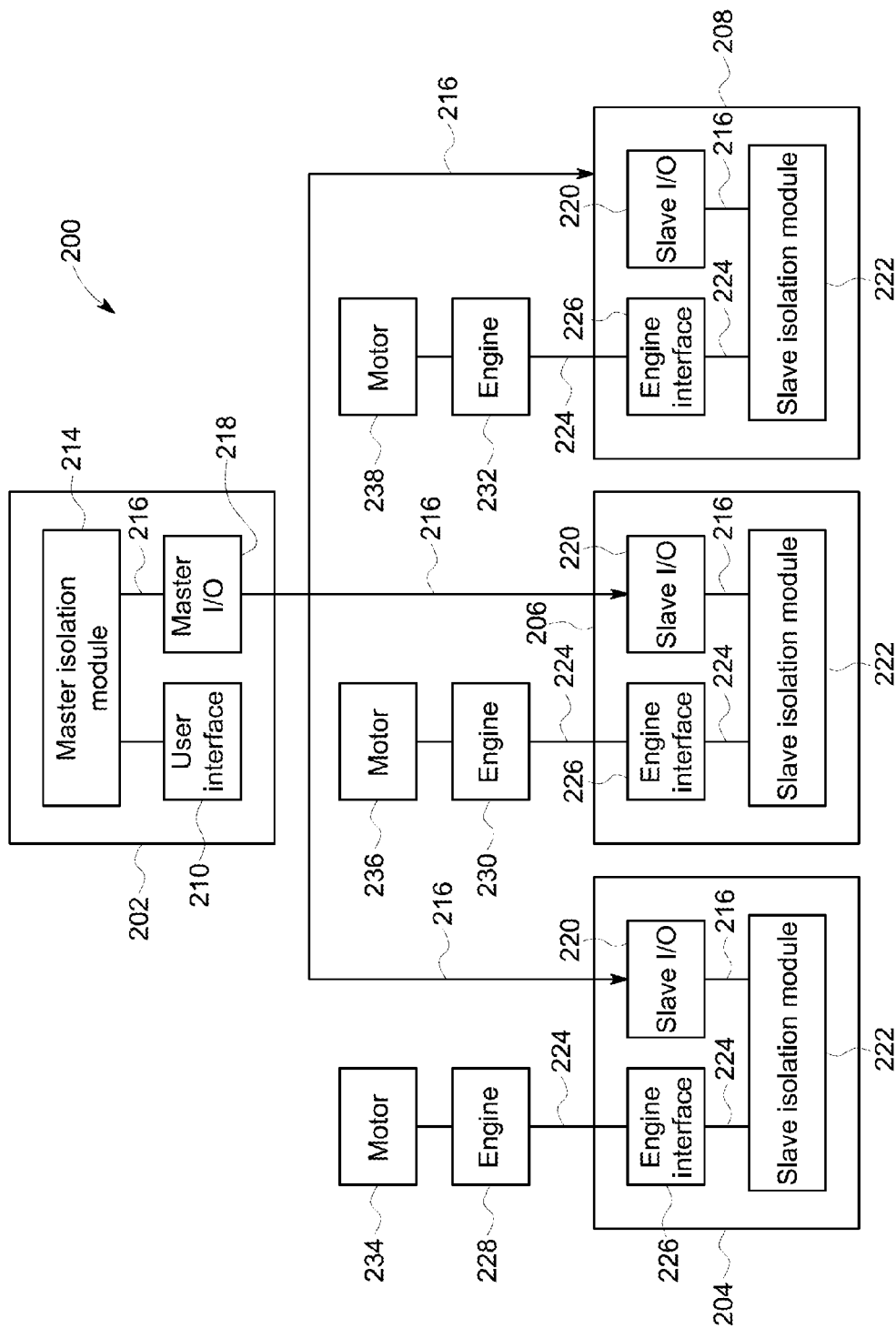
FIG. 2 is a schematic illustration of an isolation control system in accordance with one embodiment.

FIG. 2 is a schematic illustration of the isolation control system 200 in accordance with one embodiment. The isolation control system 200 enables an operator in the lead powered unit 102 (shown in FIG. 1) to remotely change a powered or operational state of one or more of the remote powered units 104 (shown in FIG. 1). The powered or operational state of one or more of the remote powered units 104 may be an "on" operational state or mode, or an "off" operational state or mode based on whether power is supplied to (or by) engines 228, 230, 232 of the remote powered units 104. For example, a remote powered unit 104 may be turned to an "off" state by shutting off power to the engine 228 in the remote powered unit 104. Depending on the type of engine involved, this may include one or more of the following: communicating with an engine controller or control system that the engine is to be turned off; shutting off a supply of electricity to the engine, where the electricity is required by the engine to operate (e.g., spark plug operation, fuel pump operation, electronic injection pump); shutting off a supply of fuel to the engine; shutting off a supply of ambient air or other intake air to the engine; restricting the output of engine exhaust; or the like. Turning the engine 228, 230, 232 of a remote powered unit 104 off may prevent the engine 228, 230, 232 in the remote powered unit 104 from generating electricity. (As should be appreciated, this assumes that the engine output is connected to a generator or alternator, as is common in a locomotive or other powered unit; thus, unless otherwise specified, the term "engine" refers to an engine system including an engine and alternator/generator.) If the engine 228, 230, 232 is turned off and does not generate electricity, then the engine 228, 230, 232 cannot generate electricity that is fed to one or more corresponding electric motors 234, 236, 238 in the remote power units 104, and the motors 234, 236, 238 may be unable to move the axles and wheels of the remote powered unit 104. (In this configuration, electric motors are connected to the vehicle axles, via a gear set, for moving the powered unit, while the engine is provided for generating electricity for electrically powering the motors.) In one embodiment, a remote powered unit 104 is turned "off" by directing the engine 228, 230, 232 in the remote powered unit 104 to cease or stop supplying tractive effort. For example, the remote powered unit 104 may be turned off by directing the engine 228, 230, 232 of the remote powered unit 104 to stop supplying electricity to the corresponding motor(s) 234, 236, 238 of the remote powered unit 104 that provide tractive effort for the remote powered unit 104.

In another embodiment, a remote powered unit 104 (shown in FIG. 1) may be turned off by completely shutting down the corresponding engine 228, 230, 232 of the remote powered unit 104. For example, the engine 228, 230, 232 may be shut down such that the engine 228, 230, 232 is no longer combusting, burning, or otherwise consuming fuel to generate electricity. A remote powered unit 104 may be changed to an "off" state by temporarily shutting down the engine 228, 230, 232 such that the engine 228, 230, 232 is no longer combusting, burning, or otherwise consuming fuel to generate electricity but for periodic or non-periodic and relatively short time periods where the engine 228, 230, 232 is changed to an "on" state in order to maintain a designated or predetermined engine temperature. The power that is supplied to the engine 228, 230, 232 during the short time periods may be sufficient to cause the engine 228, 230, 232 to combust some fuel while being insufficient to enable the engine 228, 230, 232 to provide tractive effort to the corresponding remote powered unit 104.

In one embodiment, the state of an engine 228, 230, 232 of a remote powered unit 104 (shown in FIG. 1) is changed to an "off" state when the power that is supplied by the engine 228, 230, 232 is reduced below a threshold at which an Automatic Engine Start/Stop (AESS) system assumes control of the powered or operating state of the engine 228, 230, 232. For example, the engine 228 of the remote powered unit 104 may be shut off by decreasing the power supplied by the engine 228 to the motor 234 until the supplied power falls below a predetermined threshold at which the AESS system takes over control of the engine 228 and determines when to turn the engine 228 completely off. Alternatively, the engines 228, 230, 232 of the remote powered units 104 may be individually turned on or off independent of an AESS system. For example, the engine 228, 230, 232 of a remote powered unit 110 may be turned on or off regardless of whether the engine 228, 230, 232 is susceptible to control by an AESS system.

The isolation control system 200 may remotely change the powered state of the engine(s) of one or more of the remote powered units 104 (shown in FIG. 1) in accordance with one or more of the embodiments described above. The isolation control system 200 includes a master isolation unit 202 and several slave controllers 204, 206, 208. In one embodiment, the master isolation unit 202 is disposed in the lead powered unit 102. Alternatively, only a part or subsection of the master isolation unit 202 is disposed in the lead powered unit 102. For example, a user interface 210 of the master isolation unit 202 may be located in the lead powered unit 102 while one or more other components of the master isolation unit 202 are disposed outside of the lead powered unit 102. The slave controllers 204, 206, 208 are disposed in one or more of the remote powered units 104. For example, the slave controller 204 may be located within the remote powered unit 104, the slave controller 206 may be disposed in the remote powered unit 106, and the slave controller 208 may be located at the remote powered unit 108. The number of slave controllers 204, 206, 208 in the isolation control system 200 may be different from the embodiment shown in FIG. 2. Similar to the master isolation unit 202, one or more components or parts of the slave controllers 204, 206, 208 may be disposed outside of the corresponding remote powered units 104. The master isolation unit 202 and/or slave controllers 204, 206, 208 may be embodied in one or more wired circuits with discrete logic components, microprocessor-based computing systems, and the like. As described below, the master isolation unit 202 and/or the slave controllers 204, 206, 208 may include microprocessors that enable the lead powered unit 102 (shown in FIG. 1) to remotely turn the remote powered units 104 on or off. For example, one or more microprocessors in the master isolation unit 202 and/or slave controllers 204, 206, 208 may generate and communicate signals between the master isolation unit and the slave controllers 204, 206, 208 that direct one or more of the corresponding engines 228, 230, 232 of the remote powered units 104 to change the powered state of the engines 228, 230, 232 between two or more of an "on" state or mode, an "off" state or mode, and/or an "idle" state or mode.

The master isolation unit 202 includes the user interface 210 that accepts input from an operator of the master isolation unit 202. For example, the user interface 210 may accept commands or directions from an engineer or other operator of the lead powered unit 102 (shown in FIG. 1). By way of non-limiting example only, the user interface 210 may be any one or more of a rotary switch, a toggle switch, a touch sensitive display screen, a keyboard, a pushbutton, a software application or module running on a processor-based computing device, and the like. The operator inputs an isolation command 212 into the user interface 210. The isolation command 212 represents a request by the operator to turn one or more of the remote powered units 104 on and/or to turn one or more of the remote powered units 104 off. The user interface 210 communicates the operator's request to a master isolation module 214.

The master isolation module 214 receives the operator's request from the user interface 210 and determines which ones of the remote powered units 104 (shown in FIG. 1) are to be turned on and/or which ones of the remote powered units 104 are to be turned off. For example, the isolation command 212 may request that a single remote powered unit 106 be turned off or on. Alternatively, the isolation command 212 may request that a group of the remote powered units 104 be turned on or off. For example, the isolation command 212 may select the remote powered units 104 in a selected consist group 116 and/or a distributed power group 118 (shown in FIG. 1) be turned off, on, or to idle. By way of non-limiting example only, the master isolation module 214 may be embodied in any one or more of hardwired circuitry, rotary, or other types, of switches, a microprocessor based device, a software application or module running on a computing device, a discrete logic device, and the like. Based on the operator's request communicated via the isolation command 212, the master isolation module 214 conveys an isolation instruction 216 to a master input/output (I/O) device 218.

The master I/O device 218 is a device that communicates the isolation instruction 216 to the remote powered units 104 (shown in FIG. 1) selected by the master isolation module 214. For example, if the isolation command 212 from the operator requests that one or more individual remote powered units 104 be turned off, on, or to idle, or that the remote powered units 104 in a selected consist or distributed power group 116, 118 be turned off, on, or to idle, the master I/O device 218 communicates the isolation instruction 216 to at least those remote powered units 104 selected by the isolation command 212. By way of non-limiting example only, the master I/O device 218 may be embodied in one or more of a connector port that is electronically coupled with one or more wires joined with the remote powered units 104 (such as a trainline), an RF transmitter, a wireless transceiver, and the like. In one embodiment, the master I/O device 218 conveys the isolation instruction 216 to all of the remote powered units 104 in the vehicle system 100 (shown in FIG. 1). While the illustrated embodiment shows the isolation instruction 216 being communicated in parallel to the slave controllers 204, 206, 208, the isolation instruction 216 may be serially communicated among the slave controllers 204, 206, 208. For example, the master I/O device 218 may serially convey the isolation instruction 216 to the remote powered units 104 along a trainline. The remote powered units 104 that are to be turned off, on, or to idle by the isolation instruction 216 receive the isolation instruction 216 and act on the isolation instruction 216. The remote powered units 104 that are not to be turned off, on, or to idle by the isolation instruction 216 ignore the isolation instruction 216. For example, the remote powered units 104 may include discrete logic components that are coupled with a trainline and that receive the isolation instruction 216 when the isolation instruction 216 relates to the remote powered units 104 and ignores the isolation instruction 216 when the isolation instruction 216 does not relate to the remote powered units 104.

In another embodiment, the master I/O device 218 broadcasts the isolation instruction 216 to all of the remote powered units 104 (shown in FIG. 1) in the vehicle system 100 (shown in FIG. 1). For example, the master I/O device 218 may include a wireless transceiver that transmits data packets comprising the isolation instruction 216 to the remote powered units 104. Alternatively, the master I/O device 218 may be an RF transmitter that transits a radio frequency signal that includes the isolation instruction 216. The remote powered units 104 may be associated with unique identifiers, such as serial numbers, that distinguish the remote powered units 104 from one another. The isolation instruction 216 may include or be associated with one or more of the unique identifiers to determine which of the remote powered units 104 are to receive and act on the isolation instruction 216. For example, if the unique identifier of a remote powered unit 104 matches an identifier stored in a header of a data packet of the isolation instruction 216 or communicated in the RF signal, then the remote powered unit 104 having the mating unique identifier receives and acts on the isolation instruction 216.

A slave input/output (I/O) device 220 receives the isolation instruction 216 from the master I/O device 218. By way of non-limiting example only, the slave I/O devices 220 may be embodied in one or more of a connector port that is electronically coupled with one or more wires joined with the lead powered unit 102 (such as a trainline), an RF transmitter, a wireless transceiver, and the like. The slave I/O devices 220 convey the isolation instruction 216 to a slave isolation module 222.

The slave isolation module 222 receives the isolation instruction 216 from the slave I/O device 220 and determines if the corresponding remote powered unit 104 (shown in FIG. 1) is to be turned off, on, or to idle in response to the isolation instruction 216. The slave isolation module 222 may include logic components to enable the slave isolation module 222 to determine whether the associated remote powered unit 104 (shown in FIG. 1) is to obey or ignore the isolation instruction 216. For example, the slave isolation modules 222 may include one or more of hardwired circuitry, relay switches, a microprocessor based device, a software application or module running on a computing device, and the like, to determine if the associated remote powered unit 104 is to act on the isolation instruction 216.

If the slave isolation module 222 determines that the corresponding remote powered unit 104 (shown in FIG. 1) is to be turned off, on, or to idle in response to the isolation instruction 216, then the slave isolation module 222 communicates an appropriate command 224 to an engine interface device 226. The engine interface device 226 receives the command 224 from the slave isolation module 222 and, based on the command 224, directs the engine 228, 230, 232 of the corresponding remote powered unit 104 to turn off, on, or to idle. For example, the engine interface device 226 associated with the remote powered unit 104 may communicate the command 224 to the engine 228 of the remote powered unit 104. By way of non-limiting example only, the engine interfaces 226 may be embodied in one or more of a connector port that is electronically coupled with the engines 228, 230, 232 via one or more wires. Upon receiving the command 224 from the engine interfaces 226, the engines 228, 230, 232 may change operational states from one of the on, off, or idle states or modes to another of the on, off, or idle states or modes. As described above, in one embodiment, the engines 228, 230, 232 may turn off or to idle and cease supplying electricity to a corresponding motor 234, 236, 238 in order to cause the motor 234, 236, 238 to supply or withhold application of tractive force. For example, if the engine 230 receives a command 224 directing the engine 230 to turn off or to idle and the engine 232 receives a command 224 directing the engine 232 to turn on, then the engine 230 shuts down and stops providing electricity to the motor 236, which in turn stops providing a tractive force to propel the vehicle system 100 (shown in FIG. 1), while the engine 232 turns on and begins supplying electricity to the motor 238 to cause the motor 238 to provide a tractive force to propel the vehicle system 100.

In one embodiment, the engine 228, 230, 232 turns off, on, or to idle within a predetermined time period. For example, an engine 228 that is used to supply tractive effort may shut off or to idle within a predetermined time period after the slave isolation module 222 receives the isolation instruction 216. The predetermined time period may be established or set by an operator of the system 200. The turning off, on, or to idle of the engine 228, 230, 232 within a predetermined time period after the slave isolation module 222 receives the isolation instruction 216 may permit an operator in the lead powered unit 102 (shown in FIG. 1) to send the isolation instruction 216 to the remote powered units 104 (shown in FIG. 1) to turn the engines 228, 230, 232 off or to idle immediately, or at least relatively soon after the isolation command 212 is input into the user interface 210. For example, the slave isolation modules 222 may turn the engines 228, 230, 232 off or to idle without waiting for the engines 228, 230, 232 to cool down to a threshold temperature.

The master isolation unit 202 may convey additional isolation instructions 216 to the slave controllers 204, 206, 208 during a trip. A trip includes a predetermined route between two or more waypoints or geographic locations over which the vehicle system 100 (shown in FIG. 1) moves. For example, an operator in the lead powered unit 102 (shown in FIG. 1) may periodically input isolation commands 212 into the master isolation unit 202 to vary the total amount of tractive force supplied by the powered units 102, 104 (shown in FIG. 1). The operator may vary the number and/or type of powered units 102, 104 being used to supply tractive force to propel the vehicle system 100 during the trip in order to account for various static or dynamically changing factors and parameters, such as, but not limited to, a speed limit of the vehicle system 100, a changing grade and/or curvature of the route 114 (shown in FIG. 1), the weight of the vehicle system 100, a distance of the trip, a distance of a segment or subset of the trip, a performance capability of one or more of the powered units 102, 104, a predetermined speed of the vehicle system 100, and the like.

Figure 3:
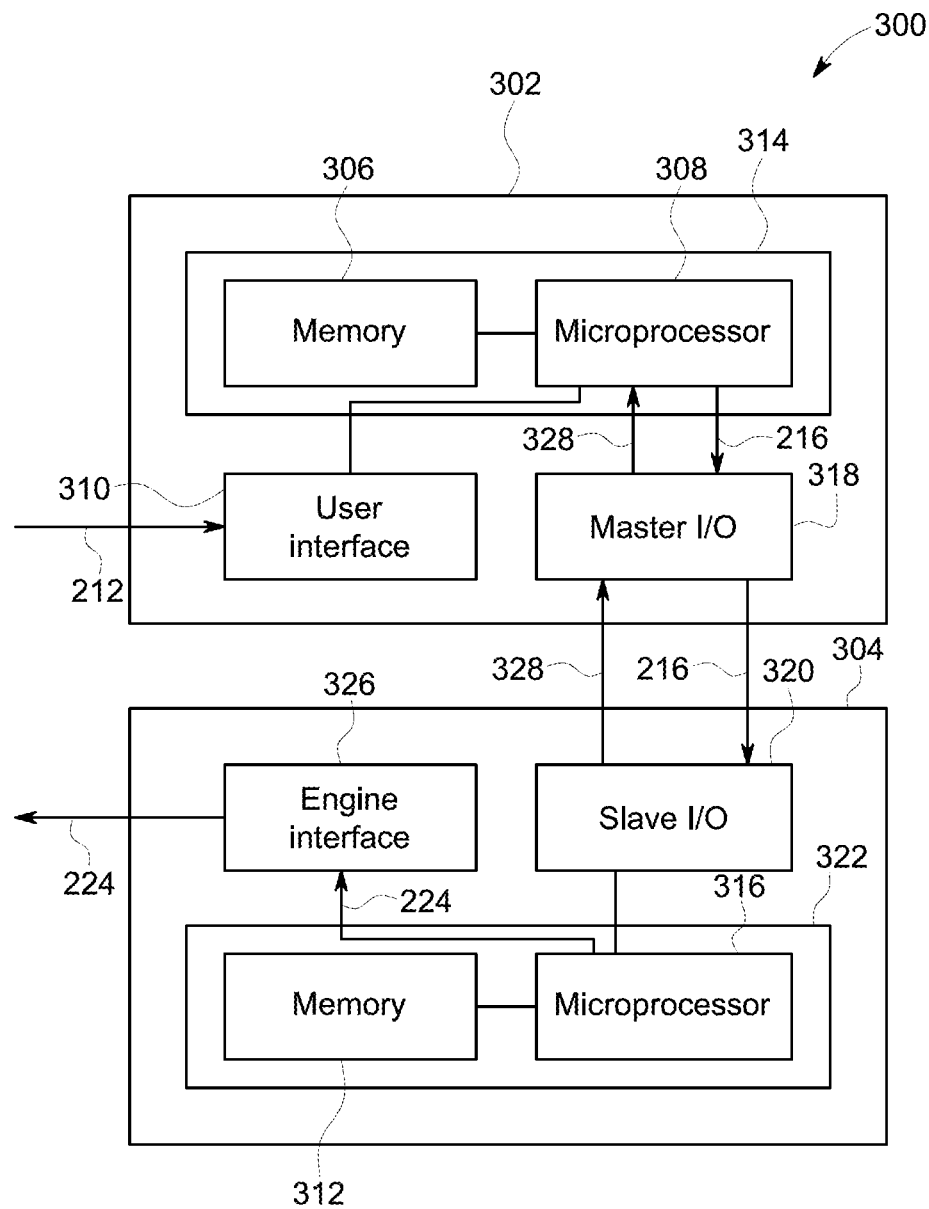
FIG. 3 is a schematic diagram of an isolation control system in accordance with another embodiment.

FIG. 3 is a schematic diagram of an isolation control system 300 in accordance with another embodiment. The control system 300 may be similar to the control system 200 (shown in FIG. 2). For example, the control system 300 may be used to remotely turn one or more remote powered units 104 (shown in FIG. 1) off, on, or to idle from the lead powered unit 102 (shown in FIG. 1). The control system 300 is a microprocessor-based control system. For example, the control system 300 includes one or more microprocessors 308, 320 that permit an operator to manually turn one or more of the remote powered units 104 off, on, or to idle. Additionally, the control system 300 may be utilized to automatically turn one or more of the remote powered units 104 off, on, or to idle.

The control system 300 includes a master isolation unit 302 and a slave controller 304. The master isolation unit 302 may be similar to the master isolation unit 202 (shown in FIG. 2). For example, the master isolation unit 302 includes a master isolation module 314, a user interface 310, and a master I/O device 318. The user interface 310 may be the same as, or similar to, the user interface 210 (shown in FIG. 2) and the master I/O device 318 may be the same as, or similar to, the master I/O device 218 (shown in FIG. 2). The master isolation module 314 includes a memory 306 and a microprocessor 308. The memory 306 represents a computer readable storage device or medium. The memory 306 may include sets of instructions that are used by the microprocessor 308 to carry out one or more operations. By way of example only, the memory 306 may be embodied in one or more of an electrically erasable programmable read only memory (EEPROM), a read only memory (ROM), a programmable read only memory (PROM), an erasable programmable read only memory (EPROM), or FLASH memory. The microprocessor 308 represents a processor, microcontroller, computer, or other electronic computing or control device that is configured to execute executing instructions stored on the memory 306. (Thus, unless otherwise specified, the term "microprocessor" includes any of the aforementioned devices.)

The slave controller 304 may be similar to one or more of the slave controllers 204, 206, 208 (shown in FIG. 2). For example, the slave controller 304 includes a slave isolation module 322, an engine interface 326, and a slave I/O device 320. The engine interface 326 may be the same as, or similar to, the engine interface 226 (shown in FIG. 2) and the slave I/O device 320 may be the same as, or similar to, the slave I/O device 220 (shown in FIG. 2). The slave isolation module 322 may include a memory 312 and a microprocessor 316. Alternatively, one or more of the slave controllers 304 in the remote powered units 104 (shown in FIG. 1) does not include memories 312 and/or microprocessors 316. The memory 312 may be the same as, or similar to, the memory 306 in the master isolation module 314 and the microprocessor 316 may be the same as, or similar to, the microprocessor 308 in the master isolation module 314.

In operation, the master isolation unit 302 remotely turns the engines 228, 230, 232 (shown in FIG. 2) off, on, or to idle in a manner similar to the master isolation unit 202 (shown in FIG. 2). The user interface 310 receives the isolation command 212 and communicates the isolation command 212 to the microprocessor 308 of the master isolation module 314. The master isolation module 314 receives the isolation command 212 and determines which remote powered units 104 (shown in FIG. 1) are to be turned off, on, or to idle based on the isolation command 212. The master isolation module 314 may query the memory 306 to determine which remote powered units 104 to turn off, on, or to idle. For example, if the isolation command 212 requests that the remote powered units 104 in a selected consist or distributed power group 116, 118 (shown in FIG. 1) be turned off or to idle, the microprocessor 308 may request a list of the remote powered units 104 that are in the selected consist or distributed power group 116, 118. The master isolation module 314 then sends the isolation instruction 216 to the master I/O device 318, which conveys the isolation instruction 216 to the selected remote powered units 104. For example, the microprocessor 308 may direct the master I/O device 318 to communicate the isolation instruction 216 only to the remote powered units 104 selected by the isolation command 212. In another example, the microprocessor 308 may embed identifying information in the isolation command 212. As described above, the identifying information may be compared to a unique identifier associated with each remote powered unit 104 to determine which of the remote powered units 104 are to act on the isolation instruction 216.

In one embodiment, the master isolation module 314 automatically generates the isolation instruction 216 and communicates the isolation instruction 216 to one or more of the remote powered units 104 (shown in FIG. 1). For example, the master isolation module 314 may determine a tractive effort needed or required to propel the vehicle system 100 (shown in FIG. 1) along a trip or a segment of the trip. The microprocessor 308 may calculate the required tractive effort from information and data stored in the memory 306. By way of example only, the microprocessor 308 may obtain and determine the required tractive effort based on the distance of the trip, the distance of one or more of the trip segments, the performance capabilities of one or more of the powered units 102, 104 (shown in FIG. 1), the curvature and/or grade of the route 114 (shown in FIG. 1), transit times over the entire trip or a trip segment, speed limits, and the like.

As the vehicle system 100 (shown in FIG. 1) moves along the route 114 (shown in FIG. 1) during the trip, the microprocessor 308 of the master isolation module 314 may adaptively generate and communicate isolation instructions 216 to the slave controllers 304 of the remote powered units 104 (shown in FIG. 1) to vary which of the remote powered units 104 are turned off, on, or to idle. During some segments of a trip, the required tractive effort may increase. For example, if the grade of the route 114 or the speed limit increases, the microprocessor 308 may determine that additional remote powered units 104 need to be turned on to increase the total tractive force provided by the powered units 102, 104 (shown in FIG. 1). The microprocessor 308 may automatically generate an isolation instruction 216 that turns on one or more remote powered units 104 that previously were turned off or to idle. Alternatively, during other segments of a trip, the required tractive effort may decrease. For example, if the grade of the route 114 or the speed limit decreases, the microprocessor 308 may determine that fewer remote powered units 104 are needed to propel the vehicle system 100. The microprocessor 308 may automatically generate an isolation instruction 216 that turns one or more remote powered units 104 off or to idle that previously were turned on. The selection of which remote, powered units 104 are turned on or off may be based on the performance capabilities of the remote powered units 104. The performance capabilities may include the tractive force provided by the various remote powered units 104, the rate at which the remote powered units 104 burn fuel, an exhaust emission of the remote powered units 104, an EPA Tier level of the remote powered units 104, the horsepower to weight ratio of the remote powered units 104, and the like.

The slave controllers 304 of one or more of the remote powered units 104 (shown in FIG. 1) receive the isolation instruction 216 and, based on the isolation instruction 216, turn the corresponding engines 228, 230, 232 (shown in FIG. 2) off, on, or to idle, similar to as described above. In one embodiment, the microprocessors 316 in the slave controllers 304 receive the isolation instruction 216 and determine if the isolation instruction 216 applies to the corresponding remote powered unit 104. For example, the microprocessor 316 may compare identifying information in the isolation instruction 216 to a unique identifier stored in the memory 312 and associated with the corresponding remote powered unit 104. If the identifying information and the unique identifier match, the microprocessor 316 generates and communicates the command 224 to the engine interface 326. As described above, the engine interface 326 receives the command 224 and turns the associated engine 228, 230, 232 off, on, or to idle based on the command 224.

In one embodiment, the slave controller 304 of one or more of the remote powered units 104 (shown in FIG. 1) provides feedback 328 to the master isolation unit 302. Based on the feedback 328, the master isolation unit 302 may automatically generate and communicate isolation instructions 216 to turn one or more of the remote powered units 104 off, on, or to idle. Alternatively, the master isolation unit 302 may determine a recommended course of action based on the feedback 328 and report the recommended course of action to an operator. For example, the master isolation unit 302 may display several alternative courses of action on a display device that is included with or communicatively coupled with the user interface 310. An operator may then use the user interface 310 to select which of the courses of action to take. The master isolation module 314 then generates and communicates the corresponding isolation instruction 216 based on the selected course of action.

The feedback 328 may include different amounts of fuel that are consumed or burned by the remote powered units 104 (shown in FIG. 1). For example, the microprocessor 316 in at least one of the remote powered units 104 may calculate the various amounts of fuel that will be consumed by the powered units 102, 104 (shown in FIG. 1) of the vehicle system 100 (shown in FIG. 1) over a time period with different combinations of the powered units 102, 104 turned off, on, or to idle. In one embodiment, a microprocessor 316 in each consist group 116 (shown in FIG. 1) and/or distributed power group 118 (shown in FIG. 1) calculates the amount of fuel that will be consumed by the vehicle system 100 with the remote powered units 104 in the corresponding consist or distributed power group 116, 118 turned on and the amount of fuel that will be consumed by the vehicle system 100 with the remote powered units 104 in the consist or distributed power group 116, 118 turned off or to idle. The calculated amounts of fuel are conveyed to the slave I/O device 320 and reported to the master isolation unit 302 as the feedback 328. Based on the feedback 328, the master isolation unit 302 determines whether to turn off, on, or to idle one or more of the remote powered units 104. For example, each consist group 116 and/or distributed power group 118 may provide feedback 328 that notifies the master isolation unit 302 of the different amounts of fuel that will be consumed if the various groups 116, 118 are turned off, on, or to idle. The microprocessor 308 in the master isolation unit 302 examines the feedback 328 and may generate automated isolation instructions 216 to turn one or more of the remote powered units 104 off, on, or to idle based on the feedback 328.

As described above and as an alternative to microprocessor-based remote control of which remote powered units 104 (shown in FIG. 1) are turned off, on, or to idle, the control system 200 (shown in FIG. 2) may use various circuits and switches to communicate the isolation instructions 216 (shown in FIG. 2) and to determine whether particular remote powered units 104 are to act on the isolation instructions 216. By way of example only, the powered units 102, 104 (shown in FIG. 1) may include rotary switches that are joined with a trainline extending through the vehicle system 100. Based on the positions of the rotary switches, the remote powered units 104 may be remotely turned off, on, or to idle from the lead powered unit 102. For example, if the rotary switches in each of the lead powered unit 102 and the remote powered units 104,106 are in a first position while the rotary switches in the remote powered units 108, 110 are in a second position, then the isolation instruction 216 is acted on by the remote powered units 104, 106 while the remote powered units 108, 110 ignore the isolation instruction 216.

Figure 4:
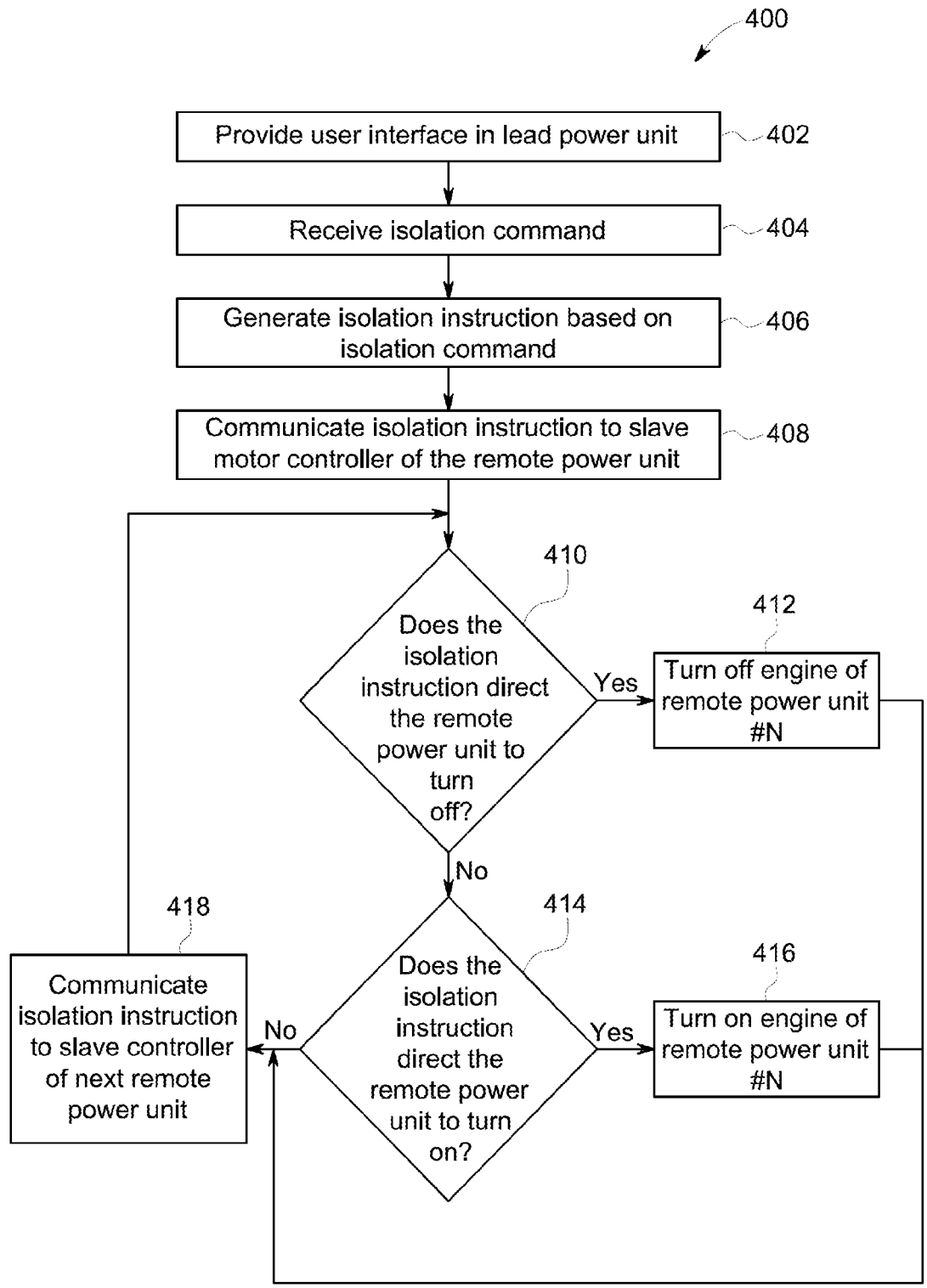
FIG. 4 is a flowchart for a method of controlling a rail vehicle system that includes a lead powered unit and a remote powered unit in accordance with one embodiment.

FIG. 4 is a flowchart for a method 400 of controlling a train that includes a lead powered unit and a remote powered unit in accordance with one embodiment. For example, the method 400 may be used to permit an operator in the lead powered unit 102 (shown in FIG. 1) to remotely turn one or more of the remote powered units 104 (shown in FIG. 1) off, on, or to idle. At 402, a user interface is provided in the lead powered unit. For example, the user interface 210, 310 (shown in FIGS. 2 and 3) may be provided in the lead powered unit 102. The master isolation unit 202, 302 (shown in FIGS. 2 and 3) also may be provided in the lead powered unit 102. At 404, an isolation command is received by the user interface. For example, the isolation command 212 may be received by the user interface 210 or 310.

At 406, an isolation instruction is generated based on the isolation command. For example, the isolation instruction 216 (shown in FIG. 2) may be generated by the master isolation module 214, 314 (shown in FIGS. 2 and 3) based on the isolation command 212. At 408, 410, 412, 414, 416, 418, the isolation instruction is communicated to the slave controllers of the remote powered units in a serial manner. For example, the isolation instruction 216 is serially communicated among the remote powered units 104 (shown in FIG. 1). Alternatively, the isolation instruction 216 is communicated to the slave controllers 204, 206, 208, 304 (shown in FIGS. 2 and 3) of the remote powered units 104 in parallel.

At 408, the isolation instruction is communicated to the slave controller of one of the remote powered units. For example, the isolation instruction 216 (shown in FIG. 2) may be communicated to the slave controller 204, 304 (shown in FIGS. 2 and 3) of the remote powered unit 104 (shown in FIG. 1). At 410, the isolation instruction is examined to determine if the isolation instruction directs the slave controller that received the isolation instruction to turn the engine of the corresponding remote powered unit off or to idle. If the isolation instruction does direct the slave controller to turn the engine off or to idle, flow of the method 400 continues to 412. At 412, the engine of the remote powered unit is turned off or to idle, and flow of the method 400 continues to 418. On the other hand, if the isolation instruction does not direct the slave controller to turn the engine off or to idle, flow of the method 400 continues to 414. For example, the isolation instruction 216 may be examined by the slave isolation module 222, 322 (shown in FIGS. 2 and 3) of the remote powered unit 104 to determine if the isolation instruction 216 directs the remote powered unit 104 to turn off or to idle. If the isolation instruction 216 directs the remote powered unit 104 to turn off or to idle, the slave controller 204, 304 directs the engine 228 (shown in FIG. 2) of the remote powered unit 104 to turn off or to idle. Otherwise, the slave controller 204, 304 does not direct the engine 228 to turn off or to idle.

At 414, the isolation instruction is examined to determine if the isolation instruction directs the slave controller that received the isolation instruction to turn on the engine of the corresponding remote powered unit. If the isolation instruction does direct the slave controller to turn on the engine, flow of the method 400 continues to 416. At 416, the engine of the remote powered unit is turned on. For example, the isolation instruction 216 (shown in FIG. 2) may be examined by the slave isolation module 222, 322 (shown in FIGS. 2 and 3) of the remote powered unit 104 (shown in FIG. 1) to determine if the isolation instruction 216 directs the remote powered unit 104 to turn on. If the isolation instruction 216 directs the remote powered unit 104 to turn on, the slave controller 204, 304 directs the engine 228 (shown in FIG. 2) of the remote powered unit 104 to turn on. On the other hand, if the isolation instruction does not direct the slave controller to turn the engine on, flow of the method 400 continues to 418.

At 418, the isolation instruction is communicated to the slave controller of the next remote powered unit. For example, after being received and examined by the slave controller 204, 304 (shown in FIGS. 2 and 3) of the remote powered unit 104 (shown in FIG. 1), the isolation instruction 216 is conveyed to the slave controller 204, 304 of the remote powered unit 106 (shown in FIG. 1). Flow of the method 400 may then return to 410, where the isolation instruction is examined by the next remote powered unit in a manner similar to as described above. The method 400 may continue in a loop-wise manner through 410-418 until the remote powered units have examined and acted on, or ignored, the isolation instruction.

In another embodiment, the method 400 does not communicate and examine the isolation instructions in a serial manner through the remote powered units. Instead, the method 400 communicates the isolation instruction to the remote powered units in a parallel manner. For example, each of the remote powered units 104 (shown in FIG. 1) may receive the isolation instruction 216 (shown in FIG. 2) in parallel and act on, or ignore, the isolation instruction 216 in a manner described above in connection with 410, 412, 414.

Figure 5:
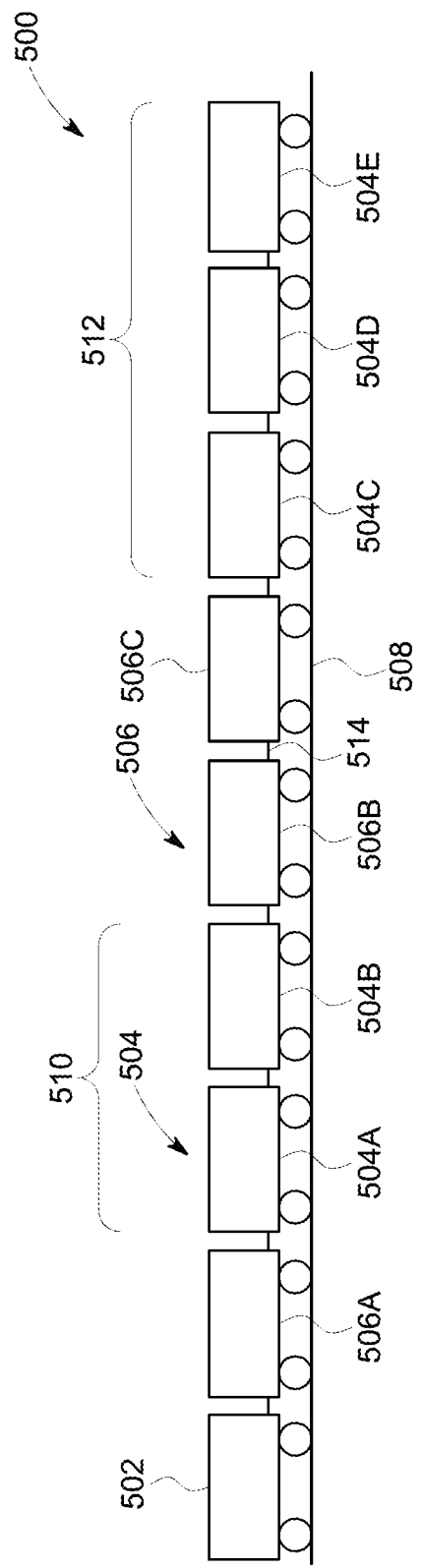
FIG. 5 is a schematic illustration of another embodiment of a vehicle system.

FIG. 5 is a schematic illustration of another embodiment of a vehicle system 500. The vehicle system 500 is shown as being a train, but alternatively may be formed from one or more other types of vehicles. The vehicle system 500 may be similar to the vehicle system 100 shown in FIG. 1 and can include a lead vehicle or powered unit 502 coupled with several remote vehicles or powered units 504 and non-powered vehicles or units 506. The lead vehicle 502 and remote vehicles 504 may be referred to as powered vehicles or powered units as the lead vehicle 502 and remote vehicles 504 are capable of generating tractive efforts for self propulsion. For example, the lead vehicle 502 and remote vehicles 504 may be locomotives traveling along a route 508 (e.g., a track). The non-powered vehicles 506 may be incapable of generating tractive efforts for self propulsion. For example, the non-powered vehicles 506 may be cargo cars that carry goods and/or persons along the route 508. As shown in FIG. 1, the remote vehicles 504 are referred to by the reference number 504 and individually referred to by reference numbers 504a, 504b, 504c, and so on. Similarly, the non-powered vehicles 506 are referred to by the reference number 506 and individually referred to by reference numbers 506a, 506b, and 506c. The number of vehicles 502, 504, 506 shown in FIG. 5 is provided as an example and is not intended to limit all embodiments of the subject matter described herein.

The remote vehicles 504 are arranged in motive power groups to define vehicle consists 510, 512. The remote vehicles 504 in a consist 510 and/or 512 may be mechanically and/or logically linked together to provide tractive effort and/or braking effort to propel and/or stop movement of the vehicle system 500. In one embodiment, the lead vehicle 502 coordinates control of the remote vehicles 504 in the consists 510, 512 to control a net or total tractive effort and/or braking effort of the vehicle system 500. For example, the vehicle system 500 may operate in a distributed power (DP) mode of operation where the lead vehicle 502 remotely directs the tractive efforts and/or braking efforts of the remote vehicles 504 in the consists 510, 512 from the lead vehicle 502. In the illustrated embodiment, the lead vehicle 502 is interconnected with, but spaced apart from, the consists 510, 512 by one or more non-powered vehicles 506.

The lead vehicle 502 and the remote vehicles 504 are communicatively coupled with each other by one or more wired and/or wireless connections or communication links. As used herein, the term "communicatively coupled" means that two components are able to communicate (e.g., transmit and/or receive) data with each other by wired and/or wireless connections. For example, the lead vehicle 502 may communicate with one or more of the remote vehicles 504 via a wireless network. Alternatively, or additionally, the lead vehicle 502 may be conductively coupled with the remote vehicles 504 by one or more tangible communication pathways 514, such as conductive wires or cables (e.g., multiple unit or MU cable bus), fiber optic cables, and the like. As described below, the lead vehicles 502 and the remote vehicles 504 may communicate with each other using electrically powered communication devices. The communication devices can include transceivers and/or antennas that communicate data (e.g., network or packetized data or non-network data) between each other through one or more of the communication links between the communication devices.

One or more of the communication devices in the consists 510, 512 may be powered by the remote vehicles 504. For example, each of the remote vehicles 504 in the consists 510, 512 can include a propulsion subsystem that generates electric current to, among other things, power traction motors to propel the vehicle system 500 and/or power communication devices disposed on-board the remote vehicles 504. Alternatively, one or more of the communication devices in the consists 510, 512 may be powered from an off-board power source, such as a source of electric current that is not located on the vehicle system 500. For example, the communication devices may receive electric current from a utility power grid via an overhead catenary, a powered third rail, or the like.

During travel of the vehicle system 500 along the route 514 for a trip, the vehicle system 500 may demand less tractive effort than can be provided by the coordinated efforts of the lead powered unit 502 and the remote powered units 504. For example, the vehicle system 500 may be traveling ahead of a schedule and may need to slow down to be back on schedule, the vehicle system 500 may be traveling down a decline in the route 514, the vehicle system 500 may have burned fuel and/or dropped off cargo such that the weight of the vehicle system 500 is less and less tractive effort is required to propel the vehicle system 500, and the like. In order to provide less tractive effort, one or more of the remote powered units 504 may turn off or to idle, such as by deactivating the propulsion subsystem on the remote powered unit 504 so that the propulsion subsystem is not generating electric current to power traction motors and/or a communication device on the remote powered unit 504.

In one embodiment, one or more of the remote powered units 504 may switch from an on mode of operation to an off or idle mode of operation while the vehicle system 500 is moving along the route 514. In the on mode, the propulsion subsystem of a remote powered unit 504 is turned on and activated such that the propulsion subsystem generates electric current to power propulsion devices (e.g., traction motors) that provide tractive effort and/or a communication device disposed on-board the remote powered unit 504. In the off mode, the propulsion subsystem of the remote powered unit 504 may be turned off and deactivated such that the propulsion subsystem does not generate electric current to power the propulsion devices and/or the communication device. As a result, a communication link between the communication device of the remote powered unit 504 that is in the off mode and the lead powered unit 502 may be broken or interrupted.

Alternatively, in the off mode of operation, the propulsion subsystem of a remote powered unit 504 may be placed into idle instead of turned off and deactivated. As described above, in an idle mode, the propulsion subsystem can remain active to produce electric current to power a communication device such that a communication link between the consist that includes the remote powered unit 504 and the lead powered unit 502 remains active, but the propulsion subsystem does not produce electric current to propel the remote powered unit 504. For example, the propulsion subsystem may not produce sufficient electric current to power traction motors that propel the remote powered unit 504.

As described above, the lead powered unit 502 may control or direct the tractive efforts of the remote powered units 504 in the consists 510, 512 by sending instructions to the communication devices of one or more of the remote powered units 504 in the consists 510, 512. When one or more of the remote powered units 504 in a consist 510 and/or 512 are switched to the off or idle mode of operation, at least one of the communication devices of the remote powered units 504 in the consist 510 and/or 512 remains on and powered such that the lead powered unit 502 can continue to communicate with the remote powered units 504 in the consists 510, 512 that are operating in the on mode of operation.

For example, if the remote powered unit 504A of the consist 510 switches to the off or idle mode of operation, the other remote powered unit 504B in the consist 510 may remain in the on mode of operation so that the communication device of the remote powered unit 504B can continue to communicate with the lead powered unit 502 and the lead powered unit 502 can continue to control the tractive efforts and/or braking efforts of the remote powered unit 504B. In another example, if the remote powered units 504C and 504E of the consist 512 switch to the off or idle mode of operation, the other remote powered unit 504D in the consist 512 may remain in the on mode of operation so that the communication device of the remote powered unit 504D can continue to communicate with the lead powered unit 502 and the lead powered unit 502 can continue to control the tractive efforts and/or braking efforts of the remote powered unit 504D.

In one embodiment, when one or more remote powered units 504 of the vehicle system 500 switch to the off or idle mode of operation, at least one remote powered unit 504 in each consist 510, 512 remains in the on mode of operation to power at least one communication device in each consist 510, 512. For example, at least one communication device continues to receive electric current generated by a remote powered unit 504 such that the lead powered unit 502 can continue to issue control instructions to the remote powered units 504 in the on mode of operation. The remote powered unit 504 in each consist 510, 512 that remains in the on mode of operation may be the same remote powered unit 504 that has the communication device that communicates with the lead powered unit 502 to receive the control instructions from the lead powered unit 502 to remotely control tractive efforts and/or braking efforts of the remote powered unit 504. For example, if the remote powered unit 504C has the communication device that is configured to receive control instructions from the lead powered unit 502, then the remote powered unit 504C may remain in the on mode of operation while the remote powered unit 504D and/or the remote powered unit 504E turn to the off or idle mode of operation. By "remotely control," it is meant that the lead powered unit 502 controls the remote powered units 504 from a location that is disposed off-board the remote powered units 504.

Alternatively, the remote powered unit 504 in each consist 510, 512 that remains in the on mode of operation may be a different remote powered unit 504 that has the communication device that communicates with the lead powered unit 502 to receive the control instructions from the lead powered unit 502 to remotely control tractive efforts and/or braking efforts of the remote powered unit 504. For example, if the remote powered unit 504C has the communication device that is configured to receive control instructions from the lead powered unit 502, then the remote powered unit 504D and/or the remote powered unit 504E may remain in the on mode of operation and supply electric current to the communication device to power the communication device (e.g., through one or more conductive pathways extending between the remote vehicles) while the remote powered unit 504C switches to the off or idle mode of operation.

In one embodiment, by keeping at least one communication device of each consist 510, 512 on and activated, one or more remote powered units 504 in the consist 510 and/or 512 may switch to the off or idle mode of operation while the communication device can continue to receive control instructions from the lead powered unit 502 for the remote powered units 504 that are in the on mode of operation. The vehicle system 500 can continue to travel along the route 514 with different remote powered units 504 switching between on and off or idle modes of operation to, among other things, reduce the fuel consumed by the vehicle system 500.

Figure 6:
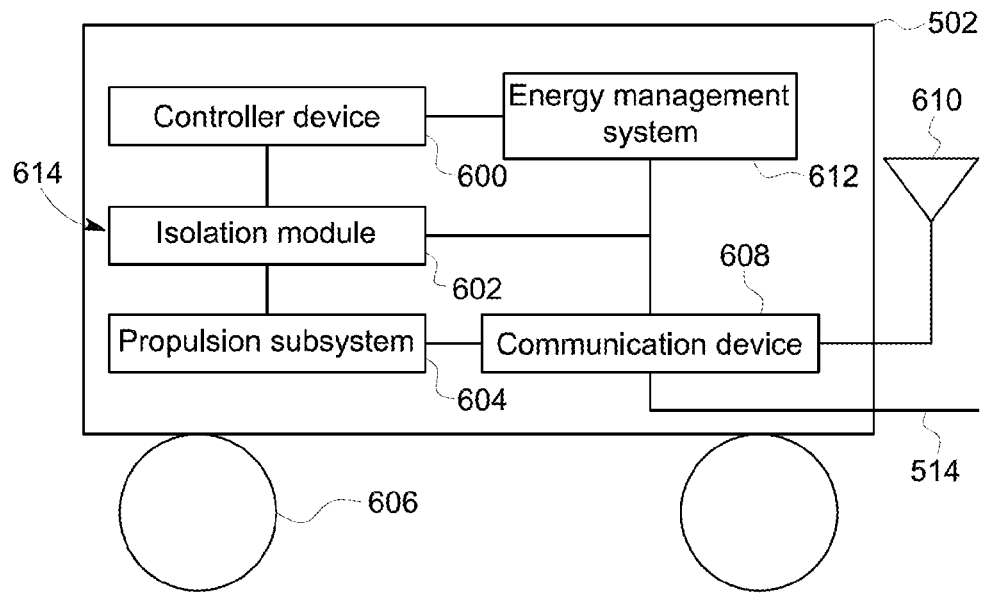
FIG. 6 is a schematic illustration of one embodiment of a lead powered unit in the vehicle system shown in FIG. 5.

FIG. 6 is a schematic illustration of one embodiment of the lead powered unit 502 in the vehicle system 500 shown in FIG. 5. The lead powered unit 502 includes a controller device 600 that forms the control instructions used to direct the tractive efforts and/or braking efforts of the remote powered units 504 (shown in FIG. 1). For example, in a DP operation of the vehicle system 500, the controller device 600 can form data messages that are communicated to the remote powered units 504 and that direct the remote powered units 504 to change the tractive efforts and/or braking efforts provided by the remote powered units 504. The controller device 600 can include one or more input/output devices that enable a human operator to manually control the tractive efforts and/or braking efforts of the lead powered unit 502 and/or remote powered units 504.

The lead powered unit 502 includes an isolation control system 614 that can be used to electrically isolate one or more remote powered units 504 (shown in FIG. 1) in the consist 510 and/or 512 (shown in FIG. 1). In one embodiment, the isolation control system 614 may be similar to the isolation control systems 200, 300 (shown in FIGS. 2 and 3). In the illustrated embodiment, the isolation control system 614 includes an isolation module 602 and a communication device 608. The isolation module 602 determines which remote powered units 504 (shown in FIG. 1) to switch between the on, off, and/or idle modes of operation, and/or when to switch the mode of operation of the remote powered units 504. The isolation module 602 can make this determination based on a variety of factors. In one embodiment, the isolation module 602 can decide to turn one or more of the remote powered units 504 to the off or idle mode of operation based on an amount of fuel carried by the vehicle system 500. For example, the isolation module 602 may determine that a first remote powered unit 504 is to be turned to the off or idle mode of operation while at least a second remote powered unit 504 remains in the on mode of operation such that the first remote powered unit 504 maintains at least a threshold volume or amount of fuel for use by the propulsion subsystem on the first remote powered unit 504. The isolation module 602 may keep the second remote powered unit 504 in the on mode of operation until the volume or amount of fuel carried by the second remote powered unit 504 reaches the same or a different threshold volume or amount of fuel. The isolation module 602 can then switch the first remote powered unit 504 to the on mode of operation and the second remote powered unit 504 to the off or idle mode of operation.

The isolation module 602 can continue to switch which remote powered units 504 are in the on mode of operation and which remote powered units 504 are in the off or idle mode of operation to achieve a desired distribution of fuel being carried by the remote powered units 504 along the length of the vehicle system 500. For example, the isolation module 602 can vary which remote powered units 504 are in the different modes of operation for different periods of time such that the amount of fuel carried by each remote powered unit 504 is within a predetermined percentage or fraction of each other (e.g., and the distribution of fuel being carried is approximately equal or balanced throughout the length of the vehicle system 500). Alternatively, the isolation module 602 may change the modes of operation over time such that a subset of the remote powered units 504 located in a particular area of the vehicle system 500 (e.g., the consist 510) carry a different amount of fuel relative to a different subset of the remote powered units 504 in a different area of the vehicle system 500 (e.g., the consist 512). A distribution of fuel being carried by the remote powered units 504 along the length of the vehicle system 500 may be expressed as a volume or amount of fuel carried by the remote powered units 504 at each location of the remote powered units 504 in the vehicle system 500. For example, such a distribution may be expressed as "First Remote Powered Unit 504A carrying 5,000 pounds of fuel; Second Remote Powered Unit 504B carrying 3,000 pounds of fuel; Third Remote Powered Unit 504C carrying 4,000 pounds of fuel" and so on.

The lead powered unit 502 includes a propulsion subsystem 604 that provides tractive effort and/or braking effort of the lead powered unit 502. As described below in connection with the remote powered units 504 (shown in FIG. 1), the propulsion subsystem 604 can include an engine that consumes fuel to rotate a shaft connected to an electrical alternator or generator, which generates electric current to power traction motors of the lead powered unit 502. The traction motors can rotate axles and/or wheels 606 of the lead powered unit 502 to propel the lead powered unit 502. The propulsion subsystem 604 can include brakes (e.g., air brakes or regenerative/resistive brakes) that slow or stop movement of the lead powered unit 502.

The lead powered unit 502 includes the communication device 608 that communicates with one or more of the remote powered units 504 (shown in FIG. 1). For example, the communication device 608 may transmit the control instructions from the controller device 600 to the remote powered units 504 so that the lead powered unit 502 can control the tractive efforts and/or braking efforts of the remote powered units 504. The communication device 608 may include a transceiver device or transmitter that is conductively coupled with the communication pathway 514 (e.g., a cable bus or MU cable bus). The communication device 608 can communicate the control instructions to the remote powered units 504 through the communication pathway 514. Alternatively or additionally, the communication device 608 may be coupled with an antenna 610 to wirelessly transmit the control instructions to the remote powered units 504, such as over a wireless network between the antenna 610 and the remote powered units 504.

In one embodiment, the controller device 600 may cause a responsive action to be taken when a communication interruption event occurs. A communication interruption event can occur when a communication link between the communication device 608 and one or more of the consists 510, 512 (shown in FIG. 1) is interrupted or broken. For example, if the communication device 608 loses or is otherwise unable to communicate control instructions with communication devices of the consists 510, 512 such that the controller device 600 is unable to continue remotely controlling the remote powered units 504 in the consists 510, 512, then the controller device 600 may cause a responsive action to be taken. A "broken" or "interrupted" communication link may be more than a temporary or transient interruption in communication. For example, a broken or interrupted communication link may exist when the lead powered unit 502 transmits one or more control instructions to a remote powered unit 504 and does not receive a confirmation or response from the remote powered unit 504 within a predetermined period of time, such as within one second, ten seconds, one minute, four minutes, or the like.

The responsive action that is taken may be a penalty or an emergency response, such as to apply brakes of the lead powered unit 502, remote powered units 504, and/or non-powered powered units 506 (shown in FIG. 1) to stop or slow movement of the vehicle system 500. The responsive action can be taken to avoid an accident if the controller device 600 loses the ability to communicate with one or more of the remote powered units 504 in the consists 510, 512.

In the illustrated embodiment, the lead powered unit 502 includes an energy management system 612 that determines operational settings of the vehicle system 500 (e.g., the tractive efforts and/or braking efforts of one or more of the powered units 502, 504 shown in FIG. 5) during a trip of the vehicle system 500. Alternatively, the energy management system 612 may be disposed off-board the powered unit 502, such as on another powered unit of the vehicle system, a non-powered unit of the vehicle system, or at a dispatch facility or other location. These operational settings may be designated as a function of one or more of distance along the route 514 and/or time elapsed during the trip. A trip of the vehicle system 500 includes the travel of the vehicle system 500 along the route 514 (shown in FIG. 1) from a starting location to a destination location, as described above. The trip plan may dictate or establish various tractive efforts and/or braking efforts of the different vehicles in a vehicle system for different portions or segments of the trip of the vehicle system. For example, the trip plan may include different throttle settings and/or brake settings for the lead vehicle and remote vehicles of the vehicle system during various segments of the trip. The trip plan may be based on a trip profile that includes information related to the vehicle system 500, the route 514, the geography over which the route 514 extends, and other information in order to control the tractive efforts and/or braking efforts of one or more of the lead powered unit 502 and/or remote powered units 504.

The energy management system 612 can communicate the trip plan with the controller device 600 and/or the isolation module 602 to change the tractive efforts and/or braking efforts provided by the remote powered units 504 as the vehicle system 500 travels according to the trip plan. For example, if the vehicle system 500 is approaching a steep incline and the trip profile indicates that the vehicle system 500 is carrying significantly heavy cargo, then the trip plan of the energy management system 612 may direct one or more of the lead powered unit 502 and/or the remote powered units 504 to increase the tractive efforts supplied by the respective vehicle. Conversely, if the vehicle system 500 is carrying a smaller cargo load based on the trip profile, then the trip plan of the energy management system 612 may direct the lead powered unit 502 and/or remote powered units 504 to increase the supplied tractive efforts by a smaller amount than the tractive efforts would otherwise be increased if the data indicated a heavier cargo load.

In one embodiment, the trip plan may be used to automatically and/or manually control actual operational settings of the vehicle system. For example, the energy management system can generate control signals that are based on the operational settings designated by the trip plan. These control signals may be communicated to the propulsion subsystem of the powered units of the vehicle system to cause the powered units to autonomously follow the operational settings of the trip plan. Alternatively or additionally, the control signals may be communicated to an output device onboard one or more of the powered units. The control signals may cause the output device to inform an operator of the one or more powered units of the designated operational settings of the trip plan. The operator may then manually implement the designated operational settings.

The trip plan formed by the energy management system 612 can be based on the trip profile, which can include information and factors such as changes in the route 514 (shown in FIG. 1) that the vehicle system 500 (shown in FIG. 1) travels along, regulatory requirements (e.g., emission limits) of the regions through which the vehicle system 500 travels, and the like, and based on the trip profile. In one embodiment, the energy management system 612 includes a software application such as the Trip Optimizer™ software application provided by General Electric Company, to control propulsion operations of the vehicle system 500 during the trip in order to reduce fuel consumption of the vehicles and/or to reduce wear and tear on the vehicle system 500.

The trip profile can be based on, or include, trip data, vehicle data, route data, and/or updates to the trip data, the vehicle data, and/or the route data. Vehicle data includes information about the powered units 502, 504 (shown in FIG. 1) and/or cargo being carried by the vehicle system 500 (shown in FIG. 1). For example, vehicle data may represent cargo content (such as information representative of cargo being transported by the vehicle system 500) and/or vehicle information (such as model numbers, fuel efficiencies, manufacturers, horsepower, and the like, of locomotives and/or other railcars in the vehicle system 500).

Trip data includes information about an upcoming trip by the vehicle system 500 (shown in FIG. 1). By way of example only, trip data may include a trip profile of an upcoming trip of the vehicle system 500 (such as information that can be used to control one or more operations of the powered units 502, 504, such as tractive and/or braking efforts provided during an upcoming trip), station information (such as the location of a beginning station where the upcoming trip is to begin, the location of refueling stops or locations, and/or the location of an ending station where the upcoming trip is to end), restriction information (such as work zone identifications, or information on locations where the route is being repaired or is near another route being repaired and corresponding speed/throttle limitations on the vehicle system 500), and/or operating mode information (such as speed/throttle limitations on the vehicle system 500 in various locations, slow orders, and the like).

Route data includes information about the route 514 (shown in FIG. 1) upon which the vehicle system 500 (shown in FIG. 1) travels. The route data may alternatively be referred to as map data. For example, the route data can include information about locations of damaged sections of the route 514, locations of sections of the route 514 that are under repair or construction, the curvature and/or grade of the route 514, GPS coordinates of the route 514, and the like. The route data is related to operations of the vehicle system 500 as the route data includes information about the route 514 that the vehicle system 500 is or will be traveling on.

The energy management system 612 can determine which of the remote powered units 504 (shown in FIG. 1) to turn to the off or idle mode of operation when the vehicle system 500

(shown in FIG. 1) is traveling along the route 514 (shown in FIG. 1) based on the trip plan. The energy management system 612 may examine an upcoming portion of the route 514 and the associated trip plan and, based on the upcoming portion and/or the trip plan, determine that one or more of the remote powered units 504 can be switched from the on mode of operation to the off or idle mode of operation. For example, if the energy management system 612 examines the trip profile and determines that an upcoming portion of the route 514 includes a decline and, as a result, less tractive effort is required to travel down the decline, the energy management system 612 may decide to at least temporarily turn one or more of the remote powered units 504 to the off or idle mode of operation when the vehicle system 500 traverses the decline. The one or more remote powered units 504 can be turned to the off or idle mode of operation to conserve fuel that would otherwise be consumed by the one or more remote powered units 504.

As another example, the energy management system 612 may determine that an upcoming portion of the route 514 (shown in FIG. 1) includes an incline and that additional weight of the vehicle system 500 (shown in FIG. 1) may assist in the wheels 606 (shown in FIG. 2) of the lead powered unit 502 and remote powered units 504 (shown in FIG. 1) gripping the surface of the route 514 (e.g., the rails of a track). The energy management system 612 can decide to turn one or more of the remote powered units 504 to the off or idle mode of operation prior to the vehicle system 500 reaching the incline. The one or more remote powered units 504 may be turned off or to idle such that less fuel is consumed by the remote powered units 504 and the one or more remote powered units 504 will be carrying the weight of the fuel that otherwise would be consumed when the one or more remote powered units 504 reach the incline. This weight of the fuel that otherwise would be consumed can assist the wheels 606 of the vehicle system 500 in gripping the surface of the route 514 during the incline in order to reduce slippage of the wheels 606 on the route 514. For example, the energy management system 612 may keep one or more of the remote powered units 504 in the off or idle mode of operation such that one or more of the remote powered units 504 has sufficient fuel weight to provide at least a threshold grip on a surface that is traversed by the vehicle system 500. One or more of the remote powered units 504 may be later switched to the on mode of operation to provide additional tractive effort to the vehicle system 500 to traverse the incline.

As another example, the energy management system 612 can determine which of the remote powered units 504 (shown in FIG. 1) to turn to the on mode and which of the remote powered units 504 to turn to the off or idle mode over time to balance or alternate fuel usage by different ones of the remote powered units 504. The energy management system 612 may control or alternate which remote powered units 504 are in the different modes of operation so that at least a subset or fraction of the remote powered units 504 has sufficient fuel to propel the vehicle system 504 when needed for an upcoming portion of the trip.

As another example, the energy management system 612 can determine which of the remote powered units 504 (shown in FIG. 1) to turn to the on mode and which of the remote powered units 504 to turn to the off or idle mode based on a fuel efficiency of one or more of the remote powered units 504. The term "fuel efficiency" can mean a fuel economy or thermal efficiency of a remote powered unit 504. For example, a first remote powered unit 504 that has a greater fuel efficiency than a second remote powered unit 504 may consume less fuel than the second remote powered unit 504 to provide the same amount of horsepower or electric energy (e.g., as measured in terms of watts).

The energy management system 612 may determine which remote powered units 504 (shown in FIG. 1) to turn to the on, off, or idle modes based on the fuel efficiency of one or more of the remote powered units 504 by examining the fuel efficiencies of the remote powered units 504 recorded within the energy management system 612, a remaining distance left to a destination location of the trip of the vehicle system 500 (shown in FIG. 1), and/or horsepower of one or more of the remote powered units 504. For example, a trip may include flat terrain (e.g., terrain having undulations or peaks that rise above sea level of no greater than 300 meters or 984 feet), hilly terrain (e.g., terrain having undulation or peaks that rise above sea level more than 300 meters or 984 feet but less than 610 meters or 2,001 feet), and/or mountainous terrain (e.g., terrain having undulations or peaks that rise above sea level more than 610 meters or 2,001 feet). The energy management system 612 may change which remote powered units 504 are turned on, off, or to idle based on the type of terrain, the fuel efficiencies of the remote powered units 504, and how far the vehicle system 500 is to the end of the trip.

Table 1 below provides an example of how the energy management system 612 may turn different remote powered units 504 (shown in FIG. 1) on or off during a trip. The first column of Table 1 indicates the different numbered segments, or portions, of the trip. The second column of Table 1 indicates the type of terrain in the corresponding segment (e.g., flat, hilly, or mountainous). The third column of Table 1 indicates the miles of the trip encompassed by the corresponding segment. The fourth column indicates the operating state of a first remote powered unit 504 (e.g., on for operating in the on mode of operation and off for operating in the off mode of operation) for the corresponding segment. The fifth column indicates the operating state of a second remote powered unit 504 for the corresponding segment. In this example, the first remote powered unit 504 may have a greater fuel efficiency than the second remote powered unit 504, but produces one half of the horsepower of the second remote powered unit 504 (e.g., 2,000 HP versus 4,000 HP) and only has enough fuel to propel the vehicle system 500 for 800 miles (or 1,287 kilometers).

TABLE 1

| Segment No. | Terrain Type | Miles (Kilometers) of Trip | First Remote Vehicle Mode | Second Remote Vehicle Mode |
| --- | --- | --- | --- | --- |
| 1 | Flat | 0 to 500 miles | on | off |
| 2 | Hilly | 501 miles to 510 miles | off | on |
| 3 | Mountainous | 511 miles to 520 miles | on | on |
| 4 | Flat | 520 miles to 900 miles | on until low on fuel, then off | off until first remote vehicle is low on fuel, then on |
| 5 | Mountainous | 901 miles to 920 miles | on | on |
| 6 | Flat | 921 miles to 1,000 miles | off or out of fuel | on |

In the example illustrated in Table 1, the energy management system 612 changes which of the remote powered units 504 (shown in FIG. 1) is turned on or off during different segments of the trip. During the first relatively long, and flat, segment, only the more efficient first remote powered unit 504 is turned on. During the second relatively short, hilly segment, the first remote powered unit 504 may be turned off to conserve fuel of the first remote powered unit 504 while the second remote powered unit 504 generates tractive effort to propel the vehicle system 500. During the relatively short and mountainous third segment, both the first and second remote powered units 504 are turned on. During the long fourth and flat segment, the first remote vehicle is on until the first remote vehicle is low on fuel (e.g., the fuel reserves on the first remote vehicle fall to or below a threshold amount), at which point the first remote vehicle is turned off and the second remote vehicle is turned on. The first remote vehicle can be turned back on during the short fifth segment that traverses mountainous terrain. During the final sixth segment, the first remote vehicle may be turned off or may be out of fuel. The second remote vehicle can remain on to propel the vehicle system to the destination of the trip.

Additionally or alternatively, the energy management system 612 may identify which powered units 502, 504 may be turned off during the entire duration of the trip prior to the vehicle system 500 embarking on the trip. For example, the vehicle system 500 may include more tractive effort capability than what is needed to propel the vehicle system 500 through the trip to the destination location of the trip. Such an excess of tractive effort capability may be represented by an excess of available horsepower that can be provided by the powered units 502, 504 relative to the horsepower that is demanded to traverse the route 514 during the trip.

In order to identify the excess of tractive effort capability of the vehicle system 500, the energy management system 612 may use the trip data, vehicle data, and/or route data to calculate a demanded tractive effort. The demanded tractive effort can represent the amount of tractive effort (e.g., horsepower) that is calculated to be needed to propel the vehicle system 500 over the route 514 to the destination location of the trip. The demanded tractive effort for a trip can increase for trips that include more inclined segments of the route 514 and/or segments of the route 514 having steeper inclines than other trips, for trips being traveled by vehicle systems 500 that are heavier than other vehicle systems 500, for trips that involve more periods of acceleration (e.g., such as after coming out of a curved segment of the route 514 and entering a more straight segment of the route 514) than other trips, and the like. Conversely, the demanded tractive effort for a trip can decrease for trips that include less inclined segments of the route 514 and/or segments of the route 514 having smaller inclines than other trips, for trips being traveled by lighter vehicle systems 500, for trips that involve fewer periods of acceleration than other trips, and the like.

The energy management system 612 may calculate the demanded tractive effort of a trip based on the physics of the vehicle system 500 traveling along the route 514, taking into account the size (e.g., length and/or weight) of the vehicle system 500, the distribution (e.g., location) of the powered units 502, 504 along the length of the vehicle system 500, the curvature and/or grade of the route 514, a scheduled time of arrival at the destination location of the trip, and the like. In one embodiment, the energy management system 612 uses one or more of the techniques described in U.S. patent application Ser. No. 11/750,716, which was filed on 18 May 2007 (the "'716 application"). For example, the energy management system 612 can determine the demanded tractive effort using one or more of the equations and objective functions of the optimal control formulations described in the '716 application. The entire disclosure of the '716 application is incorporated by reference.

The energy management system 612 may calculate the operational settings that are to be used to get the vehicle system 500 to travel over the route 514 and arrive at the destination location at or before the scheduled time of arrival, or within a designated time period of the scheduled time of arrival. For example, although the vehicle system 500 may be able to travel to the destination location using less tractive effort, doing so may cause the vehicle system 500 to be late or significantly late to arrive at the destination location. As a result, the energy management system 612 can restrict the trip plan to cause the vehicle system 500 to use sufficient tractive effort to arrive at the destination location on time.

The energy management system 612 can calculate the demanded tractive effort based on previous runs of the vehicle system 500 over the route 514. For example, if the same or similar vehicle system 500 traveled over the route 514 for a previous trip, then the tractive efforts used to propel the vehicle system 500 that were logged (e.g., recorded) for the previous trip may be examined and used to generate the demanded tractive effort for the present trip. Alternatively, the demanded tractive effort for a trip may be a designated amount or several designated amounts associated with different segments of the trip.

The energy management system 612 also can determine the tractive effort capability of the vehicle system 500. The tractive effort capability of the vehicle system 500 represents the available tractive effort (e.g., horsepower) that can be provided by the powered units 502, 504 of the vehicle system 500 to propel the vehicle system 500 for the trip. For example, a vehicle system 500 including three locomotives that each are capable of producing 4,000 horsepower, then the tractive effort capability of the vehicle system 500 can be 12,000 horsepower. The tractive effort capability of the vehicle system 500 may be modified by one or more factors such as the age of one or more of the powered units 502, 504 (e.g., with the tractive effort capability being decreased by one or more designated or variable amounts with increasing age of one or more of the powered units 502, 504), the health of one or more of the powered units 502, 504 (e.g., the with tractive effort capability being decreased by designated or variable amounts based on damage, wear and tear, or other deterioration to the propulsion subsystems of the powered units 502, 504), and the like.

The energy management system 612 compares the demanded tractive effort of the trip with the tractive effort capability of the vehicle system 500 to determine if an excess of available tractive effort exists. For example, if the tractive effort capability exceeds the demanded tractive effort, then such an excess is identified. If the tractive effort capability does not exceed the demanded tractive effort, then no excess tractive effort capability may exist.

When an excess in tractive effort capability exists, the energy management system 612 can compare the excess to the tractive effort capabilities of the powered units 502, 504. For example, the energy management system 612 can compare the excess to the tractive effort capability (e.g., horsepower) of each individual powered unit 502, 504 or of groups of two or more of the individual powered units 502, 504. If the tractive effort capability of an individual powered unit 502, 504 or a group of powered units 502, 504 is less than or equal to the excess of tractive effort capability of the vehicle system 500, then the energy management system 612 may select that individual powered unit 502, 504 or group as a selected powered unit 502, 504 or group of powered units 502, 504.

The selected powered unit 502, 504 or the selected group of powered units 502, 504 represents the powered unit or units 502, 504 that can be turned (as described above) to the off state or mode of operation for the duration of the trip while still allowing the vehicle system 500 to have sufficient tractive effort capability to complete the trip (e.g., reach the destination location at a scheduled time of arrival or within a designated time period of the scheduled time of arrival). As described above (e.g., in connection with the system 100 and the system 500), the turning off of the selected powered unit 502, 504 or group of powered units 502, 504 may be performed remotely, such as from the lead powered unit 102, 502. For example, the energy management system 612 can automatically generate the isolation command 212 (shown in FIG. 2) that identifies the selected powered unit 502, 504 or group of powered units 502, 504.

As described above, upon receipt of the isolation command 212, the isolation control system 614 may remotely turn off the selected powered units 502, 504 or the selected group of powered units 502, 504. For example, the isolation control system 614 may communicate the isolation instruction 216 (shown in FIG. 2) that is transmitted to the selected powered units 502, 504 and/or the selected group of powered units 502, 504 in order to turn those powered units 502, 504 to an off state or mode. The communication of the isolation instruction 216 may occur automatically or manually, such as by notifying the operator of the vehicle system of the selected powered unit 502, 504 or group of powered units 502, 504 and directing the operator to turn the selected powered unit 502, 504 or group of powered units 502, 504 to the off state or mode. This may occur prior to the vehicle system leaving on the trip so that the selected powered units 502, 504 or selected group of powered units 502, 504 are off for all or substantially the entire trip. As a result, the vehicle system may travel according to the operational settings designated by the trip plan with the selected powered units 502, 504 or the selected group of powered units 502, 504 being off, which can result in savings in fuel and/or reductions in emissions generated by the vehicle system.

In one embodiment, the energy management system 612 may identify which powered units 502, 504 may be turned to the idle mode during the entire duration of the trip prior to the vehicle system 500 embarking on the trip. As described above, the vehicle system 500 may include more tractive effort capability than what is needed to propel the vehicle system 500 through the trip to the destination location of the trip, such as a final destination location. In order to identify the excess of tractive effort capability of the vehicle system 500, the energy management system 612 may use the trip data, vehicle data, and/or route data to calculate a demanded tractive effort, also as described above.

When an excess in tractive effort capability exists, the energy management system 612 can compare the excess to the tractive effort capabilities of the powered units 502, 504 in order to identify one or more selected powered units or a selected group of powered units, as described above. The selected powered unit or the selected group of powered units can represent the powered unit or units that can be turned to the idle mode for the duration of the trip while still allowing the vehicle system 500 to have sufficient tractive effort capability to complete the trip. The turning of the selected powered unit 502, 504 or group of powered units 502, 504 to the idle mode may be performed remotely, such as from the lead powered unit 102, 502. For example, the energy management system 612 can automatically generate the isolation command 212 (shown in FIG. 2) that identifies the selected powered unit 502, 504 or group of powered units 502, 504.

Upon receipt of the isolation command 212, the isolation control system 614 may remotely turn the selected powered units 502, 504 or the selected group of powered units 502, 504 to the idle mode. This may occur prior to the vehicle system leaving on the trip so that the selected powered units 502, 504 or selected group of powered units 502, 504 are in the idle mode for all or substantially the entire trip. As a result, the vehicle system may travel according to the operational settings designated by the trip plan with the selected powered units 502, 504 or the selected group of powered units 502, 504 being idle, which can result in savings in fuel and/or reductions in emissions generated by the vehicle system.

The determination of which powered units 502, 504 are in the idle mode for a trip may be determined by the energy management system 612 in creating a trip plan for a trip of the vehicle system along a route. A first trip plan may be created for the trip, where the first trip plan directs one or more powered units 502, 504 to remain in the idle mode for the entire trip (e.g., from a starting location to a final destination location). During travel of the vehicle system along the route according to the trip plan, one or more unplanned events may cause the vehicle system to deviate from following the operational settings that are designated by the trip plan. For example, an operator of the vehicle system may manually override automatic implementation of the trip plan by the vehicle system to perform an unplanned slowing or stopping of the vehicle system. As another example, automatically implemented speed restrictions (e.g., restrictions on the speed of the vehicle system that are controlled from off-board the vehicle system) may cause the vehicle system to slow down or stop in contravention to the designated operations of the trip plan. The causes for such unplanned slowing or stopping can be many, such as the operator slowing the vehicle system when the vehicle system approaches a section of the route under repair, where the trip plan was created without the knowledge of the repair.

The energy management system 612 can identify the unplanned slowing or stopping of the vehicle system based on manual input from an operator and/or based on data or signals from one or more sensors (e.g., speed sensors, positioning systems, and the like, of the vehicle system). In response to identifying the unplanned slowing or stopping of the vehicle system, the energy management system 612 can modify the trip plan. For example, the energy management system 612 can re-plan the first trip plan into a revised trip plan. The revised trip plan may include different operational settings than the first trip plan in order to achieve one or more goals of the trip. As one example, the first trip plan may have been created so that the vehicle system would arrive at a destination location at a scheduled arrival time or within a designated time period. Due to the unplanned slowing or stopping of the vehicle system, however, the first trip plan may need to be modified in order to enable the vehicle system to still arrive at the destination location at the scheduled arrival time or within the designated time period. For example, the designated speeds, tractive efforts, accelerations, and the like, of the first trip plan may need to be increased in the revised trip plan to cause the vehicle system to travel faster toward the destination location relative to the first trip plan over one or more segments of the route.

Because one or more of the powered units 502, 504 being placed into the idle mode by the first trip plan, however, the tractive effort capability of the vehicle system may be insufficient to implement the revised trip plan. For example, the maximum available horsepower from the powered units in the vehicle system that are in an on mode (and not off or in idle) may not be sufficient to accelerate the vehicle system sufficiently fast to follow the revised trip plan and to arrive at the destination location at the scheduled arrival time or within the designated time period. The energy management system 612 can examine the tractive effort (e.g., horsepower or other measure of tractive effort and/or acceleration) that is available from the powered units that are not in idle or off from the first trip plan (e.g., the tractive effort capability of the current state of the vehicle system). The energy management system 612 can determine a demanded tractive effort of the revised trip plan. For example, the energy management system 612 can calculate the motive power that is needed to propel the vehicle system according to the operational settings of the revised trip plan over the remainder of the trip. The demanded tractive effort and the tractive effort capability can be compared by the energy management system 612 to determine if additional tractive effort is needed and, if so, how much additional tractive effort is needed.

If additional tractive effort is needed to perform the revised trip plan, the energy management system 612 can examine the tractive effort capabilities of the powered units that are in the idle mode to determine how many of the powered units can be activated (e.g., switched from the idle mode to on, or an active, propulsion-generating mode) to provide additional tractive effort. The energy management system 612 can examine the tractive effort capability that is individually provided by each of the powered units that were off or in idle during the first trip plan (e.g., the trip plan used prior to the unplanned slowing or stopping). The energy management system 612 can select one or several of these powered units to be temporarily turned to on (e.g., to an active, propulsion-generating mode) to provide the additional tractive effort that is needed to perform the revised trip plan.

As one example, if the revised trip plan directs the vehicle system to accelerate to a designated speed (following the slowing or stopping of the vehicle system) within a distance along the route (e.g., before reaching a designated location), the energy management system 612 may determine that, in addition to the horsepower provided by the powered units that are in the on mode or state, an additional 2000 HP may be necessary from one or more of the powered units in the idle mode in order to cause the vehicle system to accelerate to the designated speed within the distance. The energy management system 612 can identify at least one of the powered units in the idle mode that can generate at least the additional 2000 HP. The energy management system 612 may select this powered unit to be temporarily turned to the on, propulsion-generating mode.

The energy management system 612 communicates the selected powered unit to be temporarily turned on to the isolation module 602. By "temporarily," it is meant that the powered unit is to be turned on from idle for a portion, but not the entirety, of the remaining distance of the trip. Alternatively, based on the tractive effort demanded by the remainder of the trip by the revised trip plan, the energy management system 612 may communicate one or more selected powered units to be turned on for the remainder of the trip to the isolation module 602.

The isolation module 602 communicates a signal to the selected powered unit that is to be turned on from the idle mode. For example, the isolation module 602 may communicate an activation signal to the selected powered unit. Upon receipt of this signal, the selected powered unit may be activated such that the powered unit is turned to the active, propulsion-generating mode from idle. The selected powered unit may then produce tractive effort to assist the vehicle system in accelerating as directed by the revised trip plan.

The energy management system 612 may direct the isolation module 602 to turn one or more of the powered units to the idle mode once the vehicle system achieves the designated speed of the trip plan. For example, the energy management system 612 may direct the isolation module 602 to turn the same selected powered unit or units (e.g., those that previously were turned from idle to on) back to the idle mode. The isolation module 602 can then communicate isolation signals to this same selected powered unit to turn the powered unit to the idle mode when the vehicle system accelerates to the designated speed of the revised trip plan following the unplanned slowing or stopping described above. For example, once the vehicle system has resumed traveling according to the revised trip plan, the additional tractive effort provided by the powered unit that was turned from idle to the active, propulsion-generating mode may no longer be needed to propel the vehicle system along the route according to the trip plan. In order to reduce fuel consumed by the vehicle system, emissions generated by the vehicle system, wear and tear on the vehicle system, and the like, the powered unit may be remotely turned back to the idle mode.

Alternatively, the energy management system 612 may direct the isolation module 602 to turn one or more different powered unit or units to the idle mode. For example, a vehicle system may include first, second, and third powered units. For a first trip plan, the energy management system 612 may select the second powered unit as being in the idle mode for the entirety of the trip. Due to an unplanned slowing or stopping of the vehicle system (e.g., a slowing or stopping that was not included in the first trip plan), the energy management system 612 modifies the first trip plan into a revised trip plan that needs the additional tractive effort provided by the second powered unit. As described above, the energy management system 612 and the isolation module 602 cause the second powered unit to be turned to the active, propulsion-generating mode to cause the second powered unit to provide the additional tractive effort that is needed to implement the revised trip plan (e.g., to get the vehicle system up to a designated speed of the revised trip plan). Once the vehicle system reaches the designated speed, instead of turning the second powered unit back to the idle mode, however, the energy management system 612 may decide to turn the first and/or third powered units to the idle mode. The energy management system 612 may determine that another one of the powered units should be turned to the idle mode due to the tractive effort requirements for a remaining portion of the trip. For example, less tractive effort may be needed to complete the trip plan, so the energy management system 612 may decide to turn the first and/or third powered unit to idle to conserve fuel and/or emissions. Based on this determination, the isolation module 602 can turn the one or more powered units to idle, as described above.

The powered unit or units that are turned to idle after the vehicle system accelerates and reaches the designated speed of the revised trip plan may remain in idle for the remainder of the trip. Alternatively, one or more of these powered units may again be turned back to the on mode if the vehicle system is again slowed or stopped in contravention to the trip plan. For example, if the vehicle system makes another unplanned slowing or stopping, one or more powered units may be activated to again assist in accelerating the vehicle system, as described above.

The energy management system 612 may limit when a powered unit can be activated to the on mode from the idle mode based on a remaining amount of a trip that is being traveled by the vehicle system. For example, if the vehicle system is relatively close to the final destination of the trip (e.g., within a designated time period or distance) when the unplanned slowing or stopping occurs, the energy management system 612 may not allow for the re-planning of the trip plan and/or the temporary turning of one or more powered units from idle to the on mode, as described above. The energy management system 612 may prevent such re-planning of the trip plan and/or the temporary activation of the powered units because the benefits of obtaining the additional tractive efforts from the powered units that are activated from idle may be outweighed by the costs of doing so. For example, the time savings that are achieved for a relatively small portion of a trip by activating a powered unit from the idle mode may be outweighed (e.g., have a lower priority or greater cost) than the additional fuel that is consumed and/or emissions that are generated by activating the powered unit.

One or more of the controller device 600, the isolation module 602, and/or the energy management system 612 may represent a hardware and/or software system that operates to perform one or more functions. For example, the controller device 600, the isolation module 602, and/or the energy management system 612 may include one or more computer processors, controllers, or other logic-based devices that perform operations based on instructions stored on a tangible and non-transitory computer readable storage medium, such as a computer memory. Alternatively, the controller device 600, the isolation module 602, and/or the energy management system 612 may include a hard-wired device that performs operations based on hard-wired logic of the device. The controller device 600, the isolation module 602, and/or the energy management system 612 shown in FIG. 2 may represent the hardware that operates based on software or hard-wired instructions, the software that directs hardware to perform the operations, or a combination thereof.

Figure 13A:
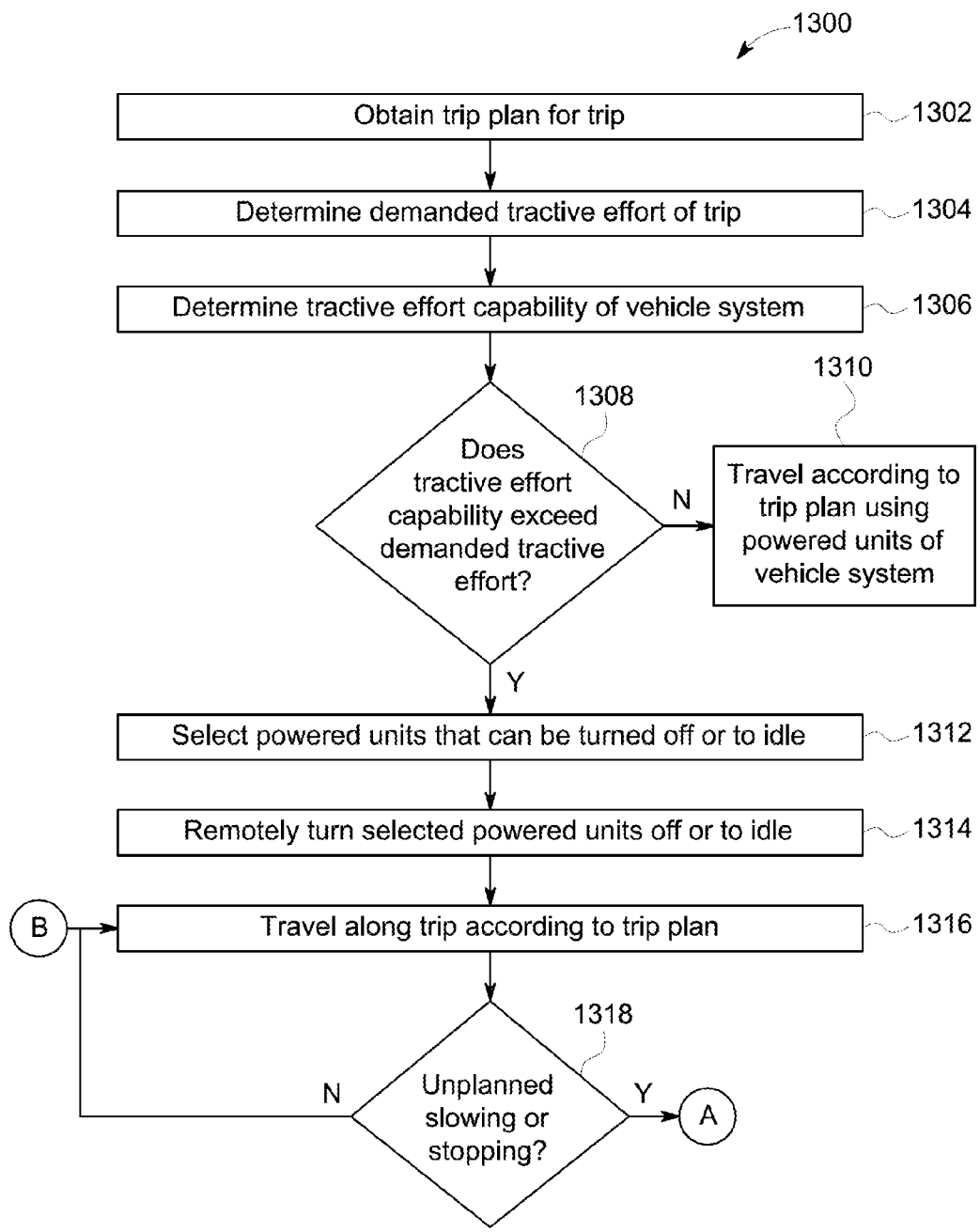
FIGS. 13A and 13B show a flowchart of one embodiment of a method for remotely turning powered units of a vehicle system from idle to an on, or active, propulsion-generating mode, during travel along a route.
Figure 13B:
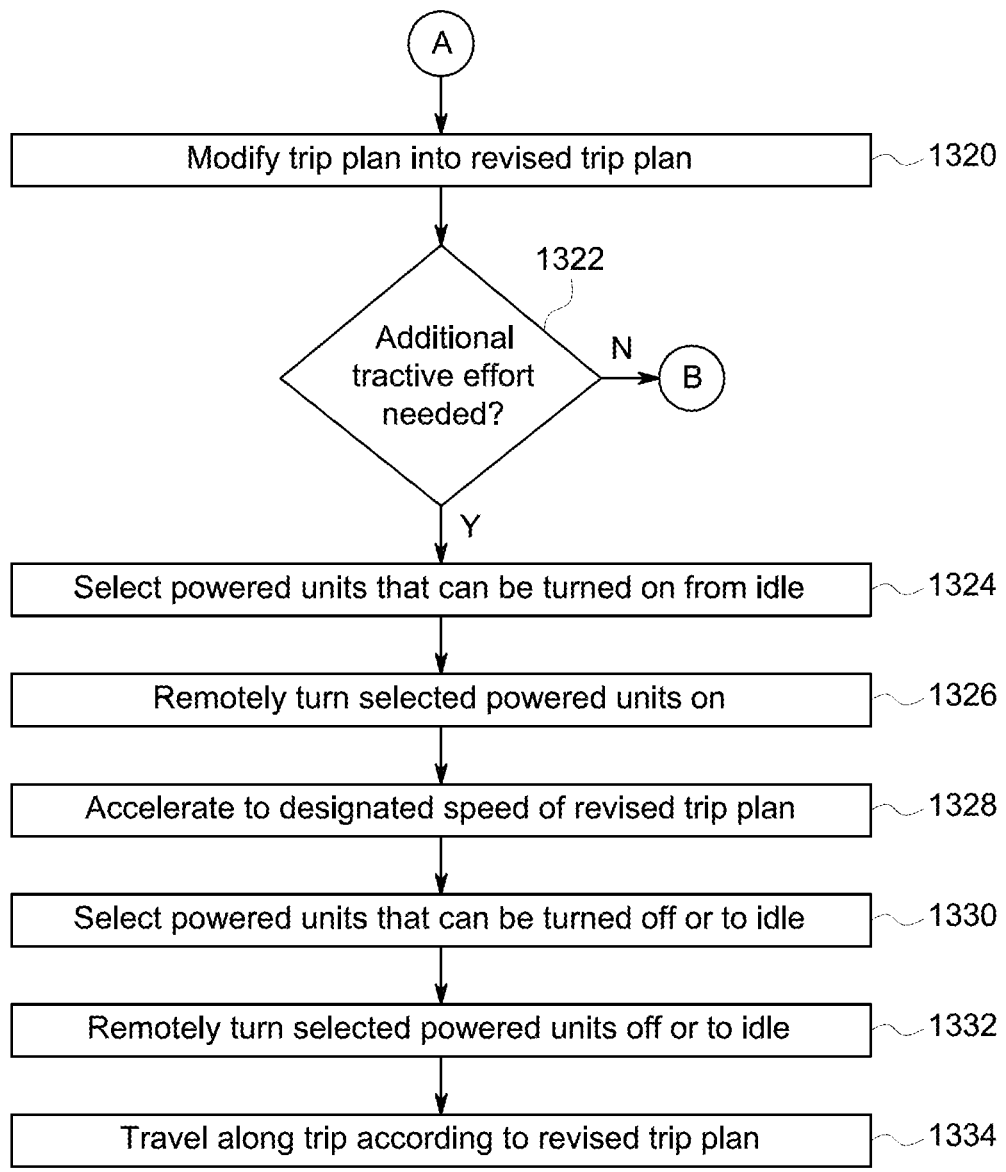

FIGS. 13A and 13B show a flowchart of one embodiment of a method 1300 for remotely turning powered units of a vehicle system from idle to an on, or active, propulsion-generating mode, during travel along a route. The method 1300 may be used in conjunction with one or more embodiments of the vehicle systems described herein.

At 1302, a trip plan for the vehicle system to travel along a trip is obtained. The trip plan may be created by the energy management system onboard the vehicle or may be acquired (e.g., received) by the energy management system from an off-board location.

At 1304, a demanded tractive effort of the vehicle system for the trip is determined. As described above, the demanded tractive effort can represent the amount of work, such as horsepower, that is needed to cause the vehicle system to travel along the route for the duration of the trip. The demanded tractive effort can be based on a variety of factors, such as a size (e.g., length) of the vehicle system; the weight of the vehicle system; the weight distribution of the vehicle system; the type, number, and/or size of powered units in the vehicle system; the distribution of powered units in the vehicle system; the grades of the route; the curvatures of the route; weather conditions (e.g., wind speed and direction); and the like.

At 1306, a tractive effort capability of the powered units in the vehicle system is determined. As described above, the tractive effort capability can represent the amount of tractive effort (e.g., horsepower) that the powered units of the vehicle system can provide. The tractive effort capability may be impacted by a variety of factors, such as age of the powered units, repair history of the powered units, type of propulsion subsystems of the powered units, and the like.

At 1308, a determination is made as to whether the tractive effort capability of the vehicle system exceeds the demanded tractive effort of the trip plan. For example, a comparison between the horsepower that can be generated by the powered units in the vehicle system is compared to the tractive effort needed to complete the trip plan. If there is more tractive effort capability than the tractive effort that is demanded (e.g., the tractive effort capability exceeds the demanded tractive effort by more than a designated amount), then an excess in tractive effort may exist. Such an excess may result in unnecessary consumption of additional fuel, unnecessary generation of additional emissions, and/or unnecessary wear and tear on one or more of the powered units of the vehicle system. If no such excess is found, flow of the method 1300 may proceed to 1310. On the other hand, if an excess in tractive effort capability is found, then flow of the method 1300 can proceed to 1312.

At 1310, the vehicle system travels along the route for the trip according to the trip plan. For example, if an insufficient amount of excess tractive effort capability exists, then the vehicle system may travel according to the trip plan with the powered units providing tractive effort to propel the vehicle system.

At 1312, one or more powered units are selected to be switched from the on mode to the off or idle mode. For example, as an excess in tractive effort capability exists, then one or more of the powered units may be turned off or switched to an idle mode so that the powered units do not provide tractive effort to propel the vehicle system. The powered units that are selected to be turned off or to idle can be selected based on the individual tractive effort capabilities of the powered units, as described above. For example, the one or more powered units that are selected to be turned off or to idle may be selected such that the total tractive effort capability of the selected powered units does not exceed the excess in tractive effort capability of the vehicle system.

At 1314, the selected powered units are remotely switched to the off mode or to idle. As described above, these powered units can be turned off or to idle from a location that is off-board the selected powered units, such as from another powered unit in the vehicle system. The selected powered units can be turned off or to idle prior to the vehicle system embarking on the trip. Alternatively, the selected powered units can be turned off or to idle during movement of the vehicle system during the trip.

At 1316, the vehicle system travels along the route according to the trip plan. The vehicle system travels with the one or more selected powered units being off or in the idle mode. In one embodiment, the vehicle system may travel for the remainder of the trip with the one or more selected powered units being off or in the idle mode. In another embodiment, the vehicle system may activate one or more of the selected powered units due to unplanned events (e.g., events that are not included in the trip plan and/or are not considered when the trip plan was created).

At 1318, a determination is made as to whether an unplanned event, such as an unplanned slowing or stopping of the vehicle system, occurs. For example, movement of the vehicle system can be monitored to determine of the vehicle system slows down or stops when such slowing down or stopping is not included in the trip plan. If no such unplanned event occurs, then the vehicle system can continue to travel along the route according to the trip plan. As a result, flow of the method 1300 can return to 1316. On the other hand, if an unplanned event (e.g., slowing or stopping) occurs, then flow of the method 1300 continues to 1320 (shown in FIG. 3B).

At 1320, the trip plan is modified to account for the unplanned event. For example, the trip plan may be modified into a revised trip plan that directs the vehicle system to accelerate from the slowed or stopped state to a designated speed so that the vehicle system can continue to travel toward and reach a destination location at a scheduled arrival time or within a designated time period of the scheduled arrival time.

At 1322, a determination is made as to whether the revised trip plan will require additional tractive effort (e.g., in addition to the tractive effort capability of the powered units that are currently in the on mode and not off or in the idle mode). For example, the tractive effort capability of the powered units that are in the on mode can be compared to a demanded tractive effort of the revised trip plan. If the tractive effort capability of the powered units that are on is at least as great as the demanded tractive effort (or if the tractive effort capability exceeds the demanded tractive effort by at least a designated amount), then the vehicle system may have sufficient tractive effort capability with the powered units that are on to accelerate as required by the revised trip plan. As a result, flow of the method 1300 can return to 1316 (shown in FIG. 13A), where the vehicle system can continue to travel according to the revised trip plan with the powered units that were previously off or in idle remaining off or in idle.

On the other hand, if the tractive effort capability of the powered units that are on is less than the demanded tractive effort (or if the tractive effort capability does not exceed the demanded tractive effort by at least a designated amount), then the vehicle system may not have sufficient tractive effort capability with the powered units that are on to accelerate as required by the revised trip plan. As a result, flow of the method 1300 can continue to 1324.

At 1324, one or more powered units that are off or in idle are selected to be turned on. For example, the individual tractive effort capabilities of the powered units that are off or in idle can be compared to the shortage in tractive effort capability (e.g., the amount by which the tractive effort capability of the powered units that are on falls short of the demanded tractive effort of the revised trip plan). One or more of these powered units may be selected to be activated in order to cause the total tractive effort capability of the powered units that are on to meet the demanded tractive effort or to exceed the demanded tractive effort by at least a designated amount.

At 1326, the selected powered units that are off or in idle are remotely turned on. As described above, activation signals can be communicated from off-board the selected powered units (such as from another powered unit in the vehicle system) to remotely turn the selected powered units into active, propulsion-generating states.

At 1328, the vehicle system accelerates using tractive efforts provided by the powered units that are on. The vehicle system can accelerate until the vehicle system reaches a designated speed and/or location of the revised trip plan. For example, the vehicle system can accelerate until the vehicle system reaches a speed limit of the route (e.g., track speed).

At 1330, one or more powered units that are on in the vehicle system are selected to be turned off or to idle. For example, once the vehicle system reaches the designated speed of the revised trip plan, the vehicle system can turn one or more powered units off or to idle to conserve fuel and/or reduce emission generation, while still having sufficient tractive effort capability to travel according to the revised trip plan. In one embodiment, the one or more powered units that are selected to be turned off or to idle are the same powered units that previously were off or in idle during the trip. Alternatively, one or more other powered units may be selected.

At 1332, the one or more selected powered units are remotely turned off or to idle. The selected powered units may be turned off or to idle while the vehicle system is moving along the route according to the revised trip plan.

At 1334, the vehicle system may continue to travel along the route according to the revised trip plan. The vehicle system can travel using the powered units that are on, while one or more other powered units remain off or in idle. The powered units that are off or in idle may remain so for the duration of the trip, or until another unplanned event occurs. If another unplanned slowing or stopping occurs, the method 1300 may return to 1320 to revise the trip plan, turn one or more of the powered units on, accelerate using the powered units, and then turn one or more of the powered units off or to idle.

Figure 7:
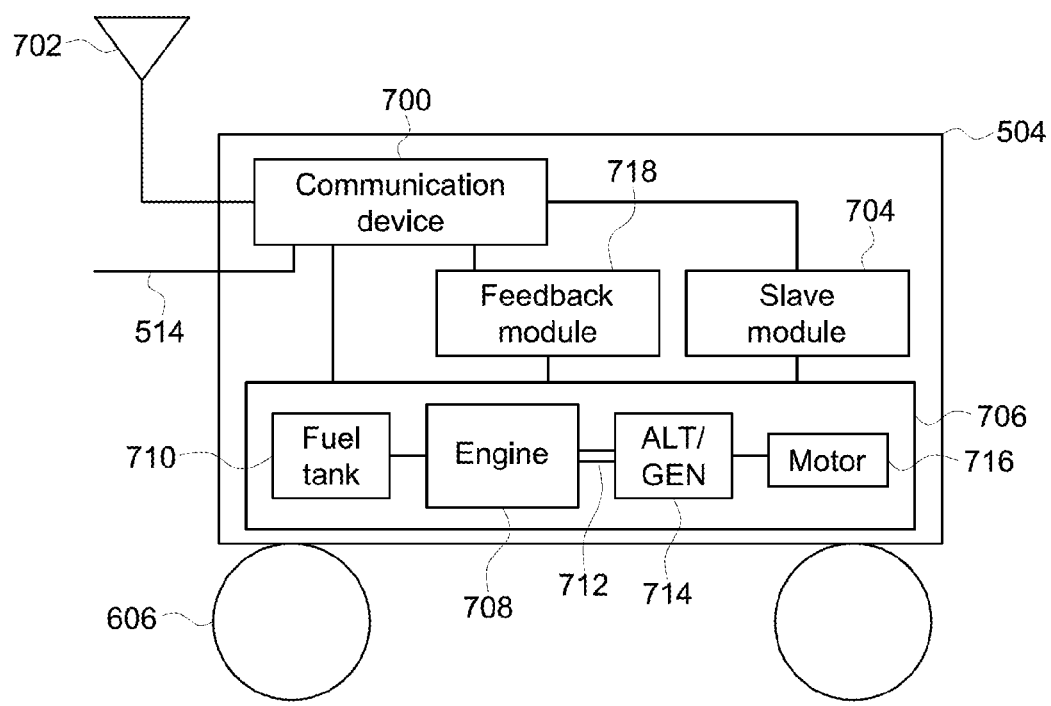
FIG. 7 is a schematic illustration of one embodiment of a remote powered unit.

FIG. 7 is a schematic illustration of one embodiment of a remote powered unit 504. The remote powered unit 504 may represent one or more of the remote powered units 504A, 504B, 504C, and so on, shown in FIG. 1. The remote powered unit 504 includes a communication device 700 that communicates with the lead powered unit 502 (shown in FIG. 1). For example, the communication device 700 may receive the control instructions transmitted from the lead powered unit 502 so that the lead powered unit 502 can control the tractive efforts and/or braking efforts of the remote powered unit 504. The communication device 700 may include a transceiver device or transmitter that is conductively coupled with the communication pathway 514 (e.g., a cable bus or MU cable bus). The communication device 700 can receive the control instructions from the lead powered unit 502 through the communication pathway 514. Alternatively or additionally, the communication device 700 may be coupled with an antenna 302 to wirelessly receive the control instructions from the lead powered unit 502.

As described above, the communication device 700 may be turned off (e.g., not be powered by the propulsion subsystem of the remote vehicle) when the remote vehicle is in the off mode of operation. However, in one embodiment, the communication device 700 or one or more components of the communication device 700 may remain powered when the remote vehicle is in the off mode of operation. For example, the communication device 700 may remain powered up, or on, and continue to allow for communication through the pathway 514 with other communication devices 300 on other remote powered units 504 that remain powered up, or on, when the remote powered units 504 are in the off mode of operation. As another example, the communication device 300 may include a network interface module, such as a network card and/or processor that allows for communication through the pathway 514 with other devices 700, that remains powered when the remote powered unit 504 is in the off mode of operation. The communication device 700 or network interface module can remain powered by a battery or other electrical energy storage device. The network interface module can allow for communications with the communication device 700 when the propulsion subsystem initially switches from the off mode to the on mode.

The remote powered unit 504 includes a slave module 704 that receives the control instructions from the lead powered unit 502 (e.g., via the communication device 700) and implements the control instructions. For example, the slave module 704 may communicate with a propulsion subsystem 706 of the remote powered unit 504 to change tractive efforts and/or braking efforts provided by the propulsion subsystem 706 based on the control instructions received from the lead powered unit 502. The slave module 704 also may implement control instructions received from the isolation module 602 (shown in FIG. 6) of the lead powered unit 502. For example, the isolation module 602 may transmit an isolation command to the remote powered unit 504 (e.g., via the communication devices 608, 700). The slave module 704 can receive the isolation command and turn the propulsion subsystem 706 to the off mode of operation from the on mode of operation. Alternatively, the isolation module 602 may transmit an activation command to the remote powered unit 504. The slave module 704 can receive the activation command and turn the propulsion subsystem 706 to the on mode of operation from the off mode of operation.

The propulsion subsystem 706 of the remote powered unit 504 provides tractive effort and/or braking effort of the remote powered unit 504. The propulsion subsystem 706 can include an engine 708 that is fluidly coupled with a fuel tank 710. Additionally or alternatively, the propulsion subsystem 706 may include an energy storage device (such as a battery that may be represented by the fuel tank 710) that powers the propulsion subsystem 706. The engine 708 consumes fuel from the fuel tank 710 to rotate a shaft 712 that is coupled with an electrical alternator or generator 714 ("ALT/GEN 714" in FIG. 7). The alternator or generator 714 generates electric current based on rotation of the shaft 712. The electric current is supplied to one or more components of the remote powered unit 504 (and/or one or more other remote powered units 504 or other vehicles in the vehicle system 500) to power the components. For example, the propulsion subsystem 706 may include one or more traction motors 716 that are powered by the electric current from the alternator or generator 714. Alternatively, the traction motors 716 may be powered by an onboard energy storage device and/or an off-board energy source, such as a powered rail or overhead catenary. The traction motors 716 can rotate axles and/or wheels 606 of the remote powered unit 504 to propel the remote powered unit 504. The propulsion subsystem 706 can include brakes (e.g., air brakes or regenerative/resistive brakes) that slow or stop movement of the remote powered unit 504.

The electric current from the propulsion subsystem 706 may be used to power the communication device 700. For example, the communication device 700 may be conductively coupled with the alternator or generator 714 to receive electric current that powers the communication device 700. In one embodiment, if energy of the electric current supplied to the communication device 700 drops below a threshold energy level, then the communication device 700 may turn off, such as by switching to an off mode of operation. In the off mode of operation for the communication device 700, the communication device 700 is unable to communicate with other communication devices, such as the communication device 608 (shown in FIG. 6) of the lead powered unit 502 (shown in FIG. 1) in one embodiment. The threshold energy level may represent a voltage level or current level that is sufficient to power the communication device 700 so that the communication device 700 can receive the control instructions from the lead powered unit 502 and/or transmit feedback data (as described below) to the lead powered unit 502. When the electric current has a voltage or other energy that drops below the threshold energy level, the communication device 700 may turn off. When the electric current rises above the threshold, the communication device 700 may turn on, or switch to an on mode of operation, to re-commence communication with the communication device 608 of the lead powered unit 502.

In one embodiment, a communication device 700 located on-board a first remote powered unit 504 may be powered by electric current generated by the propulsion subsystem 706 of a different, second remote powered unit 504. For example, a communication device 700 disposed on-board a remote powered unit 504 in a consist 510 or 512 may be powered by electric current received from one or more other remote powered units 504 in the same consist 510 or 512. The communication device 700 may be powered by at least one remote powered unit 504 in the consist 510 or 512 that is operating in the on mode of operation when one or more other remote powered units 504 are in the off mode of operation. For example, if the remote powered unit 504 on which the communication device 700 is disposed switches to the off mode of operation, then another remote powered unit 504 can supply electric current to the communication device 700 in order to power the communication device 700 and maintain a communication link with the lead powered unit 502 and the consist that includes the communication device 700. The communication device 700 disposed on-board one remote powered unit 504 may be conductively coupled with the propulsion subsystem 706 of another remote powered unit 504 by one or more wires, cables (e.g., MU cable bus), pathway 514, and the like, to receive the electric current.

The remote powered unit 504 may include a feedback module 318 that generates feedback data for use by the lead powered unit 502 (shown in FIG. 5). The feedback data can include a variety of information related to operation of the remote powered unit 504. For example, the feedback data can include a volume or amount of fuel being carried by the remote powered unit 504 (e.g., in the fuel tank 710). The feedback module 318 can include or represent one or more sensors (e.g., fuel gauge sensors) that obtain the feedback data. As described above, the lead powered unit 502 can use the volume or amount of fuel carried by the remote powered unit 504 to determine which of the remote powered units 504 to switch to the off mode of operation or the on mode of operation. The lead powered unit 502 may use the feedback data to determine the tractive efforts and/or braking efforts of the remote powered units 504. The lead powered unit 502 may base the tractive efforts, braking efforts, and/or determination of which remote powered units 504 are in the on mode or off mode of operation based on the feedback data received from a subset or all of the remote powered units 504 in the vehicle system 500 (shown in FIG. 5). As described above, one or more of the controller device 600 (shown in FIG. 2), the isolation module 602 (shown in FIG. 6), and/or the energy management system 612 (shown in FIG. 6) of the lead powered unit 502 can use the feedback data to control tractive efforts, braking efforts, and/or modes of operation of the remote powered units 504.

One or more of the slave module 704 and/or the feedback module 718 may represent a hardware and/or software system that operates to perform one or more functions. For example, the slave module 704 and/or the feedback module 718 may include one or more computer processors, controllers, or other logic-based devices that perform operations based on instructions stored on a tangible and non-transitory computer readable storage medium, such as a computer memory. Alternatively, the slave module 704 and/or the feedback module 718 may include a hard-wired device that performs operations based on hard-wired logic of the device. The slave module 704 and/or the feedback module 718 shown in FIG. 7 may represent the hardware that operates based on software or hardwired instructions, the software that directs hardware to perform the operations, or a combination thereof.

Figure 8:
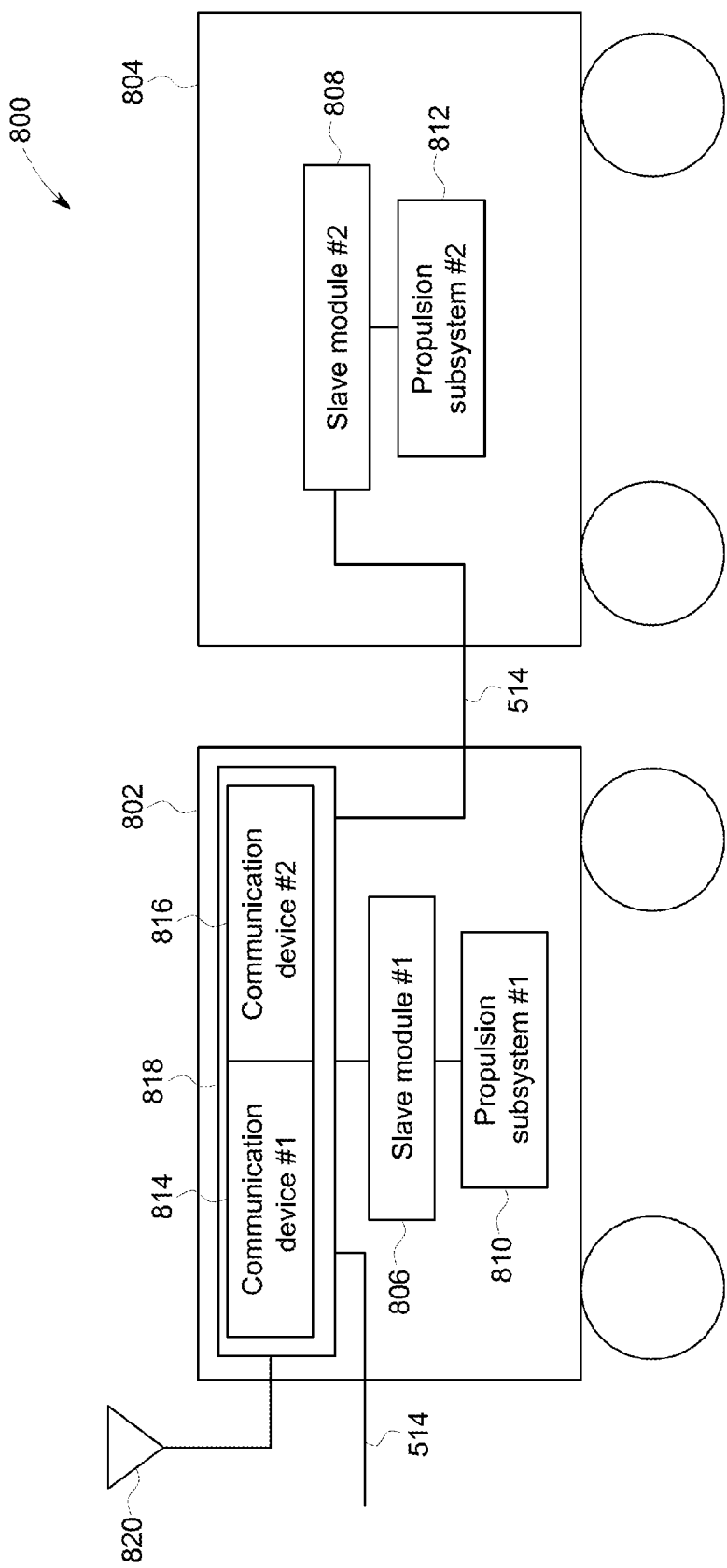
FIG. 8 is a schematic illustration of a consist of remote vehicles in accordance with another embodiment.

FIG. 8 is a schematic illustration of a consist 800 of remote vehicles 802, 804 in accordance with another embodiment. The consist 800 may be similar to one or more of the consists 510, 512 (shown in FIG. 5). For example, the consist 800 may include one or more remote vehicles that are mechanically and/or logically connected with each other. The remote vehicles 802, 804 may be similar to one or more of the remote powered units 504 (shown in FIG. 5). For example, the remote vehicles 802, 804 may be vehicles of a vehicle system and be capable of generating tractive effort for self-propulsion.

In the illustrated embodiment, the remote vehicles 802, 804 include slave modules 806, 808 (e.g., "Slave Module #1" and "Slave Module #2") that may be similar to the slave module 704 (shown in FIG. 7). For example, the slave modules 806, 808 may receive control instructions from the lead powered unit 502 (shown in FIG. 5) and implement the control instructions to change the mode of operation, tractive efforts, and/or braking efforts of propulsion subsystems 810, 812 of the remote vehicles 802, 804 (e.g., "Propulsion Subsystem #1" and "Propulsion Subsystem #2"), as described above. Although not shown in FIG. 4, the remote vehicles 802, 804 can include feedback modules that are similar to the feedback module 718 (shown in FIG. 7).

The remote vehicles 802, 804 include communication devices 814, 816 (e.g., "Communication Device #1" and "Communication Device #2") that communicate with the communication device 608 (shown in FIG. 2) of the lead powered unit 502 (shown in FIG. 5). The communication devices 814, 816 may be similar to the communication device 700 (shown in FIG. 7). In one embodiment, the communication device 814 may receive control instructions, isolation commands, activation commands, and the like, and/or transmit feedback data for the remote vehicle 802 while the communication device 816 receives control instructions, isolation commands, activation commands, and the like, and/or transmit feedback data for the remote vehicle 804.

One difference between the remote vehicles 802, 804 shown in FIG. 8 and the remote powered unit 504 shown in FIG. 7 is that the communication device 816 for the remote vehicle 804 is disposed off-board the remote vehicle 804 and is disposed on-board the remote vehicle 802. For example, the communication device for one remote vehicle may be located on-board another remote vehicle in the same consist. The communication devices 814, 816 can be parts of a common communication module 818. For example, the communication devices 814, 816 may be contained within a common (e.g., the same) housing located on the remote vehicle 802. While only two communication devices 814, 816 are shown as being part of the common communication module 818, alternatively, three or more communication devices 814, 816 may be part of the same communication module 818. For example, one remote vehicle in a consist may include the communication devices for a plurality of the remote vehicles in the consist. Alternatively, the communication module 818 may include only a single communication device of a single remote vehicle.

The communication module 818 communicates with the communication device 608 (shown in FIG. 6) of the lead powered unit 502 (shown in FIG. 5) through a wired communication link (e.g., the pathway 514, another conductive wire or cable, a fiber optic cable, and the like) and/or using an antenna 820 (e.g., via a wireless network). The communication module 818 may act as a single communication device for plural remote vehicles in the same consist. The communication module 818 may maintain a communication link with the lead powered unit 502 to continue communications with the lead powered unit 502 when one or more of the remote vehicles 802, 804 switch to the off mode of operation. For example, if the remote vehicle 804 switches to the off mode of operation, the communication module 818 may continue to receive electric current from the propulsion subsystem 810 of the other remote vehicle 802 in the consist 800 and may continue to communicate with the lead powered unit 502. On the other hand, if the remote vehicle 802 switches to the off mode of operation, the communication module 818 may continue to receive electric current from the propulsion subsystem 812 of the other remote vehicle 804 in the consist 800 and may continue to communicate with the lead powered unit 502.

Returning to the discussion of the vehicle system 500 shown in FIG. 5, in order to prevent a break or interruption in communication between the lead powered unit 502 and one or more remote powered units 504 in each of the consists 510 and 512, the isolation module 602 (shown in FIG. 6) of the lead powered unit 502 may coordinate the timing at which the remote powered units 504 switch between modes of operation. In one embodiment, the isolation module 602 may direct the remote powered units 504 in a consist 510 and/or 512 to switch between modes of operation such that at least one communication device 700, 814, 816 (shown in FIGS. 7 and 8) of the remote powered units 504 in each consist 510, 512 maintains a communication link with the lead powered unit 502. For example, at least one communication device 700, 814, 816 of each consist 510, 512 may remain powered and configured to communicate with the lead powered unit 502 such that the communication device 700, 814, 816 can receive control instructions from the lead powered unit 502 during the switching of modes of operation.

Figure 9:
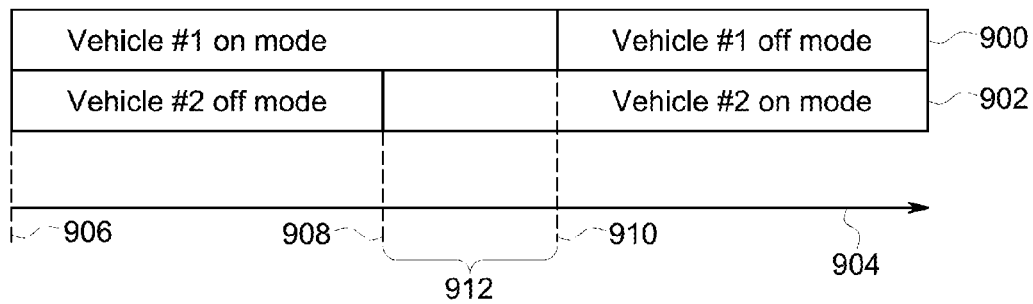
FIG. 9 illustrates example timelines of a switching procedure for changing modes of operation in a consist.

FIG. 9 illustrates example timelines 900, 902 of a switching procedure for changing modes of operation in a consist. The timelines 900, 902 represent one example of a procedure for two remote powered units 504 (shown in FIG. 5) switching between on and off modes of operation such that at least one communication device 700, 814, 816 (shown in FIGS. 7 and 8) remains on and powered for each consist 510, 512 (shown in FIG. 5).

The timelines 900, 902 are shown alongside a horizontal axis 904 that represents time. The timeline 900 represents the modes of operation for a first remote vehicle ("Vehicle #1"), such as the remote powered unit 504A (shown in FIG. 1) and the timeline 902 represents the modes of operation for a different, second remote vehicle ("Vehicle #2") in the same consist as the first remote vehicle, such as the remote powered unit 504B (shown in FIG. 5). At a first time 906, the first remote vehicle is operating in the on mode of operation ("Vehicle #1 on Mode") while the second remote vehicle is operating in the off mode of operation ("Vehicle #2 off Mode"). For example, the propulsion subsystem of the first remote vehicle may be on and active to generate electric current to power a communication device disposed on the first remote vehicle or the second remote vehicle. The propulsion subsystem of the second remote vehicle may be off and deactivated such that the propulsion subsystem does not generate electric current to power a communication device disposed on the first remote vehicle or the second remote vehicle. As described above, the powered communication device can continue to receive control instructions from the lead vehicle to control operations of the first remote vehicle.

The isolation module 602 (shown in FIG. 6) of the lead powered unit 502 (shown in FIG. 5) may decide to switch the first remote vehicle from the on mode of operation to the off mode of operation. Prior to switching the mode of operation of the first remote vehicle, however, the isolation module 602 may direct at least one other remote vehicle in the same consist to remain in the on mode of operation or to switch to the on mode of operation to ensure that the communication device of the consist remains powered and able to communicate with the lead powered unit 902. For example, at a subsequent time 908, the isolation module 602 may direct the second remote vehicle to switch from the off mode of operation to the on mode of operation. After the second time 908, both the first remote vehicle and the second remote vehicle are in the on mode of operation and the propulsion subsystem of at least one of the first remote vehicle and the second remote vehicle may power one or more communication devices of the consist.

At a subsequent third time 910, the isolation module 602 (shown in FIG. 6) of the lead powered unit 502 (shown in FIG. 1) may direct the first remote vehicle to switch to the off mode of operation. In the illustrated embodiment, the first remote vehicle switches to the off mode of operation after the second remote vehicle switches to the on mode of operation. The isolation module 602 can monitor electrical output from the propulsion subsystem 706 of the second remote vehicle that is switched from the off mode of operation to the on mode of operation to determine when to switch the first remote vehicle from the on mode of operation to the off mode of operation. For example, the isolation module 602 can measure one or more energy characteristics (e.g., total energy, voltage, or the like) of the electric current generated by the alternator or generator 714 (shown in FIG. 7) of the second remote vehicle. The isolation module 602 may directly measure the one or more energy characteristics via the pathway 514 (shown in FIG. 5) and/or may receive measurements of the energy characteristics from the second remote vehicle, such as by measured by one or more sensors (e.g., current or voltage sensors) on the second remote vehicle and communicated to the isolation module 602 using the communication device 700 (shown in FIG. 7). Once the one or more energy characteristics exceed one or more associated thresholds, the isolation module 602 may proceed to direct the first remote vehicle to switch from the on mode of operation to the off mode of operation.

As shown in FIG. 9, both the first remote vehicle and the second remote vehicle are in the on mode of operation for an overlapping time period 912 that extends from the second time 908 to the third time 910. The overlapping time period 912 indicates that at least one remote vehicle in the consist remains in the on mode of operation to continue supplying power to one or more communication devices in the consist during the switching procedure. As a result, the lead powered unit 502 may continue to communicate with the remote vehicles of the consist without an interruption or break in the communication link.

In one embodiment, the isolation module 602 (shown in FIG. 6) may control the switching of the propulsion subsystems of the remote vehicles in a consist so as to reduce or eliminate a voltage drop in the supply of electrical energy to a communication module or device of the consist during a defined electro-mechanical event. For example, multiple remote vehicles in a consist may be conductively coupled with each other such that cranking of an engine in a first remote vehicle of the consist causes a voltage drop in one or more electrical circuits of the first remote vehicle and/or one or more other remote vehicles in the consist. The drop in voltage can cause the electrical energy that is supplied to one or more communication devices in the consist to drop below a threshold energy required to power the communication devices. As a result, the communication devices may turn off and/or electrically reset themselves. The communication devices may not turn back on for communication or complete the reset for a significant time period, such as several seconds or minutes. This delay can cause a break or interruption in the communication link between the lead vehicle and the consist and can cause the vehicle system to take responsive action, as described above.

In order to prevent such a voltage drop from breaking or interrupting the communication link, one or more of the propulsion subsystems in the consist remain on and activated to produce electrical energy and power the communication device during the electro-mechanical event. The propulsion subsystems may remain in the on mode of operation such that the electric current supplied to the communication device(s) of the consist do not drop below the threshold energy needed to power the communication device during the electro-mechanical event. As a result, the communication link between the lead vehicle and the communication device(s) in the consist is not broken or interrupted during the electro-mechanical event.

For example, when a communication device 700 (shown in FIG. 7) on-board a first remote powered unit 504 (shown in FIG. 5) is turned on or activated, the communication device 700 may not have sufficient communication parameters for receiving control instructions from the lead powered unit 502 (shown in FIG. 5) to allow the lead powered unit 502 to control operations of the first remote powered unit 504 in a DP operation. The communication parameters may include settings, addresses, and the like, that are needed to communicate with the lead powered unit 502 via the communication link between the lead powered unit 502 and the first remote powered unit 504. When the communication device 700 is turned on or activated, the communication device 700 may acquire or set up the communication parameters used to communicate with the lead powered unit 502. The communication parameters may be acquired from the lead powered unit 502 or from a local memory. The communication parameters may be specific to that remote powered unit 504 and/or that communication device 700, and may differ from the communication parameters used by another remote powered unit 504 in the same consist and/or another communication device 700.

In order to ensure that the communication device 700 (shown in FIG. 7) that is turned on has the communication parameters for communicating with the lead powered unit 502 (shown in FIG. 5) before one or more other communication devices 700 in the same consist are turned off, the remote powered unit 504 (shown in FIG. 5) that is turning to the off mode may way until the communication parameters are transferred to the remote powered unit 504 being turned to the on mode. For example, with respect to the timelines 900, 902 shown in FIG. 9, at the time 908, both the first and second remote powered units 504 are in the on mode and the communication parameters used by the first remote powered unit 504 to communicate with the lead powered unit 502 are used to communicate with the lead powered unit 502. For at least a period of time following the time 908, the second remote powered unit 504 may not have the communication parameters needed to communicate with the lead powered unit 502. As a result, the second remote powered unit 504 may be unable to communicate with the lead powered unit 502 for at least the period of time. During the overlapping time period that extends from the time 908 to the time 910, the communication device 300 of the first remote powered unit 504 can transfer the communication parameters to the second remote powered unit 504, such as by transmitting the communication parameters through the pathway 514 (shown in FIG. 5) or a wireless communication link. At or prior to the time 910, the transfer of the communication parameters to the second remote powered unit 504 is complete such that the second remote powered unit 504 can communicate with and receive control instructions from the lead powered unit 502. The first remote powered unit 504 may then deactivate and turn to the off mode without interrupting or breaking the communication link between the lead powered unit 502 and the consist that includes the first and second remote powered units 504.

One or more components disposed on the lead powered unit 502 and/or remote powered units 504 described herein can be provided in a retrofit kit or assembly. For example, the lead powered unit 502 may be originally manufactured or sold to a customer without the isolation module 602 installed or disposed on the lead powered unit 502. A retrofit kit or assembly can include the isolation module 602, such as a kit or assembly having hardware components (e.g., a computer processor, controller, or other logic-based device), software components (e.g., software applications), and/or a combination of hardware components and software components (e.g., a computer processor or other logic-based device and associated software application, a computer processor, controller, or other logic-based device having hard-wired control instructions, or the like). The kit or assembly may be purchased or provided to the current owner and/or user of the lead powered unit 502 so that the owner and/or user can install (or have installed) the isolation module 602 on the lead powered unit 502. The isolation module 602 may then be used in accordance with one or more embodiments described herein. While the above discussion of the retrofit kit or assembly focuses on the isolation module 602, the kit or assembly may also or alternatively include the energy management system 612 and/or one or more components disposed on the remote powered unit 504, such as the slave module 704 and/or the feedback module 718 described above in connection with FIG. 7.

Figure 10:
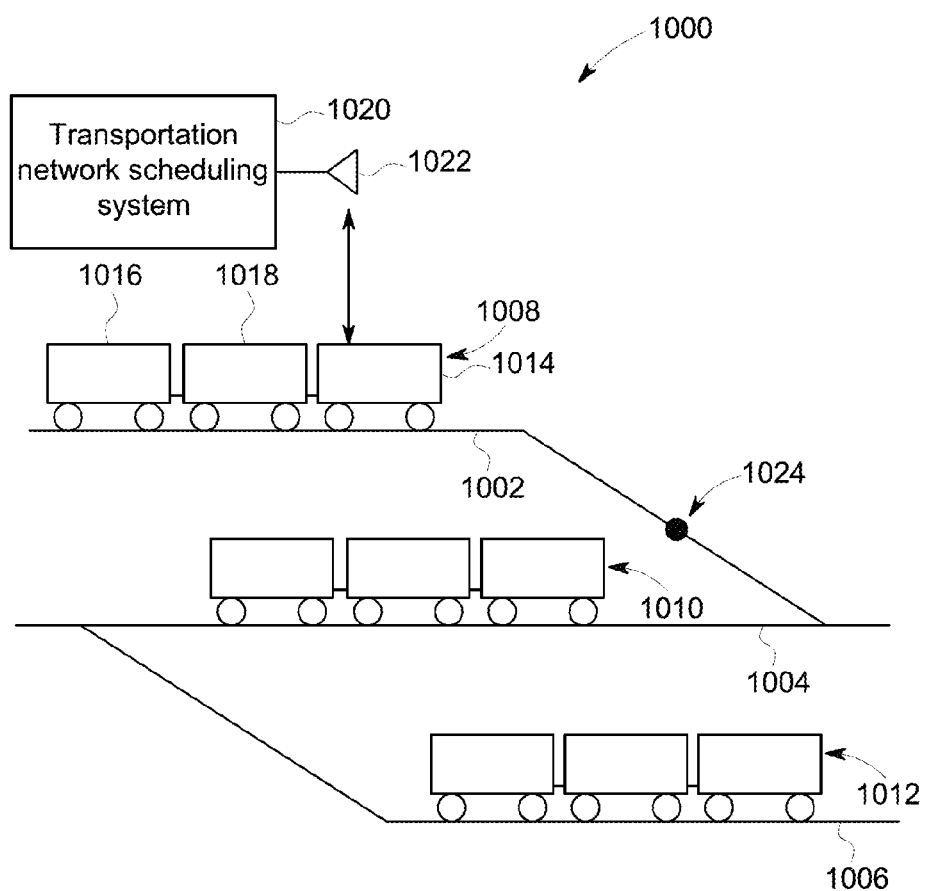
FIG. 10 is a schematic view of a transportation network in accordance with one embodiment.

FIG. 10 is a schematic view of a transportation network 1000 in accordance with one embodiment. The transportation network 1000 includes a plurality of interconnected routes 1002, 1004, 1006, such as interconnected railroad tracks. The transportation network 1000 may extend over a relatively large area, such as hundreds of square miles or kilometers of land area. The number of routes 1002, 1004, 1006 shown in FIG. 6 is meant to be illustrative and not limiting on embodiments of the described subject matter. Plural separate vehicle systems 1008, 1010, 1012 may concurrently travel along the routes 1002, 1004, 1006.

One or more of the vehicle systems 1008, 1010, 1012 may be similar to the vehicle system 500 (shown in FIG. 5). For example, the vehicle system 1008 may include a lead vehicle 1014 interconnected with one or more consists 1016 (e.g., a motive power group of one or more mechanically and/or logically connected remote vehicles) by one or more non-powered vehicles 1018. The consists 1016 can include remote vehicles (e.g., remote powered units 504, 802, 804 shown in FIGS. 5 and 8) that are remotely controlled by the lead vehicle 1014, as described above. Also as described above, the lead vehicle 1014 may direct the remote vehicles in the consist 1016 to alternate between operating in on modes of operation and off modes of operation, while keeping a communication link with the consist 1016 open to continue controlling the remote vehicles that are in the on mode of operation.

In one embodiment, the vehicle systems 1008, 1010, 1012 travel along the routes 1002, 1004, 1006 according to a movement plan of the transportation network 1000. The movement plan is a logical construct of the movement of the vehicle systems 1008, 1010, 1012 moving through the transportation network 1000. For example, the movement plan may include a movement schedule for each of the vehicle systems 1008, 1010, 1012, with the schedules directing the vehicle systems 1008, 1010, 1012 to move along the routes 1002, 1004, 1006 at associated times. The movement schedules can include one or more geographic locations along the routes 1002, 1004, 1006 and corresponding times at which the vehicle systems 1008, 1010, 1012 are to arrive at or pass the geographic locations.

The movement plan may be determined by a transportation network scheduling system 1020. The scheduling system 1020 may represent a hardware and/or software system that operates to perform one or more functions. For example, the scheduling system 1020 may include one or more computer processors, controllers, or other logic-based devices that perform operations based on instructions stored on a tangible and non-transitory computer readable storage medium, such as a computer memory. Alternatively, the scheduling system 1020 may include a hard-wired device that performs operations based on hard-wired logic of the device. The scheduling system 1020 shown in FIG. 10 may represent the hardware that operates based on software or hardwired instructions, the software that directs hardware to perform the operations, or a combination thereof. As shown in FIG. 10, the scheduling system 1020 can be disposed off-board (e.g., outside) the vehicle systems 1008, 1010, 1012. For example, the scheduling system 1020 may be disposed at a central dispatch office for a railroad company. The scheduling system 1020 can include an antenna 1022 that wirelessly communicates with the vehicle systems 1008, 1010, 1012.

In one embodiment, the scheduling system 1020 determines whether to change a mode of operation of one or more remote vehicles in the vehicle systems 1008, 1010, 1012. For example, the scheduling system 1020 may direct one or more of the remote vehicles in one or more of the vehicle systems 1008, 1010, 1012 to switch from the on mode of operation to the off mode of operation, and vice-versa, as described above. The scheduling system 1020 can transmit instructions to an isolation module disposed on the lead vehicle 1014, which directs the remote vehicles to change the mode of operation as indicated by the scheduling system 1020. Also as described above, the remote vehicles may change modes of operation without interrupting or breaking a communication link between the lead vehicle 1014 and one or more of the remote vehicles in the consist 1016.

The scheduling system 1020 may direct one or more remote vehicles in the vehicle systems 1008, 1010, 1012 based on movement schedules of the vehicle systems 1008, 1010, 1012. For example, if one or more vehicle systems 1008, 1010, 1012 are running ahead of schedule, the scheduling system 1020 may direct one or more remote vehicles in the vehicle systems 1008, 1010, 1012 to turn to the off mode of operation (e.g., to slow down the vehicle system 1008, 1010, 1012 running ahead of schedule) or to turn to the on mode of operation (e.g., to speed up the vehicle system 1008, 1010, 1012 running behind schedule).

In one embodiment, the scheduling system 1020 may direct one or more remote vehicles in a vehicle system 1008, 1010, 1012 to turn to the off mode of operation in order to allow the vehicle system 1008, 1010, 1012 to skip or pass a refueling location 1024 in the transportation network 1000. The refueling location 1024 represents a station or depot where the vehicle systems 1008, 1010, 1012 may stop to acquire additional fuel to be added to the fuel tanks of the lead vehicles and/or remote vehicles. In order to reduce the time required to travel along a trip between a starting location and a destination location, the scheduling system 1020 may control which remote vehicles in a vehicle system 1008, 1010, 1012 are in the on mode of operation and/or the off mode of operation to conserve fuel and allow the vehicle system 1008, 1010, 1012 to skip one or more refueling locations 1024. For example, if all or a substantial number of the remote vehicles in the vehicle system 1008 were continually operating in the on mode of operation during a trip, the vehicle system 1008 may need to stop and refuel at the refueling location 1024 in order to ensure that the vehicle system 1008 has sufficient fuel to reach the destination location of the trip.

The scheduling system 1020 may direct one or more of the remote vehicles to turn to the off mode of operation to conserve fuel and allow other remote vehicles to remain in the on mode of operation such that the vehicle system 1008 can pass the refueling location 1024 without stopping to refuel. The scheduling system 1020 can examine a geographic distance between a location of the vehicle system 1008, 1010, and/or 1012 the refueling location 1024, along with an amount of remaining fuel carried by one or more of the lead vehicles and/or remote vehicles in the vehicle system 1008, 1010, and/or 1012 to determine if the corresponding vehicle system 1008, 1010, and/or 1012 can proceed past the refueling location 1024 without stopping to acquire additional fuel (e.g., skip the refueling location 1024). The location of the vehicle system 1008, 1010, and/or 1012 may be a current geographic location as determined by one or more location sensors, such as one or more Global Positioning System (GPS) receivers disposed on the vehicle system 1008, 1010, and/or 1012 that is reported back to the scheduling system 1020.

Figure 11:
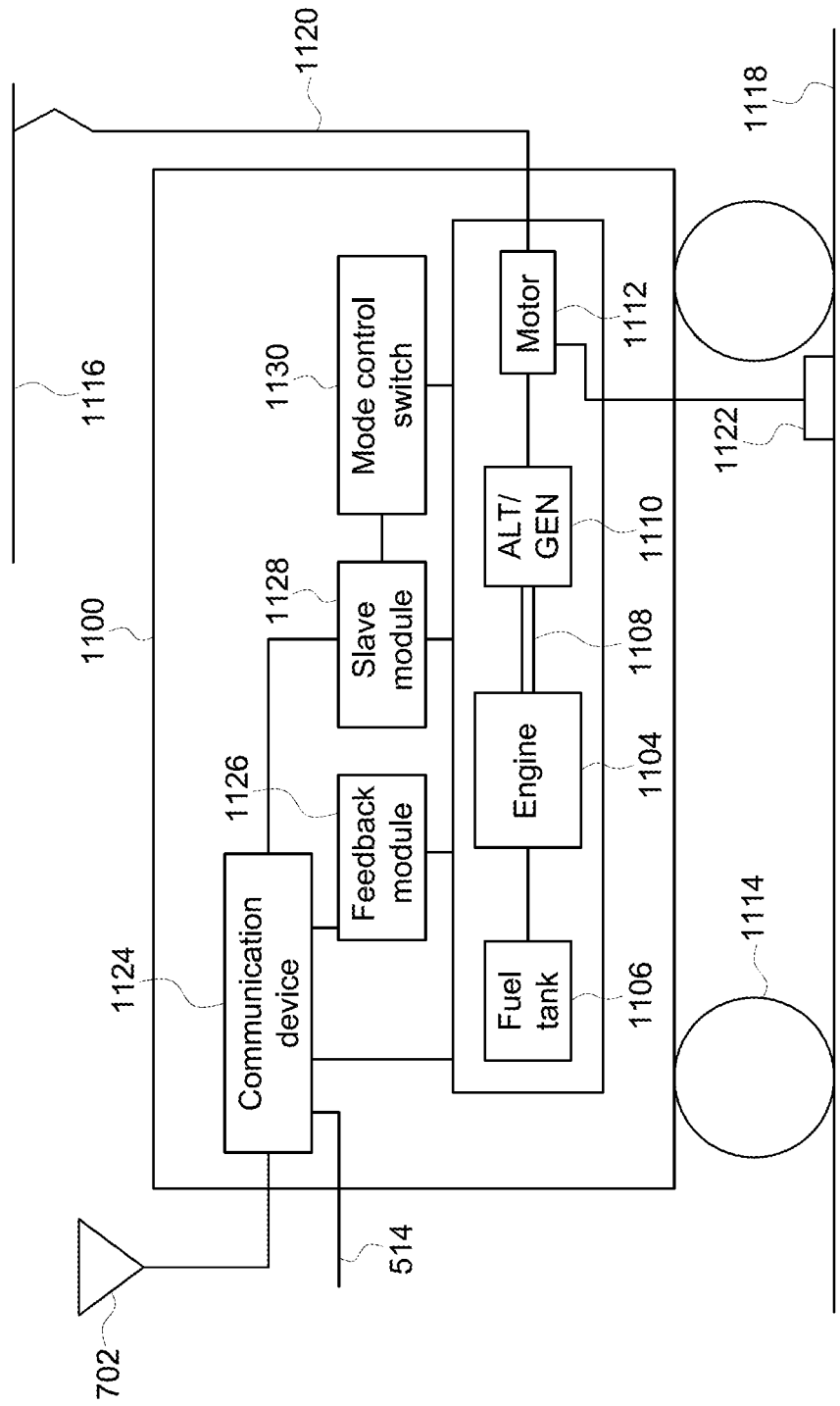
FIG. 11 is a schematic illustration of a remote vehicle in accordance with another embodiment.

FIG. 11 is a schematic illustration of a remote vehicle 1100 in accordance with another embodiment. The remote vehicle 1100 may be used in place of one or more of the remote vehicles described herein. For example, the remote vehicle 1100 may be included in one or more of the vehicle systems 500, 1008, 1010, 1012 (shown in FIGS. 5 and 10) described above.

The remote vehicle 1100 is a multiple-mode powered vehicle. By "multiple-mode," it is meant that the remote vehicle 1100 can generate tractive efforts for propulsion from a plurality of different sources of energy. In the illustrated embodiment, the remote vehicle 1100 includes a propulsion subsystem 1102 that can be powered from an on-board source of energy and an off-board source of energy. The on-board source of energy can be provided by an engine 1104 that consumes fuel stored in an on-board fuel tank 1106 to rotate a shaft 1108. The shaft 1108 is joined to an alternator or generator 1110 ("ALT/GEN 1110") that creates electric current based on rotation of the shaft 1108, similar to the propulsion subsystem 706 shown and described in connection with FIG. 7. The electric current is supplied to one or more motors 1112, such as traction motors, to power the motors 1112 and cause the motors 1112 to rotate axles and/or wheels 1114 of the remote vehicle 1100. Similar to the engine 708 shown in FIG. 7, the engine 1104 can be engines that consume a combustible fuel, such as diesel fuel, hydrogen, water/steam, gas, and the like, in order to generate electric current that is used for movement of the remote vehicle 1100.

The off-board source of energy can be obtained from a conductive pathway that extends along the route (e.g., the route 514 shown in FIG. 5) of the remote vehicle 1100. As one example, the conductive pathway can include an overhead line or catenary 1116 that extends along and above the route of the remote vehicle 1100. As another example, the conductive pathway can include a powered rail 1118 that extends along the route of the remote vehicle 1100 below or to the side of the remote vehicle 1100. For example, the conductive pathway can be a third rail that conveys electric current.

The propulsion subsystem 1102 of the remote vehicle 1100 includes a conductive extension 1120 and/or 1122 that engages the overhead line 1116 or the powered rail 1118 to convey the electric current from the overhead line 1116 or powered rail 1118 to the propulsion subsystem 1102. The conductive extension 1120 can include a pantograph device, a bow collector, trolley pole, a brush, or the like, and associated circuitry that engages the overhead line 1116 to acquire and deliver electric current to the propulsion subsystem 1102. The conductive extension 1122 can include a conductive contact box, brush, or "shoe" that engages the powered rail 1118 to acquire and deliver electric current to the propulsion subsystem 1102. The overhead line 1116 and/or powered rail 1118 may receive the electric current that is supplied to the propulsion subsystem 1102 from an off-board power source, such as a utility power grid, power station, feeder station, or other location that generates and/or supplies electric current that is not located on the remote vehicle 1100 or the vehicle system that includes the remote vehicle 1100. The electric current is delivered from the conductive extension 1120 and/or 1122 to the traction motors 1112 of the propulsion subsystem 1102 to power the traction motors 1112 for rotation of the axles and/or wheels 1114 of the remote vehicle 1100. The electric current from the conductive extension 1120 and/or 1122 also may be used to power the communication device 1124.

Similar to the remote powered unit 504 shown in FIG. 5, the remote vehicle 1100 may include a communication device 1124 that is similar to the communication device 700 (shown in FIG. 7), a feedback module 1126 that is similar to the feedback module 718 (shown in FIG. 7), and/or a slave module 1128 that is similar to the slave module 704 (shown in FIG. 7). The communication device 1124, the feedback module 1126, and/or the slave module 1128 may perform the functions described above and associated with the respective communication device 700, feedback module 718, and/or slave module 704.

The remote vehicle 1100 includes a mode control switch 1130 in the illustrated embodiment. The mode control switch 1130 is used to control where the propulsion subsystem 1102 receives electric current to propel the remote vehicle 1100. The mode control switch 1130 may represent a hardware and/or software system that operates to switch between the propulsion subsystem 1102 receiving electric current from an on-board source (e.g., the engine 1104 and alternator or generator 1110) or from on off-board source (e.g., the overhead line 1116 or powered rail 1118). For example, the mode control switch 1130 may include one or more computer processors, controllers, or other logic-based devices that alternately open or close conductive circuits that prevent or allow, respectively, electric current to flow from the conductive extensions 1120, 1122 to the motors 1112 and/or from the alternator or generator 1110 to the motors 1112. The processors, controllers, or other logic-based devices may open or close the circuits based on instructions stored on a tangible and non-transitory computer readable storage medium, such as a computer memory. Alternatively, the mode control switch 1130 may include a hard-wired device that performs operations based on hard-wired logic of the device. In another embodiment, the mode control switch 1130 may include a manual switch that is manually actuated by a human operator.

The mode control switch 1130 is communicatively coupled with the slave module 1128 in order to determine when the isolation module 602 (shown in FIG. 6) of the lead powered unit 502 (shown in FIG. 5) directs the remote vehicle 1100 to switch from the on mode of operation to the off mode of operation. In one embodiment, if the isolation module 602 directs the remote vehicle 1100 to switch to the off mode of operation, the mode control switch 1130 may prevent the propulsion subsystem 1102 from switching to the off mode of operation if the propulsion subsystem 1102 is receiving electric current from the off-board source (e.g., via the overhead line 1116 or powered rail 1118). For example, the mode control switch 1130 may not allow the propulsion subsystem 1102 to turn off when the propulsion subsystem 1102 is powered from the off-board source and/or is not consuming fuel from the fuel tank 1106 to produce electric current. The mode control switch 1130 may prevent the propulsion subsystem 1102 from switching to the off mode of operation based on the circuitry of the mode control switch 1130, or based on software and/or hard-wired logic of the mode control switch 1130.

In another embodiment, the mode control switch 1130 may not permit the propulsion subsystem 1102 to switch to the off mode of operation if the vehicle system that includes the remote vehicle 1100 is providing electric current in a Head End Power (HEP) configuration. A HEP configuration includes the vehicle system having electrical power distribution circuits that extend throughout all or a substantial portion of the vehicle system and that supplies electric current generated in one vehicle to one or more or all, of the other vehicles. For example, a HEP-configured vehicle system may include a lead vehicle that generates electric current for powering one or more components of the remote vehicles. The electric current may be used to power non-propulsion electric loads, such as loads used for lighting various vehicles, cooling or heating the air of the vehicles, and the like.

Alternatively, the slave module 1128 may prohibit the propulsion subsystem 1102 from switching to the off mode of operation when the propulsion subsystem 1102 is receiving electric current from an off-board source. For example, the slave module 1128 may monitor the mode control switch 1130 to determine from where the propulsion subsystem 1102 is receiving electric current. Based on this determination, the slave module 1128 may ignore an instruction from the isolation module 602 (shown in FIG. 2) to switch the propulsion subsystem 1102 to the off mode of operation. For example, if the slave module 1128 determines that the mode control switch 1130 is directing current from the off-board source to the propulsion subsystem 1102, the slave module 1128 may not turn the propulsion subsystem 1102 to the off mode of operation, even when the isolation module 602 transmits an instruction to turn the propulsion subsystem 1102 to the off mode of operation.

In one embodiment, the mode control switch 1130 and/or the slave module 1128 do not permit the propulsion subsystem 1102 to switch to the off mode of operation if one or more parameters of the remote vehicle 1100 are outside of or otherwise exceed one or more associated ranges or thresholds. For example, the mode control switch 1130 and/or the slave module 1128 may monitor a number of times that the propulsion subsystem 1102 has been turned to the off mode of operation over a time window, an amount of electric current flowing through a battery regulator that is coupled with a rechargeable battery on the remote vehicle 1100, an ambient temperature of the interior of the remote vehicle 1100 (e.g., where the operator, passengers, and/or cargo are located), a temperature of the engine 1104, a position or setting of one or more throttle controls and/or brake controls of the propulsion subsystem 1102, an air pressure of an air brake reservoir, or the like.

If one or more of the parameters exceed thresholds or are outside of associated ranges, then the mode control switch 1130 and/or the slave module 1128 may not permit the propulsion subsystem 1102 to switch to the off mode of operation. For example, if the number of times that the propulsion subsystem 1102 has been turned off recently exceeds a threshold, then the mode control switch 1130 and/or the slave module 1128 may not permit the propulsion subsystem 1102 to switch to the off mode of operation. If the current flowing through the battery regulator, the ambient temperature, or the engine temperature exceed associated thresholds or fall outside of associated ranges, then the mode control switch 1130 and/or the slave module 1128 may not permit the propulsion subsystem 1102 to switch to the off mode of operation. If one or more propulsion control switches or settings are set to an engine start position, an engine isolate position, a run (e.g., active propulsion) position, or dynamic braking only position, then the mode control switch 1130 and/or the slave module 1128 may not permit the propulsion subsystem 1102 to switch to the off mode of operation.

Figure 12:
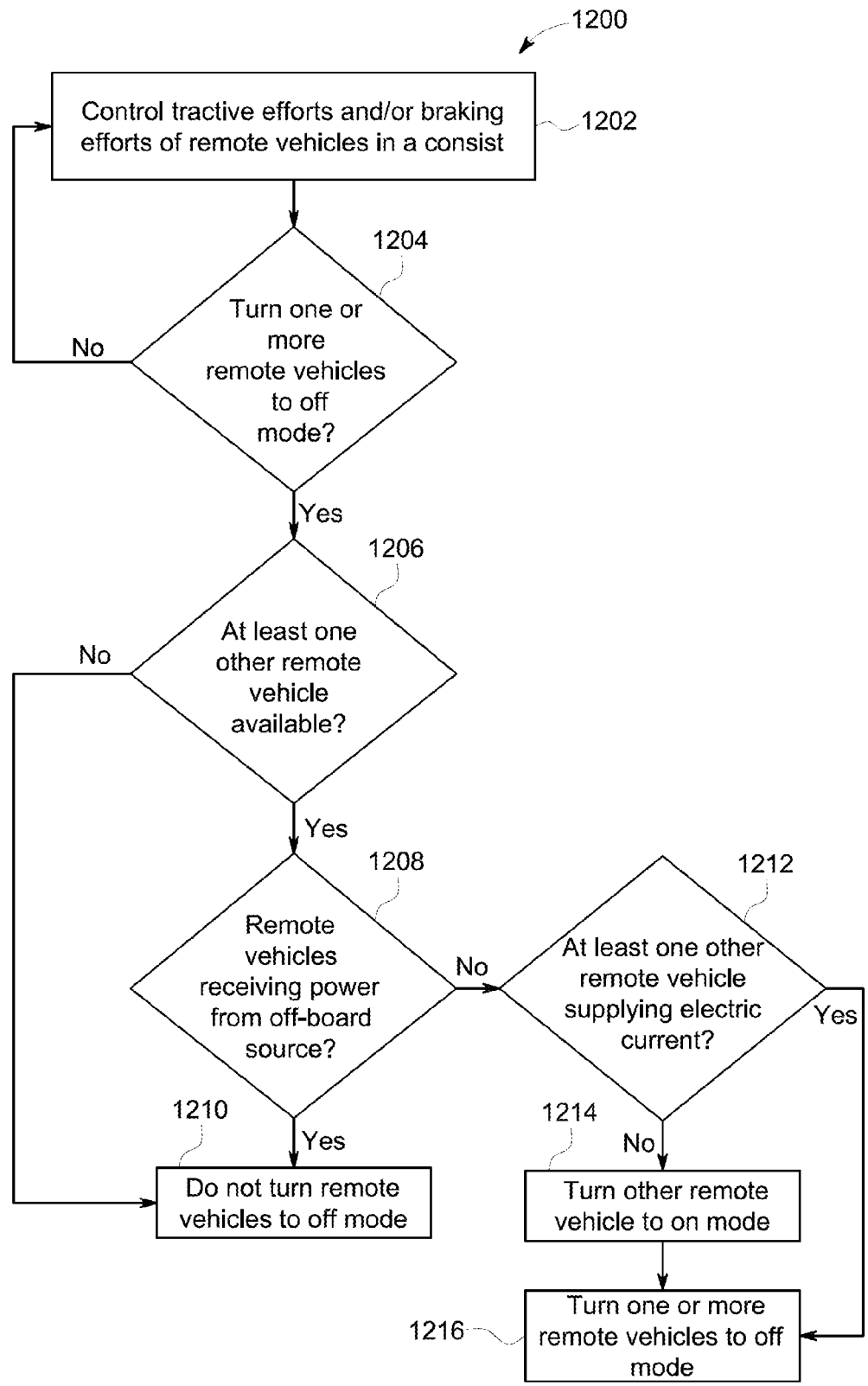
FIG. 12 is a flowchart of one embodiment of a method for remotely changing a mode of operation of one or more remote vehicles in a vehicle system.

FIG. 12 is a flowchart of one embodiment of a method 1200 for remotely changing a mode of operation of one or more remote vehicles in a vehicle system. The method 1200 may be used in conjunction with operation of one or more of the vehicle systems 500, 1008, 1010, 1012 (shown in FIGS. 5 and 10) described above. For example, the method 1200 may be used to determine whether to switch one or more remote vehicles in a consist of a vehicle system to the off mode of operation, which remote vehicles to switch to the off mode of operation, and to switch the one or more remote vehicles to the off mode of operation.

At 1202, tractive efforts and/or braking efforts of remote vehicles in a consist of a vehicle system are remotely controlled. For example, the lead powered unit 502 (shown in FIG. 5) can direct the tractive efforts and/or braking efforts of the remote powered units 504 (shown in FIG. 5) of the consist 510 and/or 512 (shown in FIG. 5). As described above, the lead powered unit 502 can control the tractive efforts and/or braking efforts in a DP configuration of the vehicle system 500 (shown in FIG. 5), based on instructions from the energy management system 612 (shown in FIG. 6), based on instructions from the scheduling system 1020 (shown in FIG. 10), and/or based on manual control from an operator.

At 1204, a determination is made as to whether one or more of the remote vehicles in a consist of the vehicle system is to be turned to the off mode of operation from the on mode of operation. For example, the energy management system 612 (shown in FIG. 6) and/or the scheduling system 1020 (shown in FIG. 10) may determine that a first remote powered unit 504 (shown in FIG. 5) in the consist 510 and/or 512 (shown in FIG. 5) can be turned to the off mode of operation to conserve fuel, put the vehicle system 500 (shown in FIG. 5) back on a schedule of the transportation network 1000 (shown in FIG. 10), to skip an upcoming refueling location 1024 (shown in FIG. 10), or the like, as described above.

If one or more of the remote vehicles in a consist can be switched to the off mode of operation, then flow of the method 1200 may proceed to 1206. On the other hand, if none of the remote vehicles are to be turned to the off mode of operation, then flow of the method 1200 may return to 1202.

At 1206, a determination is made as to whether at least one other remote vehicle in the consist is available to continue supplying power to a communication device of the consist when the one or more remote vehicles are turned to the off mode of operation. For example, the consist 510 and/or 512 (shown in FIG. 5) may include one or more communication devices 700 (shown in FIG. 7) that communicate with the lead powered unit 502 (shown in FIG. 5) to allow the lead powered unit 502 to control the remote powered units 504 (shown in FIG. 5) of the consist 510 and/or 512. At least a second remote powered units 504 may be configured to continue supplying electric current to one or more of the communication devices 700 of the consist 510 and/or 512 to power the communication devices 300 when the first remote powered unit 504 is switched to the off mode of operation.

If the second remote powered unit 504 is available in the consist 510 and/or 512 to continue supplying the electric current to the communication devices 300 to power the communication devices 300 when the first remote powered unit 504 is turned to the off mode of operation, then the first remote powered unit 504 may be turned to the off mode of operation without interrupting or breaking the communication link between the lead powered unit 502 and the consist 510 and/or 512, as described above. As a result, flow of the method 1200 may continue to 12012.

On the other hand, if there is not another remote powered unit 504 (shown in FIG. 5) in the consist 510 and/or 512 (shown in FIG. 5) to continue supplying the electric current to the communication devices 700 (shown in FIG. 7) to power the communication devices 300 when the first remote powered unit 504 is turned to the off mode of operation, then the first remote powered unit 504 may not be turned to the off mode of operation without interrupting or breaking the communication link between the lead powered unit 502 and the consist 510 and/or 512 (shown in FIG. 5), as described above. As a result, flow of the method 1200 may continue to 1210.

At 1208, a determination is made as to whether the remote vehicle(s) that can be turned to the off mode of operation are receiving electric current from an off-board source. For example, the first remote powered unit 504 (shown in FIG. 5) can be examined to determine if the first remote vehicle is receiving electric current to power one or more communication devices of the consist and/or the traction motors of the first remote vehicle from an off-board source, such as the overhead line 1116 (shown in FIG. 11) and/or the powered rail 1118 (shown in FIG. 11), as described above.

If the remote vehicle(s) to be turned to the off mode of operation are receiving electric current from an off-board source, then the remote vehicle(s) may not be turned to the off mode of operation. As a result, flow of the method 1200 may proceed to 1210. On the other hand, if the remote vehicle(s) to be turned to the off mode of operation are not receiving electric current from an off-board source, such as by producing electric current from an on-board engine and alternator or generator, then the remote vehicle(s) may be turned to the off mode of operation. As a result, flow of the method 1200 may proceed to 1212.

At 1210, the remote vehicle(s) in the consist are not turned to the off mode of operation. For example, the first remote vehicle may not be turned to the off mode of operation described above because the communication link between the lead vehicle and the consist that includes the first remote vehicle may be interrupted or broken if the propulsion subsystem of the first remote vehicle were turned off. Alternatively, the first remote vehicle may not be turned to the off mode of operation because the first remote vehicle is receiving electric current from an off-board source, also as described above.

At 1212, a determination is made as to whether at least one other remote vehicle in the consist is currently in the on mode of operation to supply electric current to one or more communication devices of the consist. For example, the electric current that is supplied by one or more other remote powered units 504 (shown in FIG. 5) of the consist 510 and/or 512 (shown in FIG. 5) to one or more communication devices 700 (shown in FIG. 7) of the consist 510 and/or 512 may be examined. If the one or more other remote powered units 504 are operating in the on mode of operation and supplying sufficient electric current to the communication device(s) 700 of the consist 510 and/or 512 such that turning the first remote powered unit 504 to the off mode of operation will not break or interrupt the communication link between the lead powered unit 502 (shown in FIG. 5) and the consist 510 and/or 512, then the first remote powered unit 504 may be switched to the off mode of operation without breaking or interrupting the communication link. As a result, flow of the method 1200 proceeds to 1216.

On the other hand, if no other remote vehicles in the consist are in the on mode of operation and/or are supplying insufficient electric current to power communication device(s) of the consist, then the first remote vehicle may not be turned to the off mode of operation without acquiring a source of electric current to power the communication device(s) and maintain the communication link. As a result, flow of the method 1200 proceeds to 1214.

At 1214, one or more other remote vehicles are switched to the on mode of operation. For example, one or more other remote powered units 504 (shown in FIG. 5) of the same consist 510 and/or 512 (shown in FIG. 5) as the first remote powered unit 504 may be switched to the on mode of operation before switching the first remote powered unit 504 to the off mode of operation, as described above. In one embodiment, the first remote powered unit 504 is only switched to the off mode of operation after at least one other remote powered unit 504 is in the on mode of operation and supplying sufficient electric current to the communication device(s) of the consist to maintain the communication link with the lead powered unit 502 (shown in FIG. 5).

At 1216, the remote vehicle in the consist is turned to the off mode of operation. For example, the propulsion subsystem 702 (shown in FIG. 7) of the first remote powered unit 504 (shown in FIG. 5) of the consist 510 and/or 512 (shown in FIG. 5) may be turned to the off mode of operation, as described above. The propulsion subsystem 702 may be turned off while at least one communication device 700 (shown in FIG. 7) on the consist 510 and/or 512 remains on and powered to receive control instructions from the lead powered unit 502 (shown in FIG. 5) for control of operations of one or more other remote powered units 504 in the same consist 510 and/or 512.

In another embodiment, a control system includes an energy management system and an isolation control system. The energy management system is configured to generate a trip plan that designates operational settings of a vehicle system having plural powered units interconnected with one another that generate tractive effort to propel the vehicle system along a route for a trip. The energy management system also is configured to determine a tractive effort capability of the vehicle system and a demanded tractive effort of the trip. The tractive effort capability is representative of the tractive effort that the powered units are capable of providing to propel the vehicle system. The demanded tractive effort is representative of the tractive effort that is calculated to be used for actually propelling the vehicle system along the route for the trip according to the trip plan. The isolation control system is configured to be communicatively coupled with the energy management system and to remotely turn one or more of the powered units to an off mode. The energy management system also is configured to identify a tractive effort difference between the tractive effort capability of the vehicle system and the demanded tractive effort of the trip and to select at least one of the powered units as a selected powered unit based on the tractive effort difference. The isolation module also is configured to remotely turn the selected powered unit to the off mode such that the vehicle system is propelled along the route during the trip by the powered units other than the selected powered unit.

In one aspect, the isolation control system is configured to be disposed onboard a first powered unit of the powered units in the vehicle system and to remotely turn the selected powered unit that is located remote from the first powered unit in the vehicle system to the of mode.

In one aspect, the energy management system is configured to determine respective portions of the tractive effort capability that are provided by the powered units and to select the selected powered unit to be turned to the off mode based on a comparison between the tractive effort difference and the portions of the tractive effort capability that are provided by the powered units.

In one aspect, the tractive effort difference represents an excess tractive effort by which the tractive effort capability is greater than the demanded tractive effort.

In one aspect, the energy management system is configured to select the selected powered unit and the isolation control system is configured to remotely turn the selected powered unit to the off mode prior to the vehicle system starting the trip such that the selected powered unit is in the off mode from the start of the trip through at least until the trip is completed.

In one aspect, the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

In one aspect, the selected powered unit continues to operate to generate electric current for one or more electric loads of the at least one of the powered units without producing tractive effort when in the off mode.

In one aspect, the operational settings of the trip plan include at least one of throttle settings, speeds, brake settings, or power output settings of the powered units.

In another embodiment, a method (e.g., for controlling a vehicle system) comprises determining a tractive effort capability of a vehicle system having plural powered units that generate tractive effort to propel the vehicle system and a demanded tractive effort of a trip. The tractive effort capability is representative of the tractive effort that the powered units are capable of providing to propel the vehicle system. The demanded tractive effort is representative of the tractive effort that is calculated to be used for actually propelling the vehicle system along a route for the trip according to a trip plan. The trip plan designates operational settings of the vehicle system to propel the vehicle system along the route for the trip. The method also includes identifying a tractive effort difference between the tractive effort capability of the vehicle system and the demanded tractive effort of the trip, selecting at least one of the powered units as a selected powered unit based on the tractive effort difference, and remotely turning the selected powered unit to an off mode such that the vehicle system is propelled along the route during the trip by the powered units other than the selected powered unit.

In one aspect, remotely turning the selected powered unit to the off mode is performed by an isolation control system disposed onboard a first powered unit of the powered units in the vehicle system to remotely turn off the selected powered unit that is located remote from the first powered unit in the vehicle system.

In one aspect, the method also includes determining respective portions of the tractive effort capability that are provided by the powered units. The selected powered unit is selected based on a comparison between the tractive effort difference and the portions of the tractive effort capability that are provided by the powered units.

In one aspect, the tractive effort difference represents an excess tractive effort by which the tractive effort capability is greater than the demanded tractive effort.

In one aspect, selecting the at least one of the powered units and remotely turning the selected powered unit to the off mode is performed prior to the vehicle system starting the trip such that the selected powered unit is in the off mode from the start of the trip through at least until the trip is completed.

In one aspect, the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

In one aspect, the operational settings of the trip plan include at least one of throttle settings, speeds, brake settings, or power output settings of the powered units.

In another embodiment, another control system includes an energy management system and an isolation control system. The energy management system is configured to generate a trip plan that designates operational settings of a vehicle system having plural powered units interconnected with one another that generate tractive effort to propel the vehicle system along a route for a trip. Each of the powered units is associated with a respective tractive effort capability representative of a maximum horsepower that can be produced by the powered unit during travel. The isolation control system is configured to be communicatively coupled with the energy management system and to remotely turn one or more of the powered units to an off mode. The energy management system also is configured to determine a total tractive effort capability of the powered units in the vehicle system and a demanded tractive effort representative of the tractive effort that is calculated to be used for actually propelling the vehicle system along the route for the trip according to the trip plan. The energy management system is configured to select a first powered unit from the powered units based on an excess of the total tractive effort capability of the powered units over the demanded tractive effort of the trip. The isolation control system is configured to remotely turn the first powered unit to an off mode such that the vehicle system is propelled along the route during the trip without tractive effort from the first powered unit.

In one aspect, the energy management system is configured to select the first powered unit from the powered units of the vehicle system based on a comparison between the excess of the tractive effort capability and the tractive effort capability of each of the powered units.

In one aspect, the energy management system is configured to select the first powered unit and the isolation control system is configured to remotely turn the first powered unit to the off mode prior to the vehicle system starting the trip.

In one aspect, the trip plan designates the operational settings of the vehicle system as a function of at least one of distance along the route or time elapsed during the trip such that at least one of emissions generated or fuel consumed by the vehicle system is reduced by operating according to the trip plan during the trip relative to the vehicle system operating according to other operational settings of another, different trip plan.

In one aspect, the operational settings of the trip plan include at least one of throttle settings, speeds, brake settings, or power output settings of the powered units.

In another embodiment of a method (e.g., a method for controlling a vehicle consist), the method comprises, in a vehicle consist comprising plural powered units, controlling one or more of the powered units to an off mode of operation. The one or more powered units are controlled to the off mode of operation from a start of a trip of the vehicle consist along a route at least until a completion of the trip. During the trip when the one or more powered units are in the off mode of operation, the one or more powered units would be capable of providing tractive effort to help propel the vehicle consist.

(For example, the powered units controlled to the off mode are not disabled or otherwise incapable of providing tractive effort.) In another embodiment of the method, in the off mode of operation, engine(s) of the one or more powered units are deactivated.

In another embodiment, a control system comprises an energy management system configured to generate a trip plan for controlling a vehicle system having plural powered units along a route for a trip. The energy management system is further configured to determine a tractive effort difference between a tractive effort capability of the vehicle system and a demanded tractive effort of the trip. The tractive effort capability is representative of the tractive effort that the powered units are capable of providing to propel the vehicle system, and the demanded tractive effort is representative of the tractive effort that is calculated to be used for actually propelling the vehicle system along the route for the trip according to the trip plan. The energy management system is further configured to generate the trip plan such that according to the trip plan, at least one of the powered units is to be controlled to an off mode during at least part of the trip. (That is, the trip plan is configured such that when the trip plan is executed, the at least one of the powered units is designated to be in the off mode of operation.) The energy management system is configured to select the at least one of the powered units based on the tractive effort difference.

In another embodiment, a method (e.g., for controlling a vehicle system) includes controlling a vehicle system having plural powered units that are configured to generate tractive effort to propel the vehicle system along a route according to a first trip plan. The first trip plan designates operational settings of the vehicle system as a function of at least one of time or distance along the route during a trip. The first trip plan also directs at least one of the powered units to remain in a non-propulsion generating mode during the trip. The method further includes at least one of slowing or stopping the vehicle system along the route during the trip in contravention to the first trip plan, activating the at least one of the powered units out of the non-propulsion generating mode into an active, propulsion-generating mode when the vehicle system accelerates after the at least one of slowing or stopping in contravention to the first trip plan, and switching the at least one of the powered units back to the non-propulsion generating mode after the vehicle system achieves a designated speed following accelerating after the at least one of the slowing or stopping of the vehicle system in contravention to the first trip plan.

In one aspect, the at least one of the powered units is in the non-propulsion generating mode when the at least one of the powered units is in at least one of an off mode or an idle mode.

In one aspect, the at least one of the powered units remains in the non-propulsion generating mode after the vehicle system achieves the designated speed for a remainder of the trip or until the vehicle system is slowed or stopped again in contravention to the first trip plan.

In one aspect, the at least one of slowing or stopping the vehicle system is in contravention to the first trip plan when the operational settings of the first trip plan do not direct the vehicle system to slow or stop at a location or time where the vehicle system slows or stops.

In one aspect, the at least one of slowing or stopping the vehicle system occurs when an operator of the vehicle system manually overrides the operational settings designated by the first trip plan.

In one aspect, prior to the at least one of slowing or stopping the vehicle system in contravention to the first trip plan, the operational settings of the first trip plan direct the at least one of the powered units to remain in the non-propulsion generating mode for an entire duration of the trip from a starting location to a destination location.

In one aspect, the destination location is a final destination location and not an intermediate location.

In one aspect, the method also includes determining a tractive effort capability of the vehicle system and a demanded tractive effort of a trip. The tractive effort capability represents the tractive effort that the powered units are capable of providing to propel the vehicle system. The demanded tractive effort represents the tractive effort that is calculated to be used for actually propelling the vehicle system along the route for the trip according to the first trip plan. The method can further include identifying a tractive effort difference between the tractive effort capability of the vehicle system and the demanded tractive effort of the trip, selecting the at least one of the powered units based on the tractive effort difference, and at least one of modifying or creating the first trip plan to direct the at least one powered unit to remain in the non-propulsion generating mode during the trip.

In one aspect, the method also includes remotely turning the at least one powered unit to the non-propulsion generating mode prior to beginning movement of the vehicle system for the trip.

In one aspect, the method also includes remotely turning the at least one powered unit to the active, propulsion-generating mode when the vehicle system accelerates after the at least one of slowing or stopping in contravention to the first trip plan.

In one aspect, the first trip plan designates the operational settings of the vehicle system such that travel of the vehicle system along the route for the trip according to the first trip plan reduces at least one of fuel consumed or emissions generated relative to the vehicle system traveling along the route for the trip according to another, different first trip plan that includes other, different operational settings.

In one aspect, the method also includes re-planning the first trip plan into a revised trip plan following the at least one of slowing or stopping of the vehicle system in contravention of the first trip plan. The revised trip plan designates the operational settings of the vehicle system to cause the vehicle system to increase an overall tractive effort provided by the powered units relative to the operational settings of the first trip plan for an acceleration time period following the at least one of the slowing or stopping.

In one aspect, the revised trip plan designates the operational settings of the vehicle system to increase the overall tractive effort such that tractive effort provided by the at least one powered unit previously in the non-propulsion generating mode is needed in order to accelerate the vehicle system sufficiently fast such that the vehicle system can reach a destination location of the trip within a designated time period.

In one aspect, the method also includes limiting when the first trip plan can be re-planned into the revised trip plan based on a remaining amount of the trip to be traveled by the vehicle system.

In one aspect, no re-planning of the first trip plan is allowed or performed if the remaining amount of the trip is less than at least one of a designated time or a designated distance.

In another embodiment, a control system includes a controller device and an isolation module. The controller device is configured to be disposed onboard a vehicle system having plural powered units that are configured to generate tractive effort to propel the vehicle system along a route. The controller device also is configured to direct operations of the powered units according to a first trip plan that designates operational settings of the vehicle system as a function of at least one of time or distance along the route during a trip. The isolation module is configured to be communicatively coupled with the controller device and to direct at least one of the powered units to remain in a non-propulsion generating mode during the trip. When the vehicle system is at least one of slowed or stopped along the route during the trip in contravention to the first trip plan and the vehicle system subsequently accelerates, the isolation module is configured to activate the at least one of the powered units out of the non-propulsion generating mode into an active, propulsion-generating mode during acceleration of the vehicle system. The isolation module also is configured to switch the at least one of the powered units back to the non-propulsion generating mode after the vehicle system achieves a designated speed following the acceleration of the vehicle system.

In one aspect, the isolation module is configured to direct the at least one of the powered units to switch to at least one of an idle mode or an off mode when the isolation module directs the at least one of the powered units to switch to the non-propulsion generating mode.

In one aspect, the controller device is configured to automatically implement the operational settings designated by the first trip plan to autonomously control movement of the vehicle system according to the trip plan.

In one aspect, the controller device is configured to output instructions to an operator of the vehicle system to direct the operator to manually control movement of the vehicle system according to the trip plan.

In one aspect, the isolation module is configured to direct the at least one of the powered units to remain in the non-propulsion generating mode after the vehicle system achieves the designated speed for a remainder of the trip or until the vehicle system is slowed or stopped again in contravention to the first trip plan.

In one aspect, the at least one of slowing or stopping the vehicle system is in contravention to the first trip plan when the operational settings of the first trip plan do not direct the vehicle system to slow or stop at a location or time where the vehicle system slows or stops.

In one aspect, the at least one of slowing or stopping the vehicle system occurs when an operator of the vehicle system manually overrides the operational settings designated by the first trip plan.

In one aspect, prior to the at least one of slowing or stopping the vehicle system in contravention to the first trip plan, the operational settings of the first trip plan direct the isolation module to keep at least one of the powered units in the non-propulsion generating mode for an entire duration of the trip from a starting location to a destination location.

In one aspect, the destination location is a final destination location and not an intermediate location.

In one aspect, the control system also includes an energy management system configured to determine a tractive effort capability of the vehicle system and a demanded tractive effort of the trip. The tractive effort capability represents the tractive effort that the powered units are capable of providing to propel the vehicle system. The demanded tractive effort represents the tractive effort that is calculated to be used for actually propelling the vehicle system along the route for the trip according to the first trip plan.

In one aspect, the energy management system is configured to identify a tractive effort difference between the tractive effort capability of the vehicle system and the demanded tractive effort of the trip, select the at least one of the powered units based on the tractive effort difference, and at least one of modify or create the first trip plan to direct the at least one powered unit to remain in the non-propulsion generating mode during the trip.

In one aspect, the isolation module is configured to remotely turn the at least one powered unit to the non-propulsion generating mode prior to beginning movement of the vehicle system for the trip.

In one aspect, the isolation module is configured to remotely turn the at least one powered unit to the active, propulsion-generating mode when the vehicle system accelerates after the at least one of slowing or stopping in contravention to the first trip plan.

In one aspect, the first trip plan designates the operational settings of the vehicle system such that travel of the vehicle system along the route for the trip according to the first trip plan reduces at least one of fuel consumed or emissions generated relative to the vehicle system traveling along the route for the trip according to another, different first trip plan that includes other, different operational settings.

In one aspect, the control system also includes an energy management system configured to re-plan the first trip plan into a revised trip plan following the at least one of slowing or stopping of the vehicle system in contravention of the first trip plan. The revised trip plan designating the operational settings of the vehicle system to cause the vehicle system to increase an overall tractive effort provided by the powered units relative to the operational settings of the first trip plan for an acceleration time period following the at least one of the slowing or stopping.

In one aspect, the revised trip plan designates the operational settings of the vehicle system to increase the overall tractive effort such that tractive effort provided by the at least one powered unit previously in the non-propulsion generating mode is needed in order to accelerate the vehicle system sufficiently fast such that the vehicle system can reach a destination location of the trip within a designated time period.

In one aspect, the energy management system is configured to prevent re-planning of the first trip plan into the revised trip plan based on a remaining amount of the trip to be traveled by the vehicle system.

In one aspect, the energy management system is configured to prevent the re-planning of the first trip plan when the remaining amount of the trip is less than at least one of a designated time or a designated distance.

In another embodiment, a control system includes an energy management system that is configured to generate a first trip plan for controlling a vehicle system having plural powered units along a route for a trip. The energy management system is further configured to determine a tractive effort difference between a tractive effort capability of the vehicle system and a demanded tractive effort of the trip. The tractive effort capability represents the tractive effort that the powered units are capable of providing to propel the vehicle system. The demanded tractive effort represents the tractive effort that is calculated to be used for actually propelling the vehicle system along the route for the trip according to the first trip plan. The energy management system is further configured to generate the first trip plan such that according to the first trip plan, at least one of the powered units is to be controlled to a non-propulsion generating mode based on the tractive effort difference. Following at least one of an unplanned slowing or an unplanned stopping of the vehicle system, the energy management system is configured to modify the first trip plan into a revised trip plan that directs the at least one of the powered units to switch to an active mode to generate the tractive effort to accelerate the vehicle system to a designated speed and then to switch back to the non-propulsion generating mode.

In one aspect, the revised trip plan directs the at least one of the powered units to remain in the non-propulsion generating mode after the vehicle system achieves the designated speed for a remainder of the trip or until the vehicle system is slowed or stopped again in contravention to the first trip plan.

In one aspect, the at least one of an unplanned slowing or an unplanned stopping of the vehicle system occurs when an operator of the vehicle system manually overrides operational settings of the vehicle system that are designated by the first trip plan.

In one aspect, the first trip plan designates the operational settings of the vehicle system such that travel of the vehicle system along the route for the trip according to the first trip plan reduces at least one of fuel consumed or emissions generated relative to the vehicle system traveling along the route for the trip according to another, different first trip plan that includes other, different operational settings.

In one aspect, the revised trip plan designates the operational settings of the vehicle system to increase the overall tractive effort such that tractive effort provided by the at least one powered unit previously in the non-propulsion generating mode is needed in order to accelerate the vehicle system sufficiently fast such that the vehicle system can reach a destination location of the trip within a designated time period.

In one aspect, the energy management system is configured to prevent re-planning of the first trip plan into the revised trip plan based on a remaining amount of the trip to be traveled by the vehicle system.

In one aspect, the energy management system is configured to prevent the re-planning of the first trip plan when the remaining amount of the trip is less than at least one of a designated time or a designated distance.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person skilled in the art to practice the embodiments of invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
controlling a vehicle system having plural powered units that are configured to generate tractive effort to propel the vehicle system along a route according to a first trip plan, the first trip plan designating operational settings of the vehicle system as a function of at least one of time or distance along the route during a trip, the first trip plan directing one or more deactivated powered units of the powered units to remain in an inactive, non-propulsion generating mode during the trip and one or more activated powered units of the powered units to remain in an active, propulsion-generating mode to propel the vehicle system;
at least one of slowing or stopping the vehicle system along the route during the trip in contravention to the first trip plan;
revising the first trip plan into a different, second trip plan responsive to the at least one of slowing or stopping the vehicle system in contravention to the first trip plan, the second trip plan directing the vehicle system to accelerate after the at least one of slowing or stopping in contravention to the first trip plan;
determining that a tractive effort capability of the one or more activated powered units is insufficient to meet a demanded tractive effort of the second trip plan, the demanded tractive effort representing an amount of tractive effort that is demanded by the second trip plan to propel the vehicle system according to the operational settings of the vehicle system that are designated by the second trip plan;
selecting at least one of the one or more deactivated powered units for activation into the active, propulsion-generating mode based at least in part on determining that the tractive effort capability is insufficient to meet the demanded tractive effort of the second trip plan;
activating the at least one of the one or more deactivated powered units that are selected out of the inactive, non-propulsion generating mode into the active, propulsion-generating mode; and
controlling the powered units that are operating in the active, propulsion-generating mode according to the second trip plan.

2. The method of claim 1, wherein the one or more deactivated powered units is in the inactive, non-propulsion-generating mode when the one or more deactivated powered units is in at least one of an off mode or an idle mode.

3. The method of claim 1, wherein the one or more of the powered units that is switched from the active, propulsion-generating mode to the inactive, non-propulsion-generating mode remains in the inactive, non-propulsion generating mode after the vehicle system achieves the designated speed for a remainder of the trip or until the vehicle system is slowed or stopped in contravention to the second trip plan.

4. The method of claim 1, wherein the at least one of slowing or stopping the vehicle system is in contravention to the first trip plan when the operational settings of the first trip plan do not direct the vehicle system to slow or stop at a location or time where the vehicle system slows or stops.

5. The method of claim 1, wherein the at least one of slowing or stopping the vehicle system occurs when an operator of the vehicle system manually overrides the operational settings designated by the first trip plan.

6. The method of claim 1, wherein, prior to the at least one of slowing or stopping the vehicle system in contravention to the first trip plan, the operational settings of the first trip plan direct the one or more deactivated powered units to remain in the inactive, non-propulsion generating mode for an entire duration of the trip from a starting location of the trip that is prior to a location where the vehicle system slows or stops after commencement of the trip to a destination location of the trip.

7. The method of claim 1, further comprising remotely turning the one or more deactivated powered units to the inactive, non-propulsion-generating mode prior to beginning movement of the vehicle system for the trip.

8. The method of claim 1, further comprising remotely turning the one or more deactivated powered units to the active, propulsion-generating mode when the vehicle system accelerates after the at least one of slowing or stopping in contravention to the first trip plan.

9. The method of claim 1, wherein the first trip plan designates the operational settings of the vehicle system such that travel of the vehicle system along the route for the trip according to the first trip plan reduces at least one of fuel consumed or emissions generated relative to the vehicle system traveling along the route for the trip according to another, different trip plan that includes other, different operational settings.

10. The method of claim 1, wherein the second trip plan designates the operational settings of the vehicle system to cause the vehicle system to increase an overall tractive effort provided by the one or more activated powered units relative to the operational settings of the first trip plan for an acceleration time period following the at least one of the slowing or stopping.

11. The method of claim 10, wherein the second trip plan designates the operational settings of the vehicle system to increase the overall tractive effort such that tractive effort provided by the one or more activated powered units previously in the inactive, non-propulsion generating mode is needed in order to accelerate the vehicle system sufficiently fast such that the vehicle system can reach a destination location of the trip within a designated time period.

12. The method of claim 10, further comprising preventing the first trip plan from being revised into the second trip plan responsive to the vehicle system being within a designated distance of a final destination location of the trip.

13. The method of claim 1, further comprising switching at least one of the one or more activated powered units from the active, propulsion-generating mode to the inactive, non-propulsion generating mode after the vehicle system achieves a designated speed of the second trip plan following accelerating after the at least one of the slowing or stopping of the vehicle system in contravention to the first trip plan.

14. The method of claim 13, wherein the vehicle system includes at least first, second, and third powered units of the plural powered units with the first powered unit and the second powered unit included in the one or more activated powered units and the third powered unit included in the one or more deactivated powered units during travel according to the first trip plan, wherein activating the at least one of the one or more deactivated powered units includes activating the third powered unit from the inactive, non-propulsion-generating mode to the active, propulsion-generating mode and keeping the third powered unit in the active, propulsion-generating mode during travel according to the second trip plan, and wherein switching the at least one of the one or more activated powered units to the inactive, non-propulsion-generating mode includes switching the second powered unit from the active, propulsion-generating mode to the inactive, non-propulsion-generating mode during travel according to the second trip plan.

15. A control system comprising:

a controller device configured to be disposed onboard a vehicle system having plural powered units that are configured to generate tractive effort to propel the vehicle system along a route, the controller device configured to direct operations of the powered units according to a first trip plan that designates operational settings of the vehicle system as a function of at least one of time or distance along the route during a trip, the first trip plan directing one or more activated powered units of the powered units to remain in an active, propulsion-generating mode and one or more deactivated powered units of the powered units to remain in an inactive, non-propulsion-generating mode during the trip;

an energy management system configured to revise the first trip plan into a different, second trip plan responsive to the vehicle system at least one of slowing or stopping in contravention to the first trip plan, the second trip plan directing the vehicle system to accelerate after the at least one of slowing or stopping in contravention to the first trip plan, the energy management system also configured to determine that a tractive effort capability of the one or more activated powered units is insufficient to meet a demanded tractive effort of the second trip plan, the demanded tractive effort representing an amount of tractive effort that is demanded by the second trip plan to propel the vehicle system according to the operational settings of the vehicle system that are designated by the second trip plan, the energy management system also configured to select at least one of the one or more deactivated powered units for activation into the active, propulsion-generating mode based at least in part on determining that the tractive effort capability is insufficient to meet the demanded tractive effort of the second trip plan; and an isolation module configured to be communicatively coupled with the controller device, the isolation module also configured to communicate with the powered units to control which of the powered units are included in the one or more activated powered units and which of the powered units are included in the one or more deactivated powered units during the trip, wherein, responsive to the vehicle system at least one of slowing or stopping along the route during the trip in contravention to the first trip plan and then subsequently accelerating, the isolation module is configured to activate at least one of the deactivated powered units out of the inactive, non-propulsion generating mode into the active, propulsion-generating mode during acceleration of the vehicle system, the isolation module also configured to switch at least one of the activated powered units to the inactive, non-propulsion generating mode after the vehicle system achieves a designated speed following the acceleration of the vehicle system.

16. The control system of claim 15, wherein the isolation module is configured to direct the at least one of the activated powered units to switch to at least one of an idle mode or an off mode when the isolation module directs the at least one of the activated powered units to switch to the inactive, non-propulsion generating mode.

17. The control system of claim 15, wherein the isolation module is configured to direct the at least one of the deactivated powered units to remain in the inactive, non-propulsion generating mode after the vehicle system achieves the designated speed for a remainder of the trip or until the vehicle system is slowed or stopped again in contravention to the first trip plan.

18. The control system of claim 15, wherein the at least one of slowing or stopping the vehicle system is in contravention to the first trip plan when the operational settings of the first trip plan do not direct the vehicle system to slow or stop at a location or time where the vehicle system slows or stops.

19. The control system of claim 15, wherein the at least one of slowing or stopping the vehicle system occurs when an operator of the vehicle system manually overrides the operational settings designated by the first trip plan.

20. The control system of claim 15, wherein, prior to the at least one of slowing or stopping the vehicle system in contravention to the first trip plan, the operational settings of the first trip plan direct the isolation module to keep at least one of the deactivated powered units in the inactive, non-propulsion generating mode for an entire duration of the trip from a starting location to a destination location.

21. The control system of claim 15, wherein the isolation module is configured to remotely turn the at least one of the deactivated powered units to the non-propulsion generating mode prior to beginning movement of the vehicle system for the trip.

22. The control system of claim 15, wherein the isolation module is configured to remotely turn the at least one of the activated powered units to the active, propulsion-generating mode when the vehicle system accelerates after the at least one of slowing or stopping in contravention to the first trip plan.

23. The control system of claim 15, wherein the first trip plan designates the operational settings of the vehicle system such that travel of the vehicle system along the route for the trip according to the first trip plan reduces at least one of fuel consumed or emissions generated relative to the vehicle system traveling along the route for the trip according to another, different trip plan that includes other, different operational settings.

24. The control system of claim 15, wherein the energy management system is configured to re-plan the first trip plan into the second trip plan with the second trip plan designating the operational settings of the vehicle system to cause the vehicle system to increase an overall tractive effort provided by the one or more activated powered units relative to the operational settings of the first trip plan for an acceleration time period following the at least one of the slowing or stopping.

25. The control system of claim 15, wherein the second trip plan designates the operational settings of the vehicle system to increase the overall tractive effort such that tractive effort provided by the at least one of the deactivated powered units previously in the inactive, non-propulsion generating mode is needed in order to accelerate the vehicle system sufficiently fast such that the vehicle system can reach a destination location of the trip within a designated time period.

26. The control system of claim 15, wherein the energy management system is configured to prevent re-planning of the first trip plan into the second trip plan responsive to the vehicle system being within a designated distance of a final destination of the trip.

27. A control system comprising:
an energy management system configured to generate a first trip plan for controlling a vehicle system having plural powered units along a route for a trip;
wherein the energy management system is further configured to determine a tractive effort difference between a tractive effort capability of the vehicle system and a first demanded tractive effort of the trip, the tractive effort capability representative of the tractive effort that the powered units are capable of providing to propel the vehicle system, and the first demanded tractive effort representative of the tractive effort that is calculated to be used for actually propelling the vehicle system along the route for the trip according to the first trip plan;
wherein the energy management system is further configured to generate the first trip plan such that, according to the first trip plan, at least one of the powered units is to be controlled in a non-propulsion generating mode based on the tractive effort difference; and
wherein, following at least one of an unplanned slowing or an unplanned stopping of the vehicle system, the energy management system is configured to modify the first trip plan into a revised trip plan and to determine a second demanded tractive effort of the revised trip plan that is larger than the first demanded tractive effort of the first trip plan and that is larger than a current tractive effort capability of the powered units that are in an active, propulsion-generating mode to generate the tractive effort of the vehicle system according to the first trip plan, the energy management system configured to identify one or more of the powered units controlled in the non-propulsion generating mode in the first trip plan for activation into the propulsion-generating mode in the revised trip plan to accelerate the vehicle system to a designated speed.

28. The control system of claim 27, wherein the revised trip plan directs at least one of the powered units previously in the non-propulsion generating mode to switch to the propulsion-generating mode during acceleration of the vehicle system to the designated speed and directs a different one of the powered units that was in the propulsion-generating mode during travel according to the first trip plan to switch to and remain in the non-propulsion generating mode after the vehicle system achieves the designated speed.

29. The control system of claim 27, wherein the at least one of an unplanned slowing or an unplanned stopping of the vehicle system occurs when an operator of the vehicle system manually overrides operational settings of the vehicle system that are designated by the first trip plan.

30. The control system of claim 27, wherein the first trip plan designates the operational settings of the vehicle system such that travel of the vehicle system along the route for the trip according to the first trip plan reduces at least one of fuel consumed or emissions generated relative to the vehicle system traveling along the route for the trip according to another, different trip plan that includes other, different operational settings.

31. The control system of claim 27, wherein the revised trip plan designates the operational settings of the vehicle system to increase the overall tractive effort such that tractive effort provided by the at least one powered unit previously in the non-propulsion generating mode is needed in order to accelerate the vehicle system sufficiently fast such that the vehicle system can reach a destination location of the trip within a designated time period.

32. The control system of claim 27, wherein the energy management system is configured to prevent re-planning of the first trip plan into the revised trip plan responsive to the vehicle system being within a designated distance of a final destination location of the trip.

\* \* \* \* \*